US012648033B2

(12) United States Patent
Paladugu et al.

(10) Patent No.: US 12,648,033 B2
(45) Date of Patent: Jun. 2, 2026

(54) RELAY OF WIRELESS COMMUNICATION TO A NETWORK ENTITY BASED ON A REMOTE CONNECTION

(71) Applicant: QUALCOMM Incorporated, San Diego, CA (US)

(72) Inventors: Karthika Paladugu, San Diego, CA (US); Gavin Bernard Horn, La Jolla, CA (US); Hong Cheng, Basking Ridge, NJ (US); Ozcan Ozturk, San Diego, CA (US); Peng Cheng, Beijing (CN); Soo Bum Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 559 days.

(21) Appl. No.: 18/015,048

(22) PCT Filed: Aug. 20, 2021

(86) PCT No.: PCT/CN2021/113737
§ 371 (c)(1),
(2) Date: Jan. 6, 2023

(87) PCT Pub. No.: WO2022/042439
PCT Pub. Date: Mar. 3, 2022

(65) Prior Publication Data
US 2023/0284299 A1 Sep. 7, 2023

(30) Foreign Application Priority Data
Aug. 20, 2021 (WO) ................ PCT/CN2021/003737

(51) Int. Cl.
*H04W 4/00* (2018.01)
*H04W 8/00* (2009.01)
(Continued)

(52) U.S. Cl.
CPC ........... *H04W 76/14* (2018.02); *H04W 8/005* (2013.01); *H04W 76/19* (2018.02); *H04W 76/34* (2018.02)

(58) Field of Classification Search
CPC ..... H04W 76/14; H04W 76/19; H04W 76/34; H04W 8/005; H04W 8/00
(Continued)

(56) References Cited

U.S. PATENT DOCUMENTS 1,700,565 A * 1/1929 Ernst ......................... B30B 9/26
100/90
9,736,686 B2 * 8/2017 Wifvesson ............ H04W 12/04
(Continued)

FOREIGN PATENT DOCUMENTS

CN 108029148 A 5/2018
EP 2833694 A2 2/2015
(Continued)

OTHER PUBLICATIONS

"3rd Generation Partnership Project, Technical Specification Group Services and System Aspects, Study on Security Aspects of Enhancement for Proximity Based Services in the 5G System (5GS) (Release 17)", 3GPP Standard, Technical Report, 3GPP TR 33.847, 3rd Generation Partnership Project, Mobile Competence Centre, 650, Route Des Lucioles, F-06921 Sophia-Antipolis Cedex, France, vol. SA WG3 No. V0.5.0, Mar. 17, 2021, pp. 1-120, XP052000063.
(Continued)

*Primary Examiner* — Marceau Milord
(74) *Attorney, Agent, or Firm* — Procopio, Cory, Hargreaves & Savitch LLP

(57) ABSTRACT
A first wireless device establishes a first connection to a second wireless device and establishes a second connection with a network entity via the second wireless device. The first wireless device transmits a message to the network
(Continued)

1300

1302
Establish a first connection to a second wireless device

1304
Establish a second connection with a network entity via the second wireless device 1306
Transmit a message to the network entity via the second wireless device, the message indicating that a connection is a remote connection entity via the second wireless device, the message indicating that the second connection is a remote connection. The second wireless device establishes the first connection with the first wireless device to relay traffic between a network entity and the first wireless device and establishes a connection with the network entity to relay the traffic between the network entity and the first wireless device. The second wireless device receives a configuration from the network entity for the second connection between the network entity and the first wireless device for relaying the traffic to the second wireless device.

29 Claims, 26 Drawing Sheets

(51) Int. Cl.
| | |
|---|---|
| *H04W 76/14* | (2018.01) |
| *H04W 76/19* | (2018.01) |
| *H04W 76/34* | (2018.01) |

(58) Field of Classification Search
USPC ......................................................... 370/329
See application file for complete search history.

(56) References Cited

U.S. PATENT DOCUMENTS

| | | | | |
|---|---|---|---|---|
| 10,469,154 | B2 * | 11/2019 | Lee ........................ | H04W 48/16 |
| 10,667,314 | B2 * | 5/2020 | Lee ........................ | H04W 76/15 |
| 11,219,054 | B2 * | 1/2022 | Gulati ................... | H04W 72/23 |
| 11,540,344 | B2 * | 12/2022 | Kung ................... | H04W 72/535 |
| 11,638,139 | B2 * | 4/2023 | Yu .......................... | H04W 28/24 |
| | | | | 455/435.1 |
| 11,750,442 | B2 * | 9/2023 | Peng ..................... | H04W 76/19 |
| | | | | 370/242 |
| 11,877,336 | B2 * | 1/2024 | Kang ..................... | H04W 80/02 |
| 11,910,457 | B2 * | 2/2024 | Chen ..................... | H04W 76/18 |
| 11,937,278 | B2 * | 3/2024 | Cao ........................ | H04W 72/02 |
| 11,963,147 | B2 * | 4/2024 | Gulati .............. | H04W 72/0446 |
| 11,979,879 | B2 * | 5/2024 | Zhang ................... | H04W 72/30 |
| 2012/0281685 | A1 | 11/2012 | Kotecha et al. | |
| 2013/0023255 | A1 | 1/2013 | Yang et al. | |
| 2013/0288668 | A1 * | 10/2013 | Pragada ............ | H04M 15/8033 |
| | | | | 455/426.1 |
| 2016/0345169 | A1 * | 11/2016 | Wifvesson .............. | H04L 63/06 |
| 2017/0325270 | A1 | 11/2017 | Tenny et al. | |
| 2018/0041898 | A1 | 2/2018 | Hampel et al. | |
| 2018/0287689 | A1 * | 10/2018 | Lee ........................ | H04W 48/16 |
| 2018/0288822 | A1 * | 10/2018 | Lee ................... | H04W 52/0209 |
| 2018/0324842 | A1 * | 11/2018 | Gulati .............. | H04W 72/1263 |
| 2018/0324848 | A1 | 11/2018 | Baghel et al. | |
| 2019/0104403 | A1 | 4/2019 | Sharma et al. | |
| 2019/0124572 | A1 | 4/2019 | Park et al. | |
| 2019/0349951 | A1 * | 11/2019 | Ahmad ................. | H04W 76/18 |
| 2020/0008062 | A1 | 1/2020 | Tian et al. | |
| 2020/0008127 | A1 * | 1/2020 | Ohtsuji ................... | H04W 4/70 |
| 2020/0252989 | A1 * | 8/2020 | Chen ..................... | H04W 76/19 |
| 2020/0344708 | A1 | 10/2020 | Liao | |
| 2021/0185711 | A1 * | 6/2021 | Zhang ................... | H04W 72/20 |
| 2021/0267002 | A1 * | 8/2021 | Kung ................... | H04W 76/14 |
| 2021/0289337 | A1 * | 9/2021 | Yu ........................... | H04W 8/04 |
| 2021/0336688 | A1 | 10/2021 | Lee et al. | |
| 2022/0330352 | A1 | 10/2022 | Horn et al. | |
| 2022/0400479 | A1 * | 12/2022 | Cao ................... | H04W 36/0055 |
| 2023/0239943 | A1 | 7/2023 | Paladugu et al. | |
| 2024/0121836 | A1 | 4/2024 | Cheng et al. | |
| 2024/0121837 | A1 | 4/2024 | Cheng et al. | |

FOREIGN PATENT DOCUMENTS

| | | | |
|---|---|---|---|
| EP | | 3609259 A1 | 2/2020 |
| WO | | 2017142580 A1 | 8/2017 |
| WO | | 2018031343 A1 | 2/2018 |
| WO | | 2018204131 A1 | 11/2018 |
| WO | | 2019121497 A1 | 6/2019 |
| WO | | 2022042439 A1 | 3/2022 |
| WO | | 2022213361 A1 | 10/2022 |
| WO | | 2022213363 A1 | 10/2022 |

OTHER PUBLICATIONS

Supplementary European Search Report—EP21860276—Search Authority—The Hague—Nov. 7, 2024.

COOLPAD: "Discussion on Control Plane Architecture for Evolved ProSe UE-to-NW Relay", 3GPP TSG RAN WG2 Meeting #95bis, R2-166590, 3rd Generation Partnership Project, Mobile Competence Centre, 650, Route Des Lucioles vol. RAN WG2, No. Kaohsiung, Oct. 10, 2016-Oct. 14, 2016, Oct. 9, 2016, p. 2, paragraph 1, Option 1, figure 1, XP051151090, pp. 1-4.

Supplementary Partial European Search Report—EP21860276—Search Authority—Berlin—Aug. 16, 2024.

International Search Report and Written Opinion—PCT/CN2020/110672—ISA/EPO—May 21, 2021.

International Search Report and Written Opinion—PCT/CN2021/113737—ISA/EPO—Nov. 19, 2021.

COOLPAD: "Discussion on Control Plane Architecture for Evolved ProSe UE-to- NW Relay", 3GPP TSG RAN WG2 1 Meeting #95bis, R2-166590, Kaohsiung, Oct. 10-14, 2016, Oct. 1, 2016, pp. 1-4.

* cited by examiner

1302 Establish a first connection to a second wireless device

1304 Establish a second connection with a network entity via the second wireless device 1306 Transmit a message to the network entity via the second wireless device, the message indicating that a connection is a remote connection

1300

Figure 14:
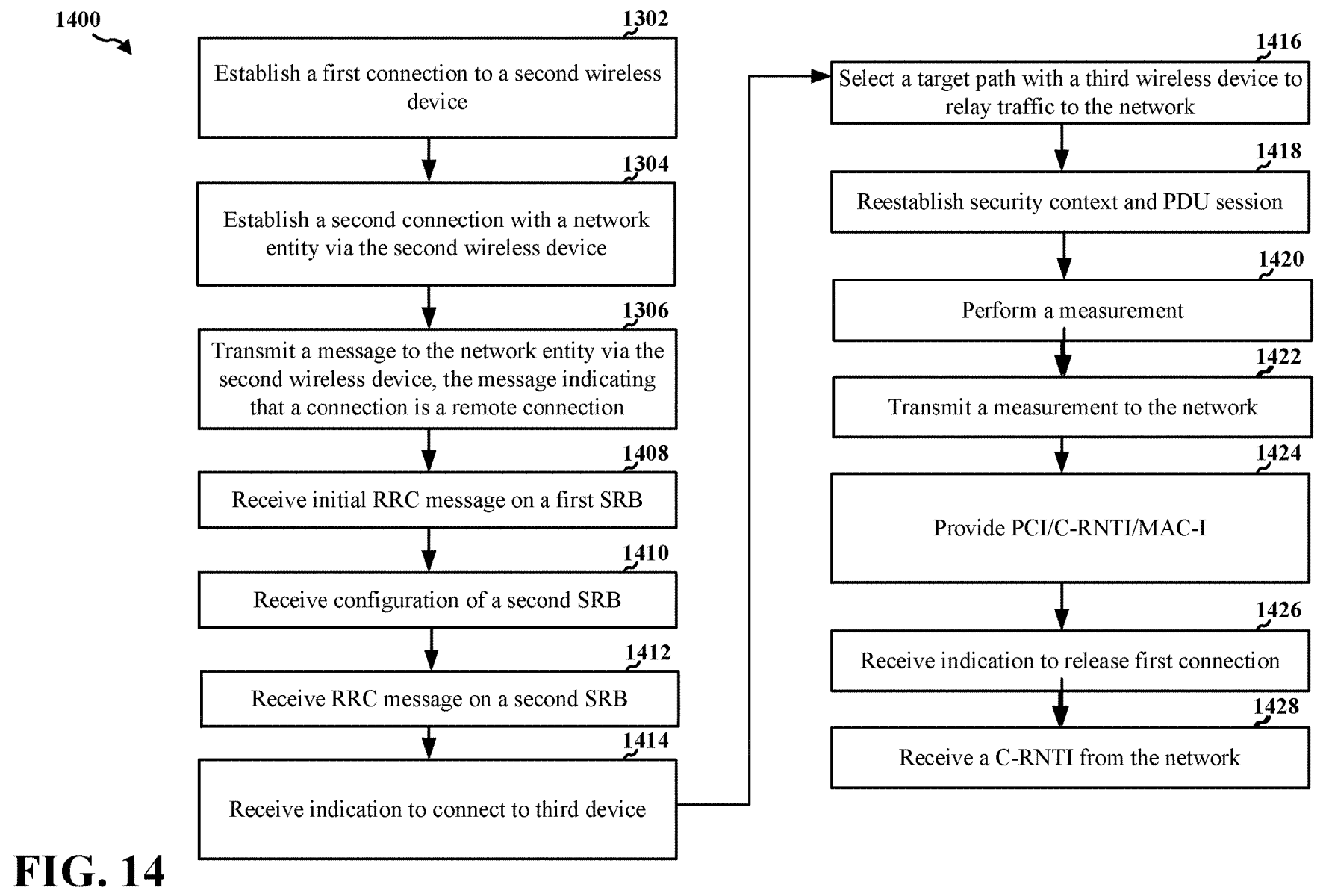

1400

1302 — Establish a first connection to a second wireless device

1304 — Establish a second connection with a network entity via the second wireless device 1306 — Transmit a message to the network entity via the second wireless device, the message indicating that a connection is a remote connection 1408 — Receive initial RRC message on a first SRB 1410 — Receive configuration of a second SRB 1412 — Receive RRC message on a second SRB 1414 — Receive indication to connect to third device 1416 — Select a target path with a third wireless device to relay traffic to the network 1418 — Reestablish security context and PDU session 1420 — Perform a measurement 1422 — Transmit a measurement to the network 1424 — Provide PCI/C-RNTI/MAC-I 1426 — Receive indication to release first connection 1428 — Receive a C-RNTI from the network

Figure 16:
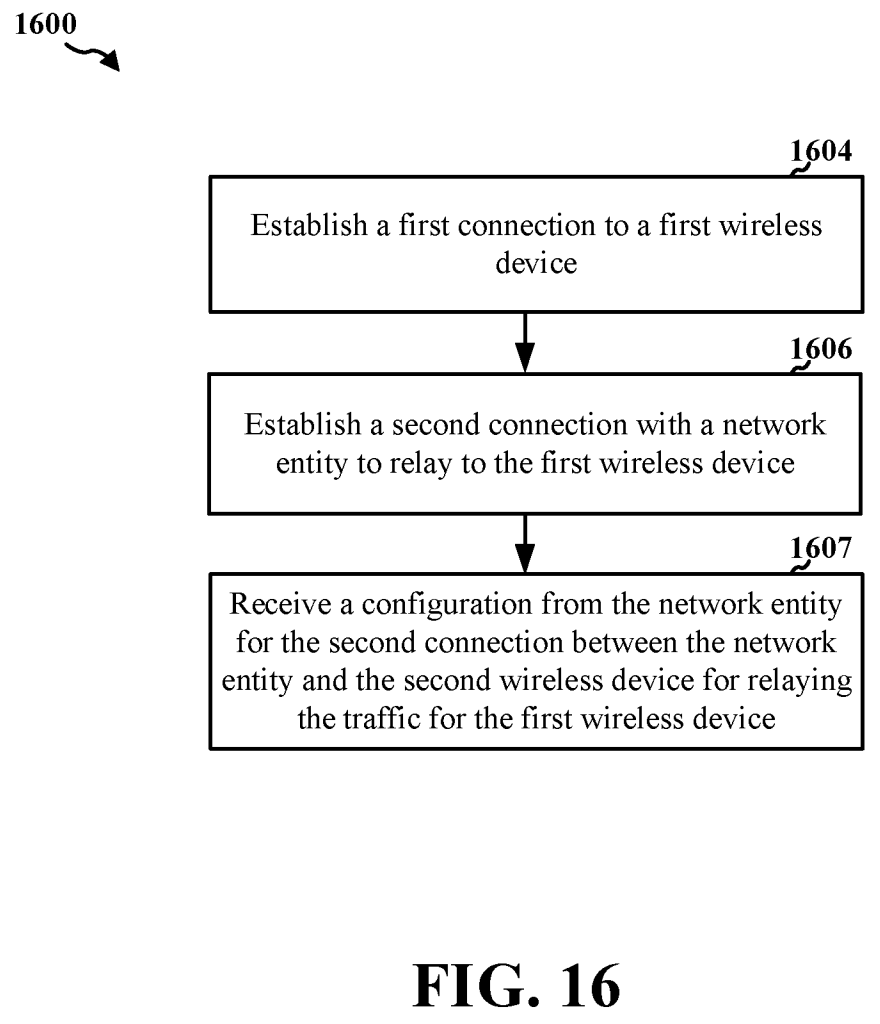

Establish a first connection to a first wireless device

1606

Establish a second connection with a network entity to relay to the first wireless device

1607

Receive a configuration from the network entity for the second connection between the network entity and the second wireless device for relaying the traffic for the first wireless device

Figure 17:
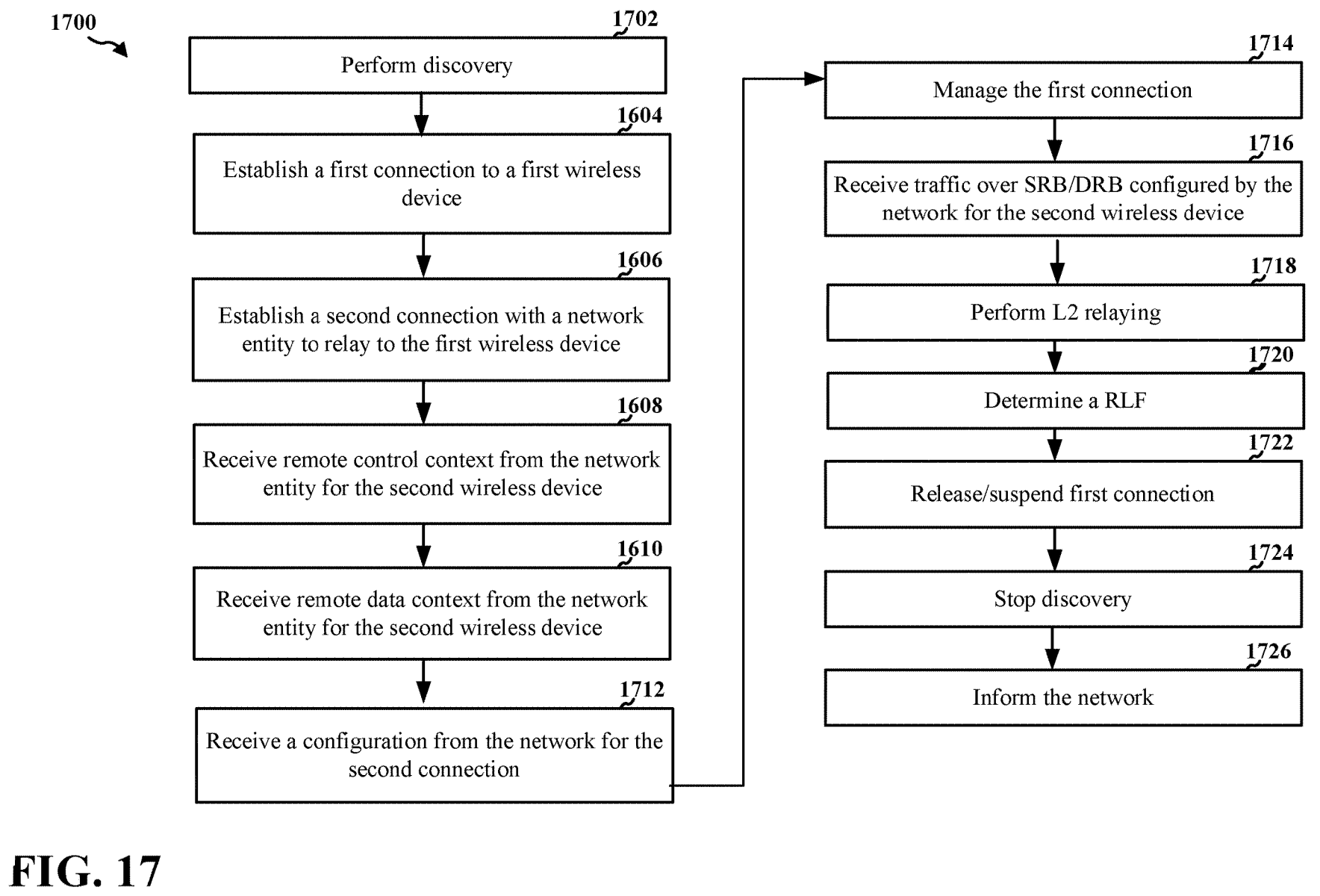

1702   Perform discovery

1604   Establish a first connection to a first wireless device

1606   Establish a second connection with a network entity to relay to the first wireless device 1608   Receive remote control context from the network entity for the second wireless device 1610   Receive remote data context from the network entity for the second wireless device 1712   Receive a configuration from the network for the second connection 1714   Manage the first connection 1716   Receive traffic over SRB/DRB configured by the network for the second wireless device 1718   Perform L2 relaying 1720   Determine a RLF 1722   Release/suspend first connection 1724   Stop discovery 1726   Inform the network

1902 Establish a first connection to a first wireless device over a first RAT

1904 Establish a second connection with a second wireless device for first RAT via the first wireless device 1906 Receive an indication during an establishment of the second connection that a connection is a remote connection

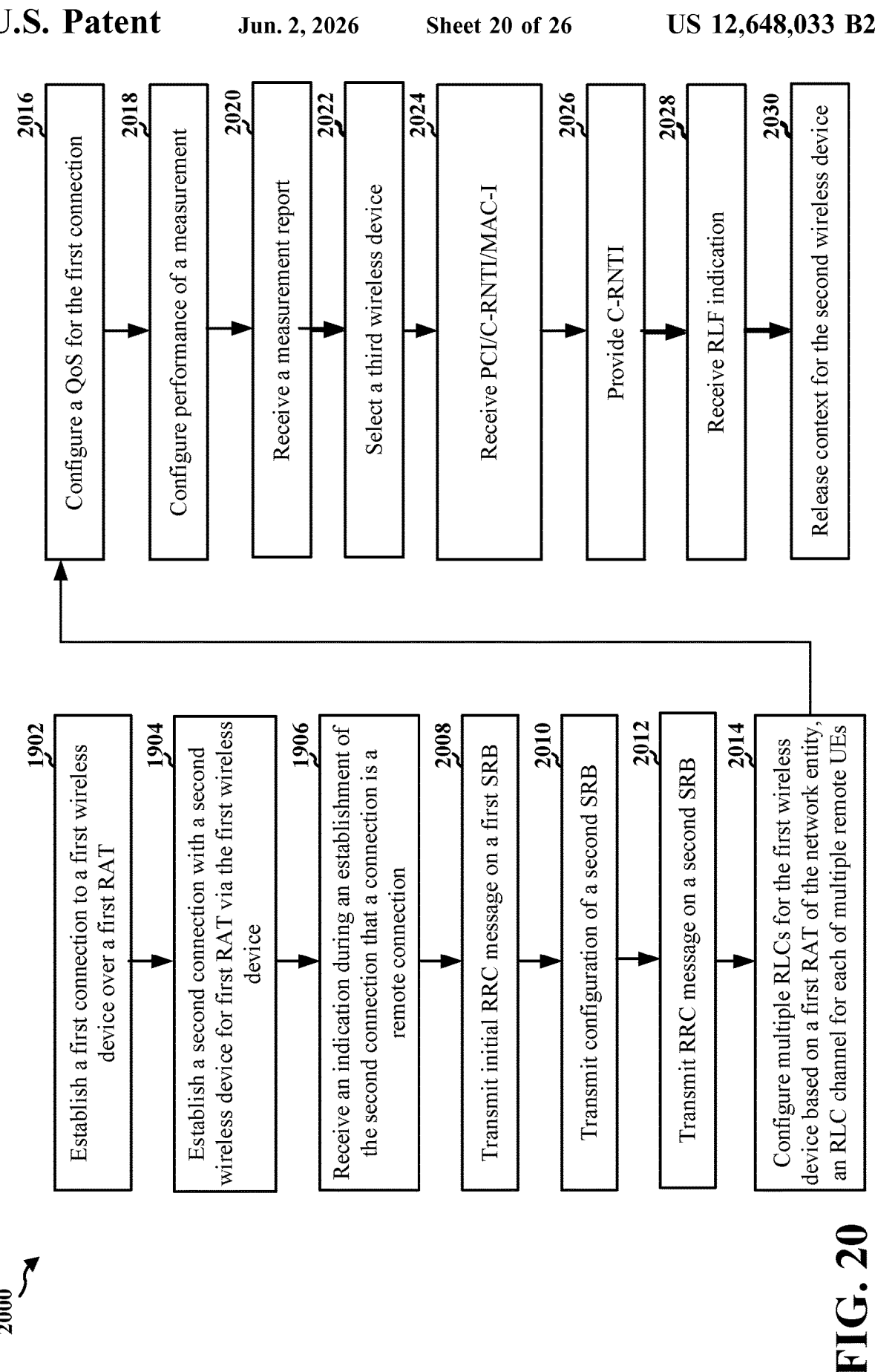

2000

2016 Configure a QoS for the first connection

2018 Configure performance of a measurement

2020 Receive a measurement report

2022 Select a third wireless device

2024 Receive PCI/C-RNTI/MAC-I

2026 Provide C-RNTI

2028 Receive RLF indication

2030 Release context for the second wireless device

1902 Establish a first connection to a first wireless device over a first RAT

1904 Establish a second connection with a second wireless device for first RAT via the first wireless device 1906 Receive an indication during an establishment of the second connection that a connection is a remote connection 2008 Transmit initial RRC message on a first SRB 2010 Transmit configuration of a second SRB 2012 Transmit RRC message on a second SRB 2014 Configure multiple RLCs for the first wireless device based on a first RAT of the network entity, an RLC channel for each of multiple remote UEs

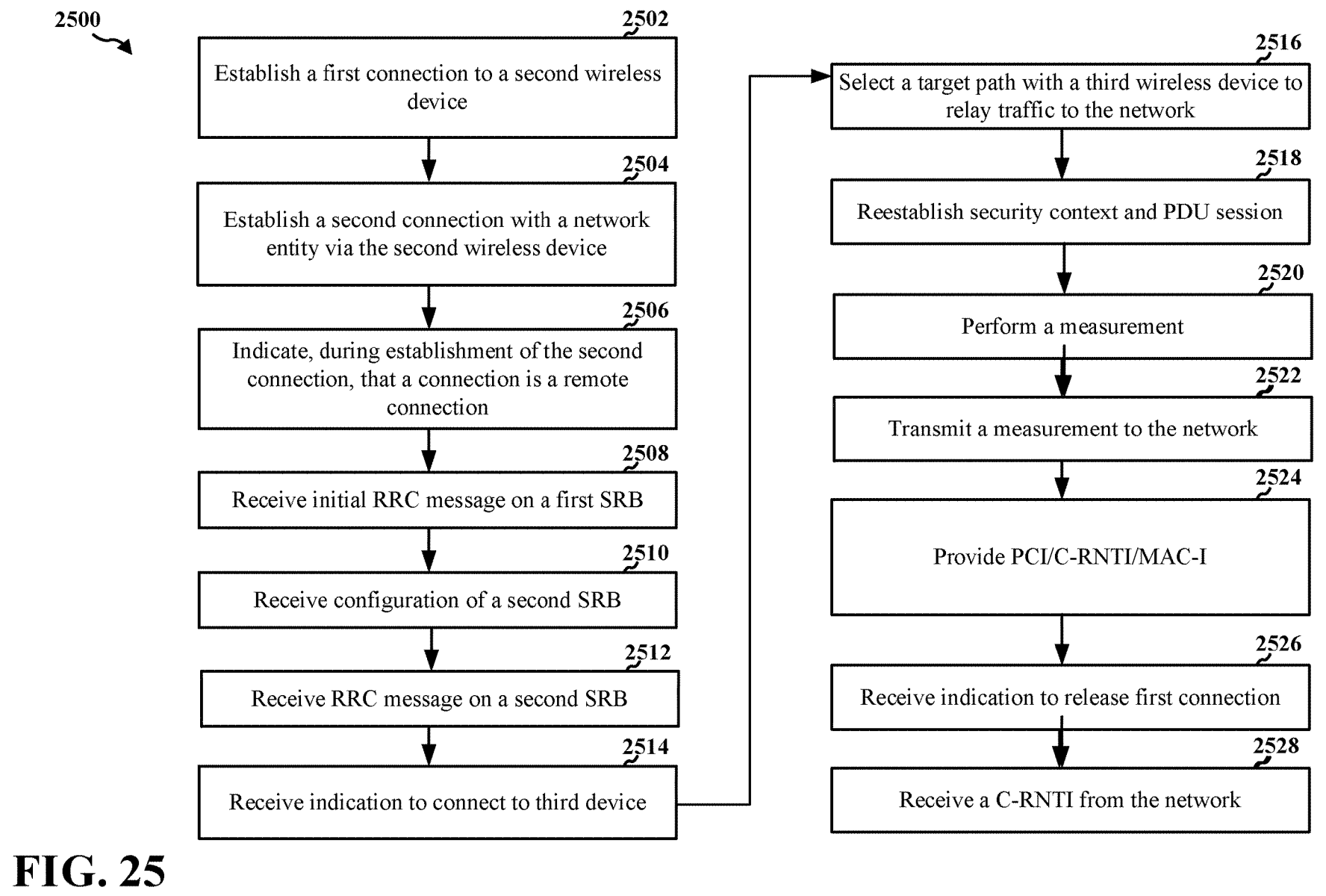

2502 — Establish a first connection to a second wireless device

2504 — Establish a second connection with a network entity via the second wireless device 2506 — Indicate, during establishment of the second connection, that a connection is a remote connection 2508 — Receive initial RRC message on a first SRB 2510 — Receive configuration of a second SRB 2512 — Receive RRC message on a second SRB 2514 — Receive indication to connect to third device 2516 — Select a target path with a third wireless device to relay traffic to the network 2518 — Reestablish security context and PDU session 2520 — Perform a measurement 2522 — Transmit a measurement to the network 2524 — Provide PCI/C-RNTI/MAC-I 2526 — Receive indication to release first connection 2528 — Receive a C-RNTI from the network

FIG. 25

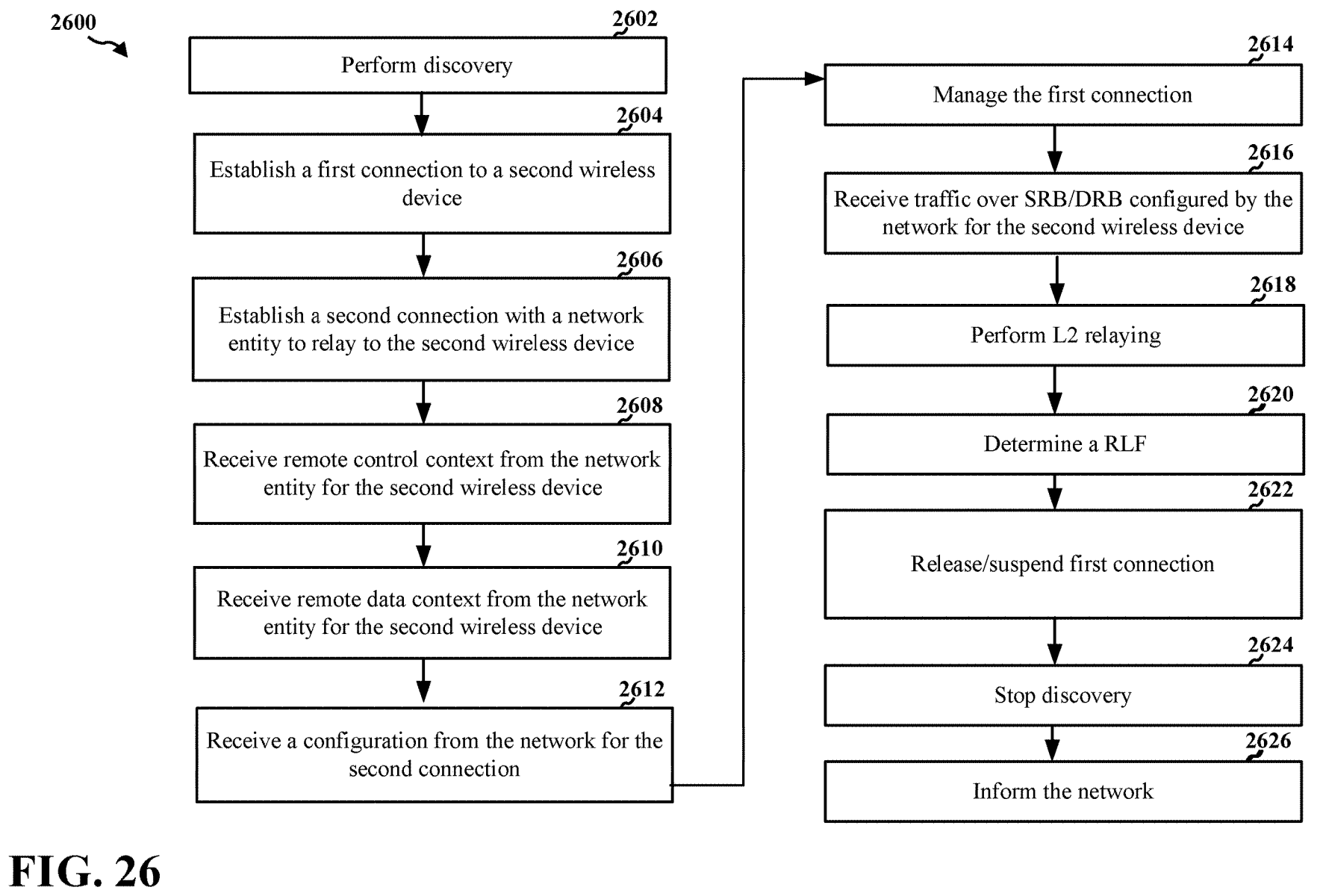

2614 Manage the first connection

2616 Receive traffic over SRB/DRB configured by the network for the second wireless device 2618 Perform L2 relaying 2620 Determine a RLF 2622 Release/suspend first connection 2624 Stop discovery 2626 Inform the network

2600

2602 Perform discovery

2604 Establish a first connection to a second wireless device

2606 Establish a second connection with a network entity to relay to the second wireless device 2608 Receive remote control context from the network entity for the second wireless device 2610 Receive remote data context from the network entity for the second wireless device 2612 Receive a configuration from the network for the second connection

FIG. 26

RELAY OF WIRELESS COMMUNICATION TO A NETWORK ENTITY BASED ON A REMOTE CONNECTION

CROSS REFERENCE TO RELATED APPLICATION(S)

This application is a National Stage Application filed under 35 U.S.C. § 371 of PCT International Application No. PCT/CN2021/113737, entitled "Relay of Wireless Communication to a Network Entity Based on a Remote Connection" and filed Aug. 20, 2021, which claims the benefit of and priority to International Application No. PCT/CN2020/110672, entitled "Relay of Wireless Communication to a Network Entity Based on a Remote Connection" and filed on Aug. 23, 2020, which are expressly incorporated by reference herein in their entirety.

INTRODUCTION

The present disclosure relates generally to communication systems, and more particularly, to wireless communication including relayed communication to a network entity.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a first wireless device. The first wireless device establishes a first connection to a second wireless device and establishes a second connection with a network entity via the second wireless device. The first wireless device indicates during an establishment of the second connection that a connection is a remote connection.

In an aspect of the disclosure, a method, a computer-readable medium, and an apparatus are provided for wireless communication at a first wireless device. The first wireless device establishes the first connection with a second wireless device to relay traffic between a network entity and the second wireless device and establishes a connection with the network entity to relay the traffic between the network entity and the second wireless device. The first wireless device receives a remote control context from the network entity for the second wireless device and receives a remote data context from the network entity for the second wireless device.

In an aspect of the disclosure, a method, is provided for wireless communication at a first wireless device. The method includes establishing a first connection to a second wireless device, establishing a second connection with a network entity via the second wireless device, and transmitting a message to the network entity via the second wireless device, the message indicating that the second connection is a remote connection.

In an aspect of the disclosure, an apparatus is provided for wireless communication at a first wireless device. The apparatus includes memory and at least one processor coupled to the memory, the memory and the at least one processor are configured to establish a first connection to a second wireless device, establish a second connection with a network entity via the second wireless device, and transmit a message to the network entity via the second wireless device, the message indicating that the second connection is a remote connection.

In an aspect of the disclosure an apparatus is provided for wireless communication at a first wireless device. The apparatus includes means for establishing a first connection to a second wireless device, means for establishing a second connection with a network entity via the second wireless device, and means for transmitting a message to the network entity via the second wireless device, the message indicating that the second connection is a remote connection.

In an aspect of the disclosure, a non-transitory computer-readable storage medium is provided for wireless communication at a first wireless device. The computer-readable storage medium stores computer executable code, the code when executed by a processor cause the processor to establish a first connection to a second wireless device, establish a second connection with a network entity via the second wireless device, and transmit a message to the network entity via the second wireless device, the message indicating that the second connection is a remote connection.

In an aspect of the disclosure, a method is provided for wireless communication at a first wireless device. The method includes establishing the first connection with a second wireless device to relay traffic between a network entity and the second wireless device, establishing a connection with the network entity to relay the traffic between the network entity and the second wireless device, and receiving a configuration from the network entity for the second connection between the network entity and the first wireless device for relaying the traffic to the second wireless device.

In an aspect of the disclosure, an apparatus is provided for wireless communication at a first wireless device. The apparatus includes memory and at least one processor coupled to the memory, the memory and the at least one processor are configured to establish the first connection with a second wireless device to relay traffic between a network entity and the second wireless device, establish a connection with the network entity to relay the traffic between the network entity and the second wireless device, and a configuration from the network entity for the second connection between the network entity and the first wireless device for relaying the traffic to the second wireless device.

In an aspect of the disclosure, an apparatus is provided for wireless communication at a first wireless device. The apparatus includes means for establishing the first connection with a second wireless device to relay traffic between a network entity and the second wireless device, means for establishing a connection with the network entity to relay the traffic between the network entity and the second wireless device, and means for receiving a configuration from the network entity for the second connection between the network entity and the first wireless device for relaying the traffic to the second wireless device.

In an aspect of the disclosure, a non-transitory computer-readable storage medium is provided for wireless communication at a first wireless device. The computer-readable storage medium stores computer executable code, the code when executed by a processor cause the processor to establish the first connection with a second wireless device to relay traffic between a network entity and the second wireless device, establish a connection with the network entity to relay the traffic between the network entity and the second wireless device, and receive a configuration from the network entity for the second connection between the network entity and the first wireless device for relaying the traffic to the second wireless device.

In an aspect of the disclosure, a method is provided for wireless communication at a network entity. The method includes establishing a first connection to a first wireless device over a first RAT, establishing a second connection with a second wireless device for first RAT via the first wireless device, and receiving an indication during an establishment of the second connection that a connection is a remote connection.

In an aspect of the disclosure, an apparatus is provided for wireless communication at a network entity. The apparatus includes memory and at least one processor coupled to the memory, the memory and the at least one processor configured to establish a first connection to a first wireless device over a first RAT, establish a second connection with a second wireless device for first RAT via the first wireless device, and receive an indication during an establishment of the second connection that a connection is a remote connection.

In an aspect of the disclosure, an apparatus is provided for wireless communication at a network entity. The apparatus includes means for establishing a first connection to a first wireless device over a first RAT, means for establishing a second connection with a second wireless device for first RAT via the first wireless device, and means for receiving an indication during an establishment of the second connection that a connection is a remote connection.

In an aspect of the disclosure, a non-transitory computer-readable storage medium is provided for wireless communication at a network entity. The computer-readable storage medium stores computer executable code, the code when executed by a processor cause the processor to establish a first connection to a first wireless device over a first RAT, establish a second connection with a second wireless device for first RAT via the first wireless device, and receive an indication during an establishment of the second connection that a connection is a remote connection.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 14 is a flowchart of a method of wireless communication.

FIG. 16 is a flowchart of a method of wireless communication.

FIG. 17 is a flowchart of a method of wireless communication.

FIG. 20 is a flowchart of a method of wireless communication.

FIG. 25 is a flowchart of a method of wireless communication.

FIG. 26 is a flowchart of a method of wireless communication.

DETAILED DESCRIPTION

Figure 1:
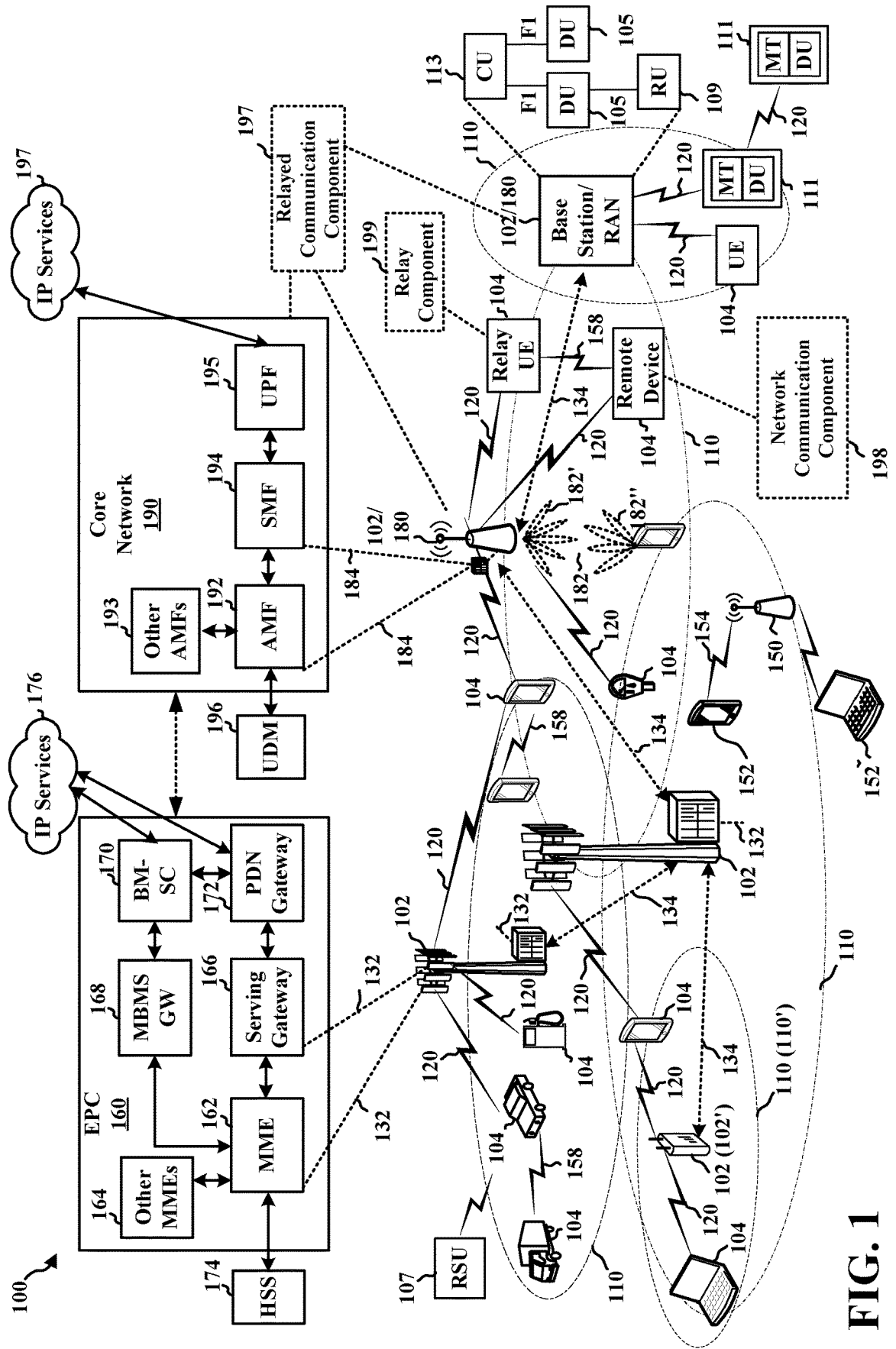
FIG. 1 is a diagram illustrating an example of a wireless communications system and an access network.

A wireless device may support communication with a network entity over a connection based on a first radio access technology (RAT) (e.g., a Uu interface) and may support communication with another wireless device over a connection based on a different RAT (e.g., a PC5 interface, a Bluetooth low energy (BLE) interface, a WiFi-D interface, a WiFi interface, or a bluetooth (BL) regular interface, etc.). In some circumstances, the wireless device may not be able to reach the network entity using the Uu interface or may determine that the Uu interface is not suitable for current traffic criteria.

Aspects presented herein enable the wireless device to establish a local connection with the second wireless device (e.g., based on the PC5 interface, the BLE interface, the WiFi-D interface, WiFi interface, the BL interface, etc.) to relay communication between the first wireless device and the network entity. The local connection may be a remote connection that is established based on a discovery procedure of the RAT of the local connection and may be managed by the second wireless device rather than the network entity. Aspects presented herein enable multiple subscriptions (e.g., of the first wireless device and the second wireless device) to share a single connection with the network entity. The second subscription may be hosted remotely on the first wireless device as a tethered device. Each subscription may be associated with a separate radio resource control (RRC)

instance at the control unit (CU) of the network entity, e.g., a base station. Each RRC instance may be associated with a separate security context and corresponding data context.

The network entity may configure the second wireless device (which may be referred to as a relay device) with a radio link control (RLC) channel for one or more remote device signaling radio bearers (SRBs) and an RLC channel for one or more remote device data radio bearers (DRBs). For example, the second wireless device may act as a relay for multiple user equipment (UEs), and the network entity may configure the second wireless device with an individual RLC channel for an SRB and an individual RLC channel for a DRB for each of the UEs.

The first wireless device may provide capability information to the network entity, e.g., indicating the type of RAT of the local connection between the first wireless device and the second wireless device and/or indicating a type of relay that the first wireless device supports. For example, the first wireless device may indicate whether it supports a first type of layer 2 (L2) relay in which the connection between the first wireless device and the second wireless device is configured by the network entity or a second type of L2 relay in which the connection between the first wireless device and the second wireless device is controlled locally.

As the first wireless device moves, the first wireless device may reselect to a different second wireless device, e.g., which may be selected by the first wireless device or may be indicated by the network entity. The first wireless device may also reselect from a first base station to a second base station. The UE may provide information such as a prior physical cell identity (PCI), a cell radio network temporary identifier (C-RNTI) for the first wireless device, and/or a short medium access control identity (MAC-I) to the network entity to the network entity. The network entity may use the prior PCI, C-RNTI and short MAC-I to retrieve context information for the first wireless device from a prior serving base station.

The first wireless device may be configured by the network entity to monitor the neighbor cells for the first RAT (i.e. Uu cells). The first wireless may continue to perform measurements, e.g., radio resource management (RRM) measurements, to determine whether a direct connection is available or suitable with the network entity. The first wireless device may send a measurement report to the network entity, e.g., either directly or via the second wireless device.

The first wireless device may receive a C-RNTI from the network entity in an RRC setup message, an RRC resume message, or an RRC reestablishment message.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FP-GAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EE-PROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described techniques. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, aggregated or disaggregated components (e.g., associated with a user equipment (UE) and/or a base station), end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184 (e.g., Xn interface), and the third backhaul links 134 may be wired or wireless.

In some aspects, a base station 102 or 180 may be referred to as a RAN and may include aggregated or disaggregated components. As an example of a disaggregated RAN, a base station may include a central unit (CU), one or more distributed units (DU), and/or one or more remote units (RU). For example, the example of FIG. 1 illustrates a disaggregated RAN including a CU 113, a DU 105, an/or an RU 109. In some examples, a RAN may be disaggregated with a split between the RU 109 and an aggregated CU/DU. In some examples, a RAN may be disaggregated with a split between the CU 113, the DU 105, and the RU 109. In some examples, a RAN may be disaggregated with a split between the CU 113 and an aggregated DU/RU. The CU 113 and the DU 105 may be connected via an F1 interface. The DU 105 and the RU 109 may be connected via a fronthaul interface. A connection between the CU 113 and the DU 105 may be referred to as a midhaul, and a connection between the DU 105 and the RU 109 may be referred to as a fronthaul. The connection between the CU 113 and the core network may be referred to as the backhaul. The RAN may be based on a functional split between various components of the RAN, e.g., between the CU 113, the DU 105, or the RU 109. The CU may be configured to perform one or more aspects of a wireless communication protocol, e.g., handling one or more layers of a protocol stack, and the DU(s) may be configured to handle other aspects of the wireless communication protocol, e.g., other layers of the protocol stack. In different implementations, the split between the layers handled by the CU and the layers handled by the DU may occur at different layers of a protocol stack. As one, non-limiting example, the DU 105 may provide a logical node to host a radio link control (RLC) layer, a medium access control (MAC) layer, and at least a portion of a physical (PHY) layer based on the functional split. An RU may provide a logical node configured to host at least a portion of the PHY layer and radio frequency (RF) processing. The CU 113 may host higher layer functions, e.g., above the RLC layer, such as a service data adaptation protocol (SDAP) layer, a packet data convergence protocol (PDCP) layer. In other implementations, the split between the layer functions provided by the CU, DU, or RU may be different.

An access network, such as the example access network 100 of FIG. 1, may include one or more integrated access and backhaul (IAB) nodes 111 that exchange wireless communication with the UE 104 or another IAB node to provide access and backhaul to a core network. In an IAB network of multiple IAB nodes, an anchor node may be referred to as an IAB donor. The IAB donor may be a base station 102 or 180 that provides access to the core network 190 or the EPC 160 and/or control to the one or more IAB nodes 111. The IAB donor may include the CU 113 and the DU 105. In some examples, the one or more IAB nodes 111 may include the DU 105 and a mobile termination (MT). In some such examples, the DU 105 of the IAB node may operate as a parent node, and the MT may operate as a child node.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Some non-limiting examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 23. Although the following description, including the example slot structure of FIG. 23, may provide examples for sidelink communication in connection with 5G NR, the concepts described herein may be applicable to other similar areas, such as LTE, LTE-A, CDMA, GSM, and other wireless technologies.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30

GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 107. The IP Services 107 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, a first wireless device (e.g., remote device 103), may include a network communication component 198 that is configured to establish a first connection to a second wireless device (e.g., UE 104), establish a second connection with a network entity (e.g., base station 102 or 180) via the second wireless device (e.g., the relay UE 104), and to transmit a message to the network entity via the second wireless device, the message indicating that the first connection is a remote connection. The network communication component 198 may be configured to transmit the message to the network entity during an establishment of the second connection. The first wireless device may be another UE, in some examples.

A UE 104 (which may be referred to herein as a relay UE), or another type of wireless device, may include a relay component 199 configured to establish the first connection with a wireless device (e.g., remote device 103) to relay traffic between a network entity (e.g., the base station 102 or 180) and the wireless device, establish a connection with the network entity to relay the traffic between the network entity and the wireless device, receive a configuration from the network entity for the second connection between the network entity and the first wireless device for relaying the traffic to the second wireless device.

A network entity, such as a base station 102 or 180 or other network entity, may include a relayed communication component 197 configured to establish a first connection to a first wireless device (e.g., relay UE 14) over a first RAT, establish a second connection with a second wireless device (e.g., remote device 103) for the first RAT via the first wireless device and receive an indication during an establishment of the second connection that a connection is a remote connection.

Although the following description may be focused on 5G NR, the concepts described herein may be applicable to other similar areas, such as LTE, LTE-A, CDMA, GSM, and other wireless technologies.

Figures 2A, 2B, 2C, 2D:
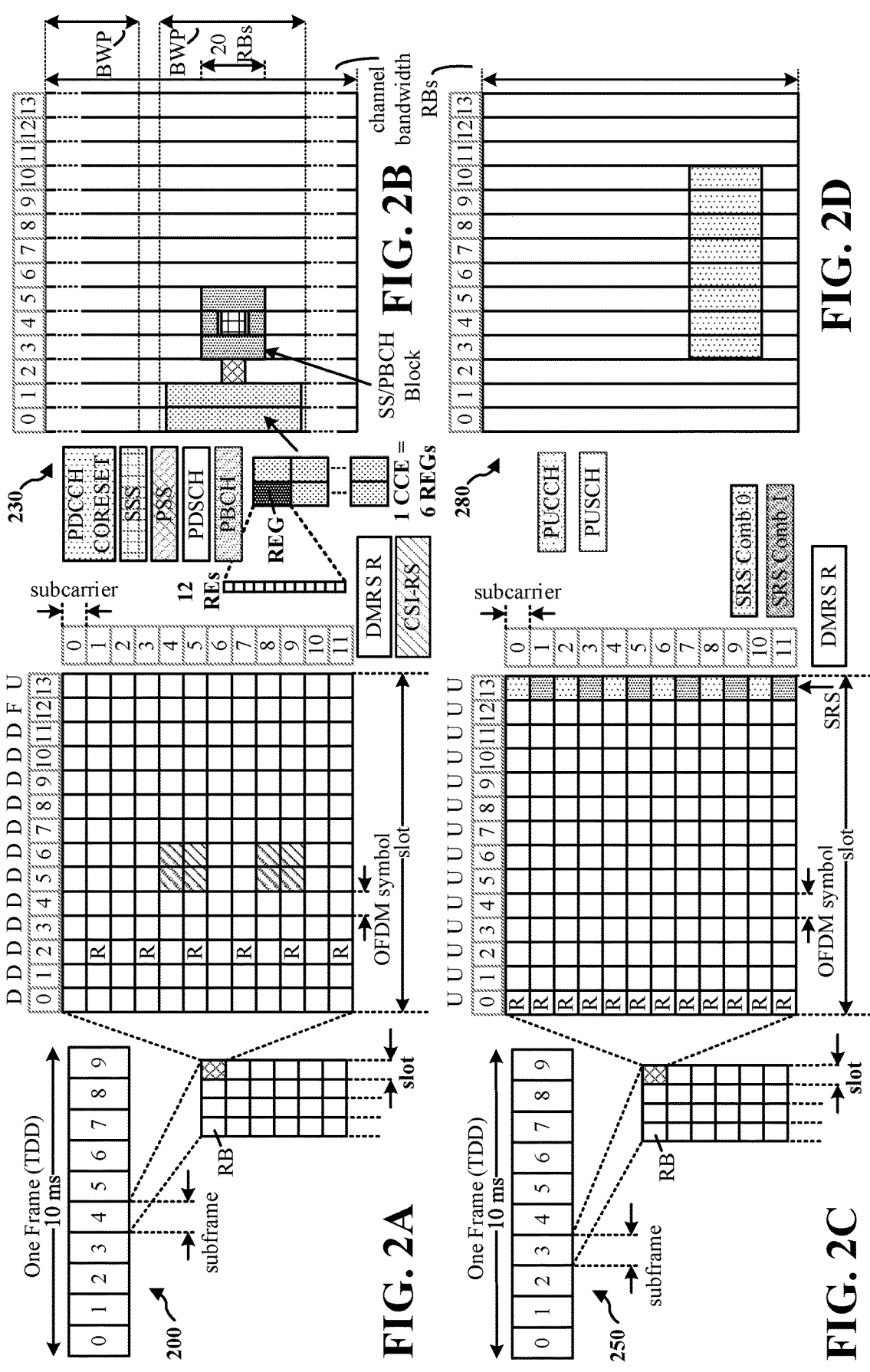
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended.

For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement (ACK) (HARQ-ACK) feedback (i.e., one or more HARQ ACK bits indicating one or more ACK and/or negative ACK (NACK). The PUSCH carries data, and may additionally be used to carry a buffer status report (BSR), a power headroom report (PHR), and/or UCI.

Figure 24:
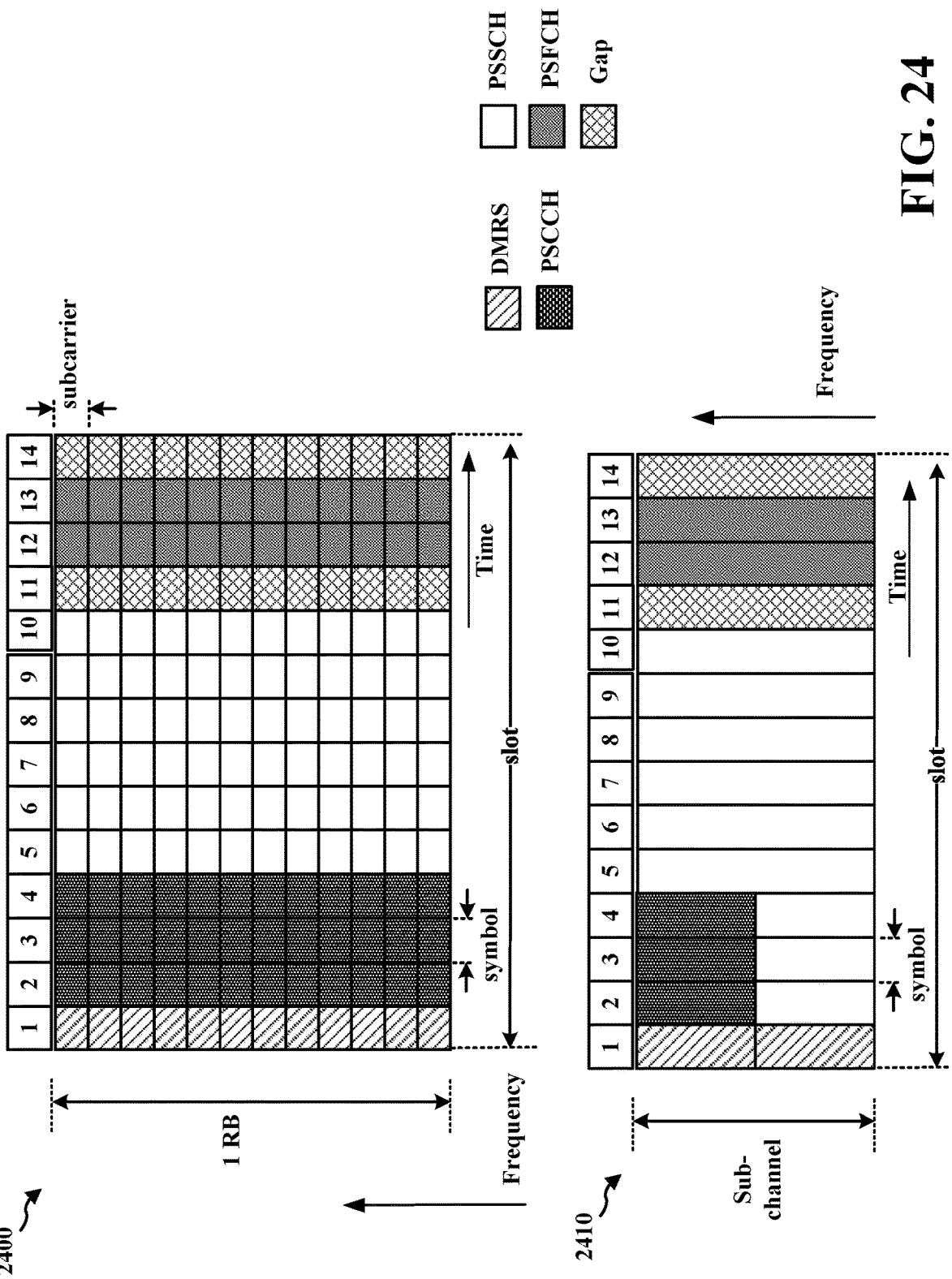
FIG. 24 illustrates example aspects of a sidelink slot structure.

FIG. 24 includes diagrams 2400 and 2410 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 24 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single resource block of a single slot transmission, e.g., which may correspond to a 0.5 ms transmission time interval (TTI). A physical side-link control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 2410 in FIG. 24 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 24, some of the REs may include control information in PSCCH and some REs may include demodulation RS (DMRS). At least one symbol may be used for feedback. FIG. 24 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 24. Multiple slots may be aggregated together in some aspects.

Figure 3:
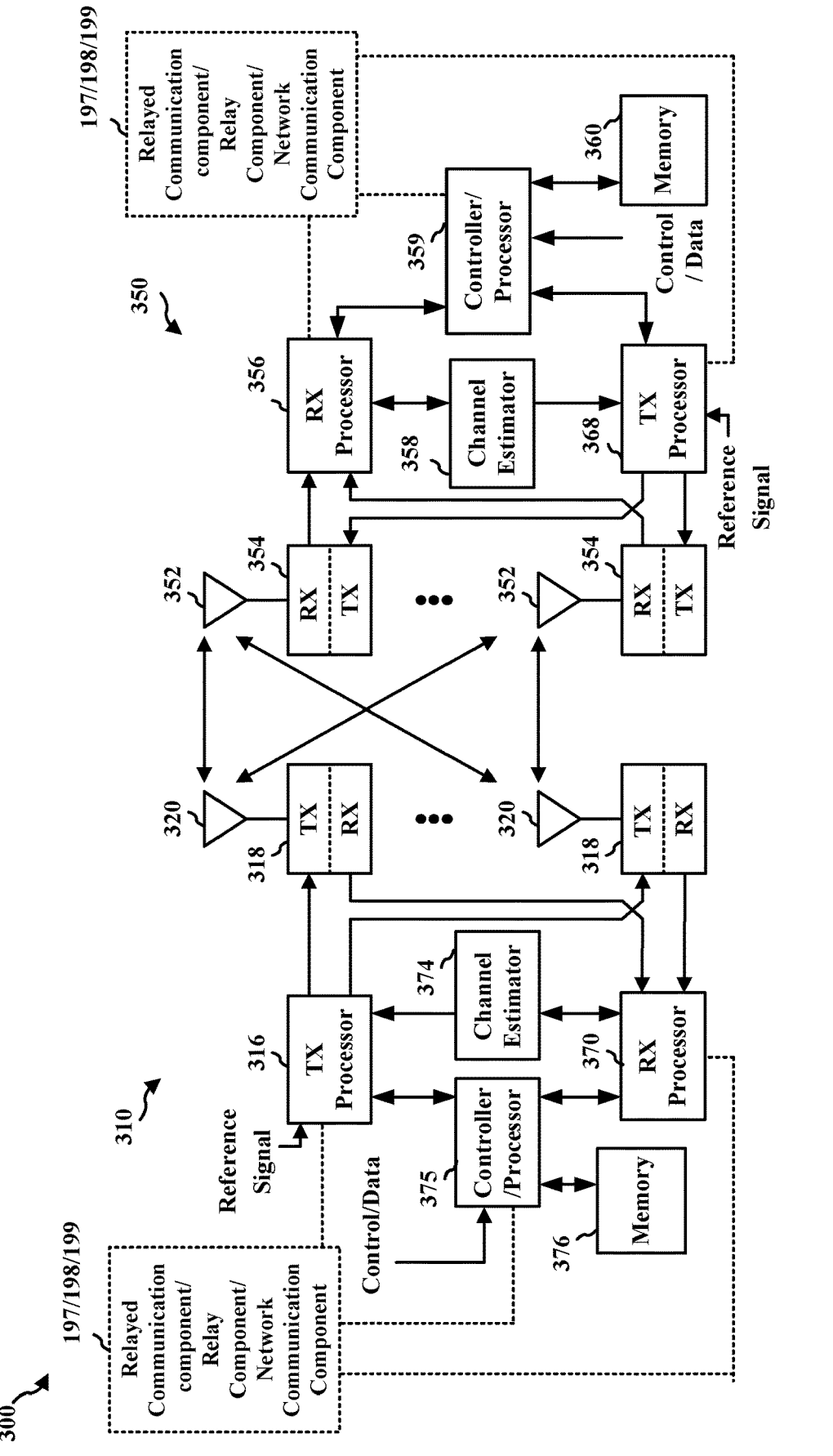
FIG. 3 is a diagram illustrating an example of a base station and user equipment (UE) in an access network.

FIG. 3 is a block diagram 300 of a wireless device 310 in communication with another wireless device 350 in an access network. In some examples, the wireless device 310 may be a bases station (e.g., the base station 102 or 180) and the wireless device 350 may be a UE (e.g., UE 104, such as relay UE 104). In some examples, the wireless device 350 may be the remote device 103, which may be another UE. In some examples, the wireless device 310 may be the relay UE 104 and the wireless device 350 may be the remote device 103.

In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the wireless device 350. Each spatial stream may then be provided to a different antenna 320 via a separate transmitter 318 TX. Each transmitter 318 TX may modulate a radio frequency (RF) carrier with a respective spatial stream for transmission.

At the wireless device 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the wireless device 350. If multiple spatial streams are destined for the wireless device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub carrier of the OFDM signal. The symbols on each subcarrier, and the reference signal, are recovered and demodulated by determining the most likely signal constellation points transmitted by the wireless device

310. These soft decisions may be based on channel estimates computed by the channel estimator 358. The soft decisions are then decoded and deinterleaved to recover the data and control signals that were originally transmitted by the wireless device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the wireless device 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the wireless device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the wireless device 310 in a manner similar to that described in connection with the receiver function at the wireless device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the wireless device 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359, the TX processor 316, the RX processor 370, and the controller/processor 375 may be configured to perform aspects in connection with the relayed communication component 197, the relay component 199, or the network communication component 198 of FIG. 1. For example, if the wireless device 310 or 350 is a base station, the wireless device 310 may include the relayed communication component 197. If the wireless device 310 or 350 is a UE, the wireless device may include the relay component 199 and/or the network communication component 198.

Figure 4:
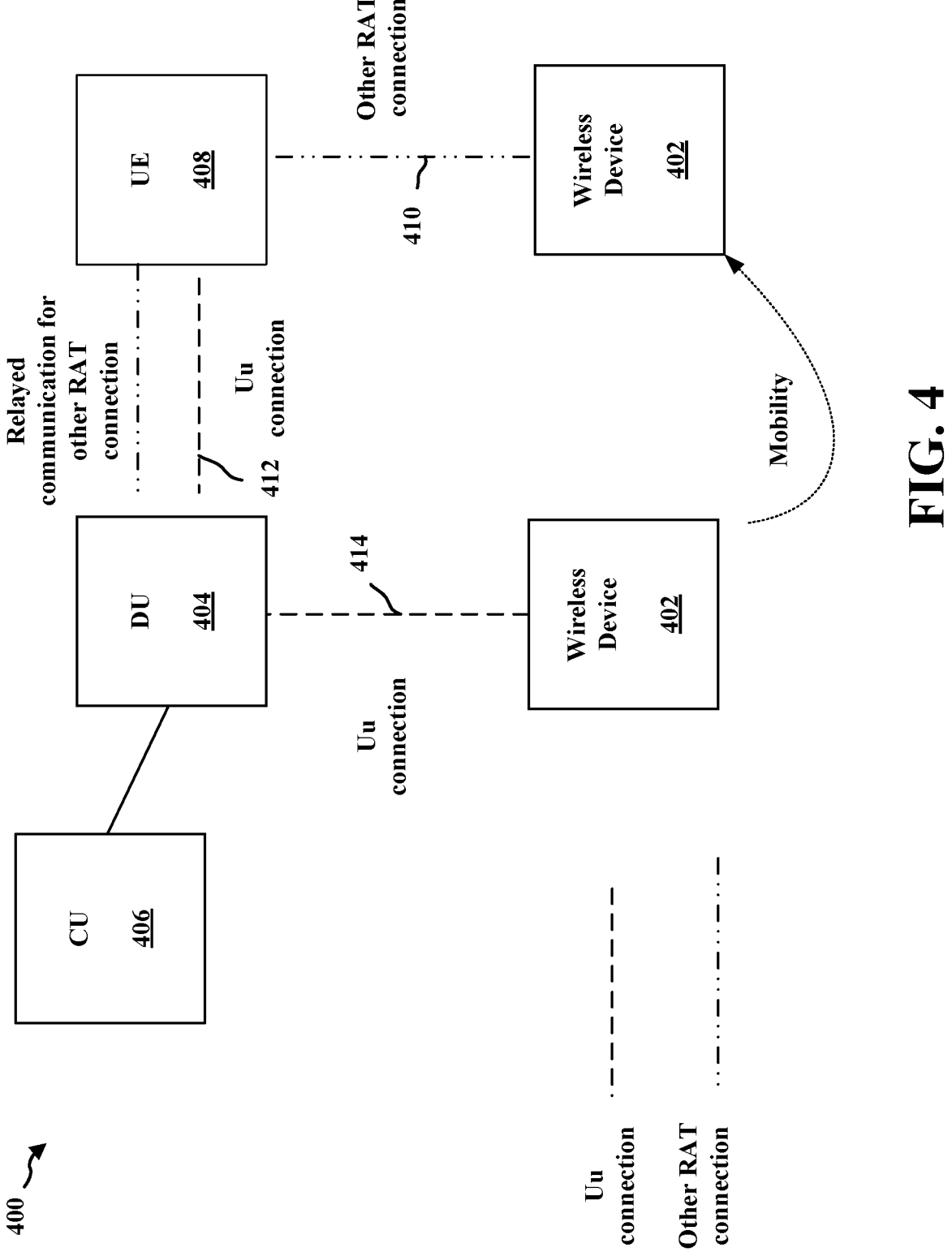
FIG. 4 illustrates a diagram of a first wireless device establishing a connection with a second wireless device in order to exchange communication with a network entity.

A wireless device may support communication with a network entity over a connection based on a first RAT (e.g., a Uu interface) and may support communication with another wireless device over a connection based on a different RAT (e.g., a PC5 interface, a BLE interface, a WiFi-D interface, a WiFi interface, or a BL regular interface, etc.). For example, the wireless device may be another UE having a reduced capability. In non-limiting examples, the wireless device may be a wearable, a sensor, etc., which may be capable of establishing a Uu connection with a network. FIG. 4 illustrates an example diagram showing the wireless device 402 having a Uu connection with a network (e.g., a distributed unit (DU) 404 and control unit (CU) 406 of a base station).

In some circumstances, the wireless device 402 may not be able to reach the network entity (e.g., DU 404 and CU 406) using the Uu interface or may determine that the Uu interface is not suitable for current traffic criteria. In some aspects, the suitability may be based on a quality of a Uu connection. As an example, the wireless device may move to a location with reduced coverage by the network.

Aspects presented herein enable the wireless device 402 to establish a local connection with a second wireless device (e.g., based on the PC5 interface, the BLE interface, the WiFi-D interface, WiFi interface, the BL interface, etc.) to relay communication between the wireless device 402 and the network entity (e.g., DU 404 and CU 402). FIG. 4 illustrates an example in which the second wireless device may be a UE 408, although other wireless devices may also relay the communication to the wireless device 402. In examples described herein, the UE 408 may be described as a "relay UE" and the wireless device 402 may be referred to as a "remote UE." However, the concepts presented herein are not limited to UEs and may be applied for other wireless devices.

The local connection 410 may be referred to as a remote connection that is established based on a discovery procedure of the RAT of the local connection and may be managed by the second wireless device or the first wireless device itself rather than the network entity. Aspects presented herein enable multiple subscriptions (e.g., a subscription of the multiple UE 408 and the wireless device 402) to share a single connection 412 with the network entity. The second subscription may be hosted remotely on the first wireless device 402 as a tethered device, e.g., that is tethered to the UE 408 using the local RAT. Each subscription may be associated with a separate RRC instance at the CU 406 of the network entity, e.g., a base station. Each RRC instance may be associated with a separate security context (e.g., an access stratum (AS) context and a non-access stratum (NAs) context). Each RRC instance may be associated with a separate control plane context at central unit control plane (CU-CP) and a user plane context at central unit user plane (CU-UP). The separate RRC instances help the network to distinguish between the subscription of the relay UE 408 and the remote device (e.g., the wireless device 402).

Aspects presented herein enable end-to-end security for the wireless device 402 and enables seamless mobility for the wireless device 402 by enabling the wireless device to establish a connection with the network entity via the relay UE 408 when the Uu connection to the DU 404 is not available or is not suitable for current traffic. In some aspects, the suitability may be based on a quality of a Uu connection. The UE may determine that the Uu connection is not available or is not suitable based on a quality measurement being below a threshold. In some examples, the UE may have a connection with the network entity, and a quality of the connection may change. Thus, an unsuitable connection may be based on a change in a quality of the connection.

Figure 5:
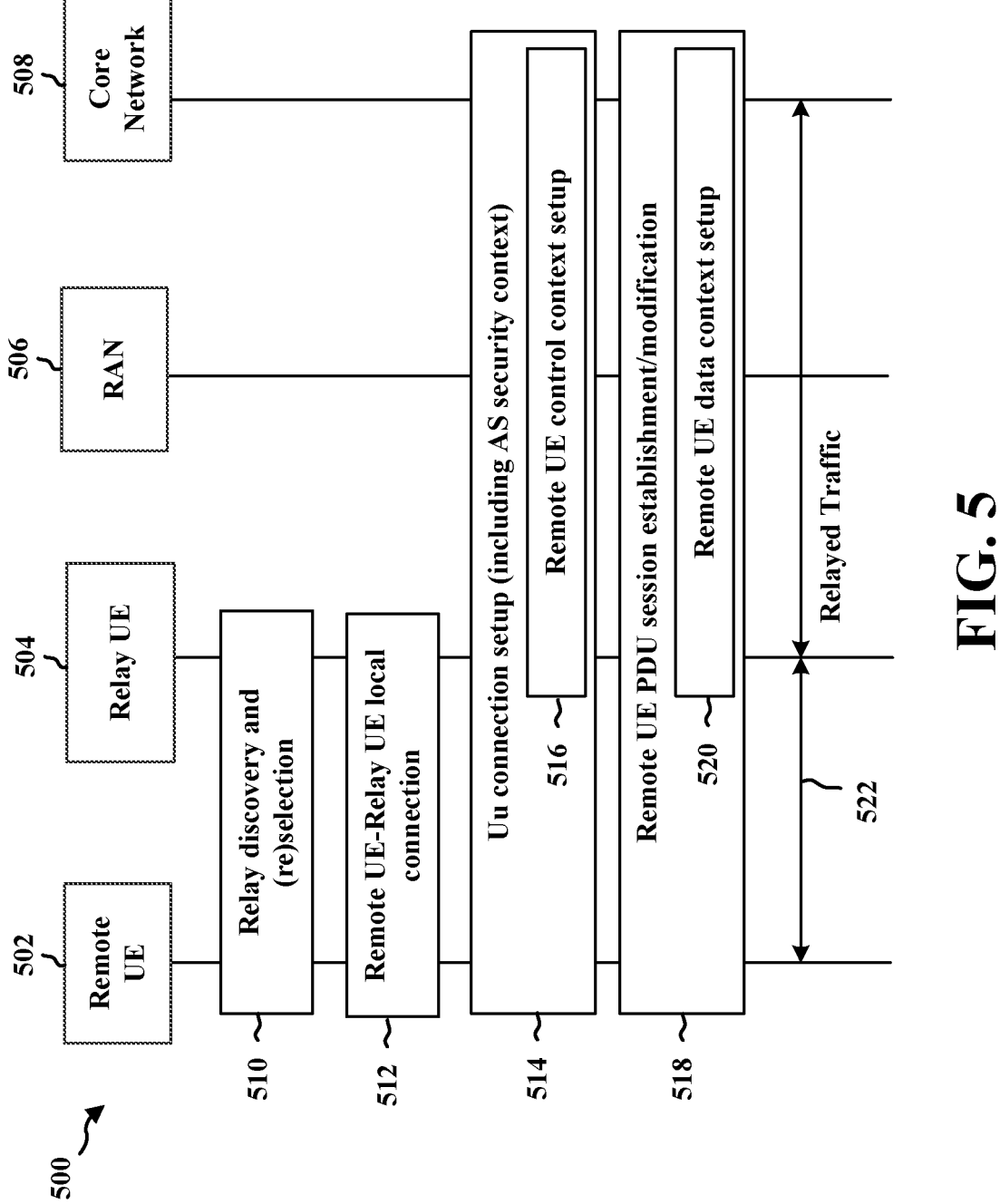
FIG. 5 is a communication flow diagram showing communication exchanged for a first wireless device to establish a connection with a second wireless device in order to exchange communication with a network entity.

FIG. 5 illustrates an example communication flow 500 between a remote UE 502, a relay UE 504, a RAN 506, and a core network 508 to establish a connection between the remote UE 502 and the network (e.g., the RAN 506 and/or core network 508). The remote UE 502 may correspond to the remote device 103 or wireless device 402. The relay UE 504 may correspond to the relay UE 104 or 408. At 510, the remote UE 502 and relay UE 504 discovery each other using a discovery procedure based on a locate RAT (e.g., PC5, WiFi, BLE, BL, etc.). Although illustrated as a single step, there may be multiple steps involved in the discovery or reselection procedure 510. For example, the remote UE 502 may discover one or more relay UEs within a range of the remote UE 502. The remote UE 502 may discovery the remote UE 502 based on a discovery message transmitted by the remote UE 502. In some examples, the remote UE may advertise a capability to provide a relay service, e.g., a second type of L2 relay. The second type of L2 relay may be referred to as a remote connection in some examples. The second type of L2 relay may be controlled or managed locally, e.g., by the relay UE and/or the wireless device. For example, the connection between the remote UE 502 and the relay UE 504 may be managed by the remote UE 502 and the relay UE 504 without configuration by a network (e.g., RAN 506 or core network 508). The remote UE 502 and/or the relay UE 504 may provide additional information in the discovery process.

At 512, after discovering the relay UE 504, the remote UE 502 and the remote UE may establish a local connection (e.g., a PC5, WiFi, BLE, BL, or other non-Uu connection). The relay UE 504 and the remote UE 502 may establish the connection, at 512, without control from the RAN 506, e.g., using a local RAT connection setup procedure.

At 514, the remote UE establishes one or more of an AS connection with a network entity (e.g., RAN 506 or core network 508) via the relay UE 504. The remote UE 502 sends communication for the connection setup to the relay UE 504 that the relay UE 504 transmits the communication to the network. The network sends the connection setup communication for the remote UE 502 to the relay UE 504. The network configures, at the relay UE 504, a control context setup for the remote UE, at 516. At 518, the network establishes or modifies a PDU session for the remote UE 502, including configuring, at the relay UE 504, a data context set up for the remote UE, at 520.

Thus, the remote UE establishes an AS connection, NAS connection, and PDU session(s) with the network (e.g., the RAN 506 and/or core network 508) via the relay UE 504 using the local connection established at 512. The network configures the remote UE control and data context (e.g., for Uu control and data) at the relay UE 504.

Then, the remote UE 502 and the network (e.g., RAN 506 or core network 508) may exchange traffic 522 via the relay UE 504 for the PDU session configured for the remote UE 502.

The remote UE may determine to connect to a relay UE for various reasons. In some examples, the remote UE 502 may determine that the network is not reachable with a direct Uu connection. For example, in FIG. 4, the wireless device 402 may have a Uu connection 414 at one point and may later determine that the wireless device 402 cannot reach the network with a direct Uu connection 414. In response, the wireless device 402 may then search for, or attempt to discover, a relay UE 408 capable of providing a remote connection relay service for the wireless device 402. In other examples, the remote UE 502 may be capable of establishing a Uu connection with the network yet may determine that the direct connection between the remote UE and the network is not suitable for a particular type of traffic that the remote UE will exchange with the network. In response, the remote UE 502 may then search for, or attempt to discover, a relay UE 504 capable of providing a remote connection relay service for the wireless device (e.g., remote UE 502).

After selecting the relay UE 504 and establishing the connection, at 512, the remote UE may continue to monitor reselection criteria based on the local RAT selection procedure. For example, the remote UE 502 and/or the relay UE 504 may be mobile, and the coverage that the relay UE 504 provides under the local RAT may vary. At times, the remote UE 502 may discover a different relay UE 504 that meets the reselection criteria for the local RAT and may reselect to the other relay UE 504.

FIG. 5 illustrates the relay UE 504 providing a single hop to the network for the tethered connection with the remote UE 502. Although FIG. 5 illustrates a single remote UE 502, in some examples, the relay UE 504 may provide a relay service to multiple remote devices over the local RAT. In some examples, the relay UE may support up to a particular number of remote UEs. The relay UE 504 may support a dedicated Uu radio link control (RLC) channel for each remote UE. The relay UE and the base station (e.g., RAN 506) may support the relaying to the remote UE 502 without an adaptation layer. The relay UE may use a one-to-one mapping between the Uu RLC channel configured for the remote UE at the relay UE and the local RAT connection to the remote UE. For example, the relay UE 504 may relay traffic from the base station to the remote UE without identifiers for bearer mapping. The remote UE data may be sent over Uu signaling radio bearers (SRBs) and data radio bearers (DRBs). On the local link between the remote UE 502 and the relay UE 504, the relay UE 504 may manage the local connection quality of service (QoS) and context. On the Uu link between the relay UE 504 and the network, the relaying RLC channels and QoS may be configured by the base station based on the remote UE's DRBs. The network may send the remote UE 502 user plane data after performing the connection setup, at 514 and PDU session setup, at 518.

Figure 6:
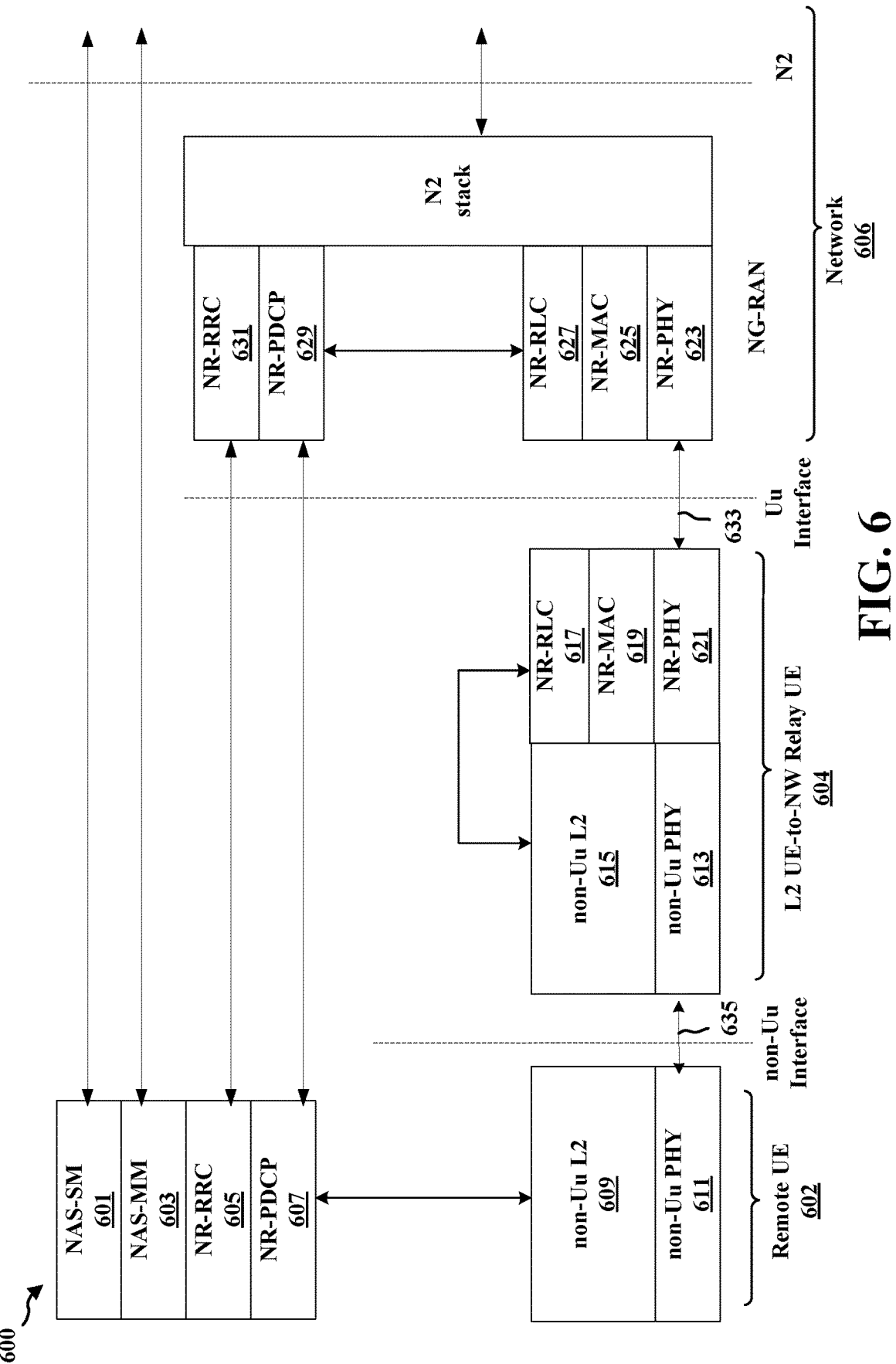
FIG. 6 is an example control plane stack illustrating layers for a first wireless device to establish a connection with a second wireless device for a first type of relay communication with a network entity.

FIG. 6 illustrates an example control plane stack 600 for relaying traffic between a remote UE 602 and a network 606 via a relay UE 604. The control plane protocol stack is a part of the remote UE 602 protocol stack, e.g., the NAS session management (NAS-SM) layer 601, NAS mobility management (NAS-MM) layer 603, RRC layer 605, and PDCP layer 607 for the Uu communication terminate at the remote UE 602. Thus, the remote UE has the NAS entities and the AS entities. FIG. 6 illustrates the example for NR (e.g., with an NR NAS-SM, NR-MM, NR RRC, and NR PDCP) merely to illustrate the concept of a RAT used with the network 606. The aspects presented herein may be similarly applied for LTE or other RATs. For example, on the network side, the RRC layer 631 and the PDCP layer 629 terminate at the base station, e.g., RAN. The traffic (e.g., the control traffic) passes over the local RAT between the remote UE 602 and the relay UE 604, e.g., via the non-Uu layer 2 (L2) 609 and a non-Uu physical (PHY) layer 611 that exchanges communication with the non-Uu PHY layer 613 of the relay UE 604.

The non-Uu L2 615 provides the communication to an RLC 617 for a different RAT than the local connection, e.g., an NR connection in the example in FIG. 6. The RLC passes the communication to a MAC layer 619 for the other RAT, which provides the communication to a PHY layer 621 for the other RAT. The communication is exchanged over a Uu interface between the PHY layer 621 of the relay UE 604 and the PHY layer 623 of the network 606. The PHY layer 623 provides the communication to the MAC layer 625 and the RLC layer 627, PDCP 629 and SDAP 631 for the network. As illustrated by the arrows in FIG. 6, messages may be sent from the network 606 for the remote UE 602 via the relay UE 604 or may be sent from the remote UE 602 to the network 606 via the relay UE 604. Although FIG. 6 illustrates the stack for a single remote UE 602, the relay UE 604 may have a unique Uu channel 633 for each remote UE that it supports. For each message for the unique Uu connection 633 for a remote UE 602, the relay UE 604 just relays the communication at the L2 layer to the non-Uu connection 635. The relay UE 604 and the network 606 know that the Uu connection 633 corresponds to the remote UE, e.g., maps to the remote UE. The relay UE 604 may use a direct mapping between the Uu link 633 and the non-Uu link 635 to relay the message over the L2 without an adaptation layer.

Figure 7:
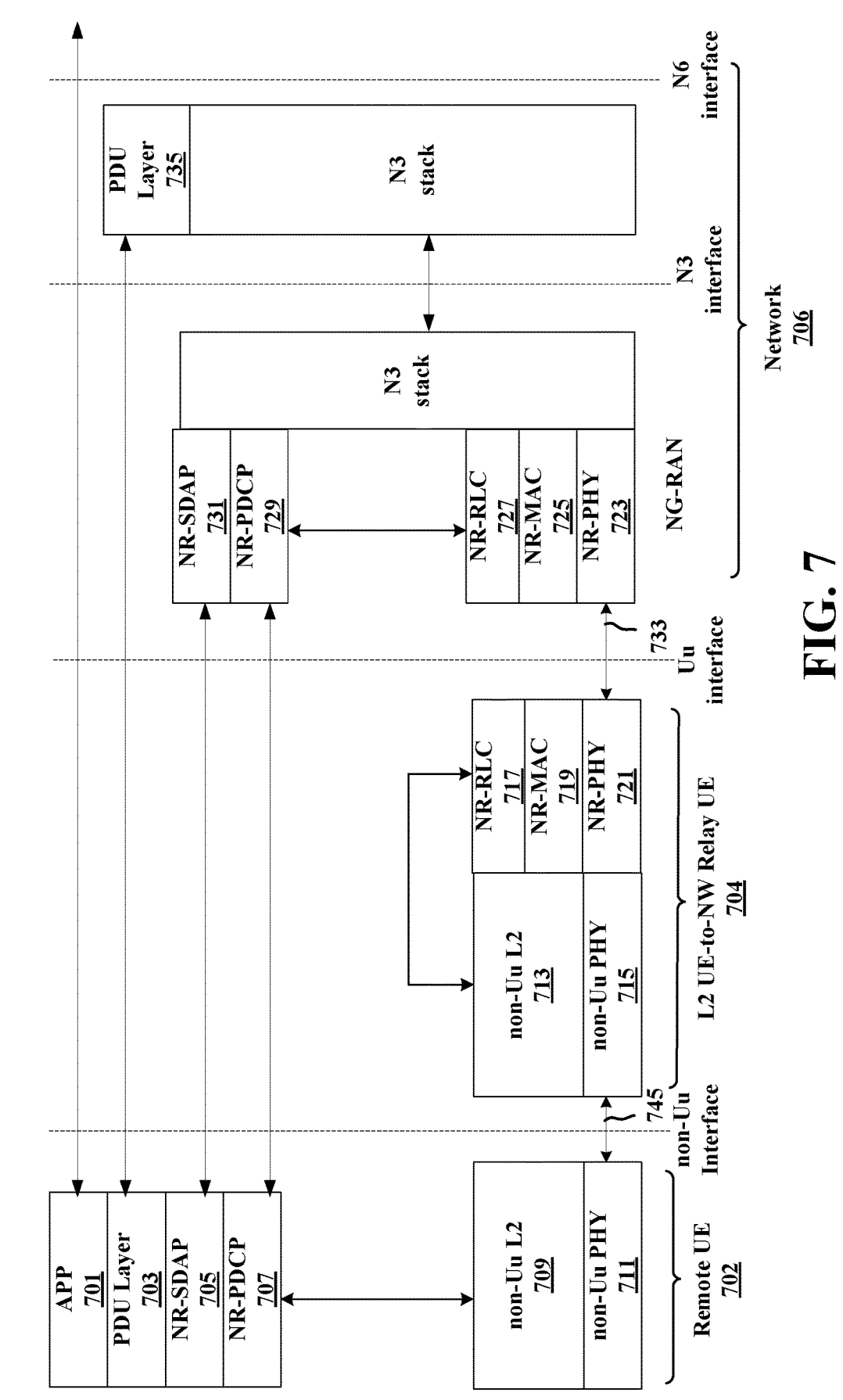
FIG. 7 is an example user plane stack illustrating layers for a first wireless device to establish a connection with a second wireless device for a first type of relay communication with a network entity.

FIG. 7 illustrates an example user plane stack 700 for relaying traffic between a remote UE 702 and a network 706 via a relay UE 704. That illustrates the APP layer 701, the PDU layer 703, the SDAP layer 705, and the PDCP layer 707 terminated at the remote UE 702 and at the network side with SDAP 731, PDCP 729, and PDU layer 735. Although the example in FIG. 7 illustrates an example with an NR network, the aspects presented herein may be similarly applied for LTE or other RATs. As with the control plane example in FIG. 6, data traffic passes over the local RAT, e.g., the non-Uu interface, between the remote UE 702 and the relay UE 704, e.g., via the non-Uu layer 2 (L2) 709 and a non-Uu physical (PHY) layer 711 that exchanges communication with the non-Uu PHY layer 713 of the relay UE 704.

The non-Uu L2 715 provides the communication to an RLC 717 for a different RAT than the local connection, e.g., an NR connection in the example in FIG. 7. The RLC passes the communication to a MAC layer 719 for the other RAT, which provides the communication to a PHY layer 721 for the other RAT. The communication is exchanged over a Uu interface between the PHY layer 721 of the relay UE 704 and the PHY layer 723 of the network 706, where it is processed by the NR-MAC layer 725 and NR-RLC 727. As illustrated by the arrows in FIG. 7, messages may be sent from the network 706 for the remote UE 702 via the relay UE 704 or may be sent from the remote UE 702 to the network 706 via the relay UE 704. Although FIG. 7 illustrates the stack for a single remote UE 702, the relay UE 704 may have a unique Uu channel 733 for each remote UE that it supports. For each message for the unique Uu connection 733 for a remote UE 702, the relay UE 704 relays the data at the L2 layer to the non-Uu connection 745. The relay UE 704 and the network 706 know that the Uu connection 733 corresponds to the remote UE, e.g., maps to the remote UE. The relay UE 704 may use a direct mapping between the Uu link 733 and the non-Uu link 745 to relay the data over the L2 without an adaptation layer.

The network entity may configure the second wireless device (which may be referred to as a relay device) with a RLC channel for one or more remote device signaling radio bearers (SRBs) and an RLC channel for one or more remote device data radio bearers (DRBs). For example, the second wireless device may act as a relay for multiple user equipment (UEs), and the network entity may configure the second wireless device with an individual RLC channel for an SRB and an individual RLC channel for a DRB for each of the UEs.

Figure 8:
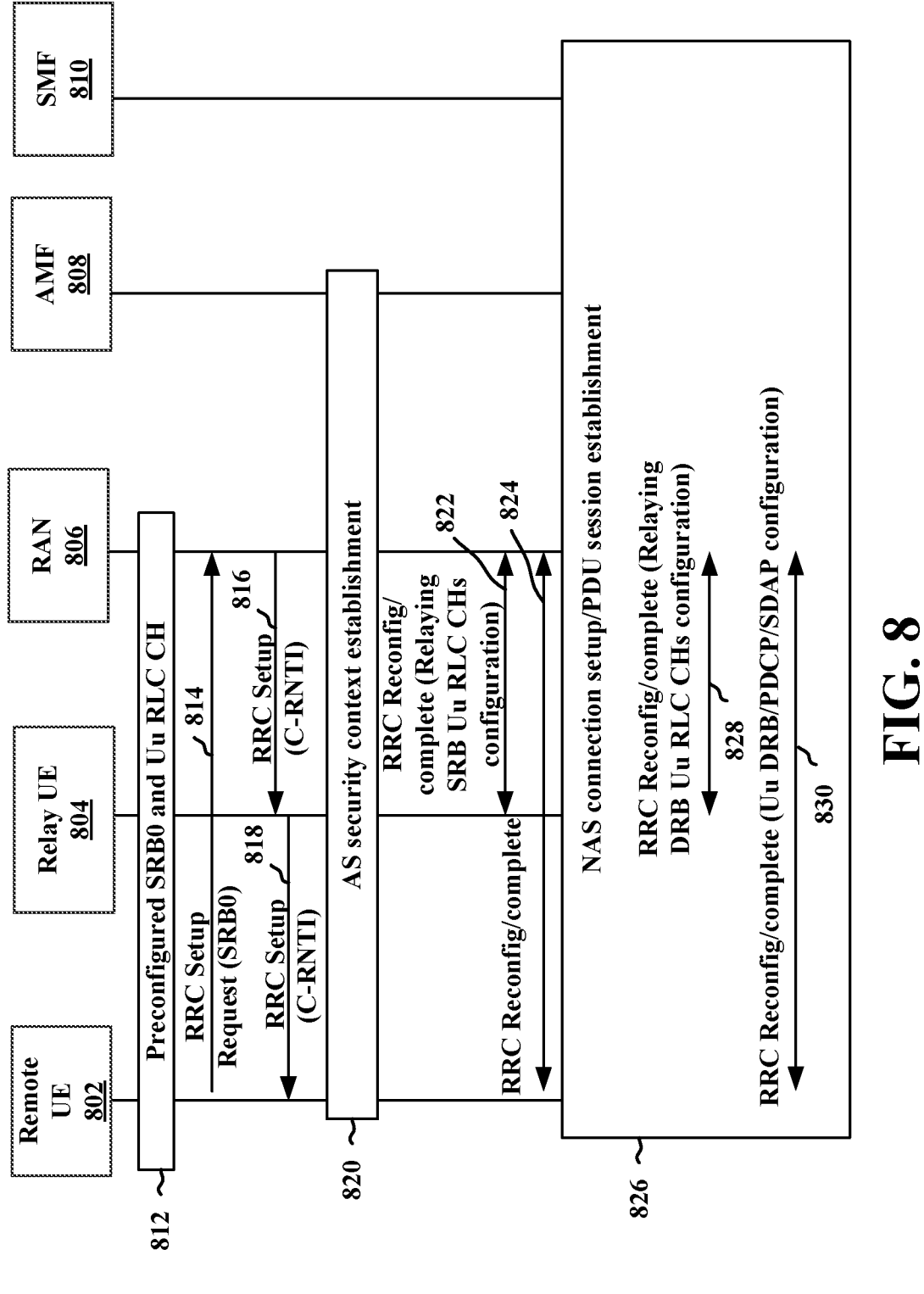
FIG. 8 is a communication flow diagram showing communication exchanged for a first wireless device to establish a connection with a second wireless device in order to exchange communication with a network entity.

FIG. 8 illustrates an example communication flow 800 for SRB/DRB configuration for the remote UE. FIG. 8 illustrates the remote UE 802 sending an initial RRC connection setup/resume message 812 on a preconfigured channel. The preconfigured channel may be based on a particular SRB, e.g., SRB0 for a Uu connection for the remote UE 802. The SRB0 may be configured, at 812, prior to the RRC connection setup/resume. The remote UE 802 may send the message 814 over a local link between the remote UE 802 and the relay UE 804 using the SRB0, and the relay UE 804 may relay the message 814 to network (e.g., base station/RAN 806) using a Uu RLC channel that is preconfigured for the SRB0 transmission. The RAN 806 may response with an RRC setup/RRC resume message 816 that the relay UE 804 relays to the remote UE 802 as message 818. The remote UE 802 and the network may establish an AS security context, at 820. The RAN 806 may provide an RRC reconfiguration complete message 822 to the relay UE 804 with a relaying UE Uu RLC channel configuration for the context for the remote UE 802. The RAN 806 and the remote UE 802 may exchange an RRC reconfiguration complete message 824 via the relay UE 804. After the network provides the relaying UE 804 with the SRB and Uu RLC channel configuration, the additional messages may be exchanged based on the configured SRB, e.g., configured at 822. The RAN 806 may configure the relay UE 804 with additional Uu RLC channels for remote UE SRBs for subsequent control plane messages and may configure the relay UE 804 with additional Uu RLC channels for remote UE DRBs. At 826, the network (e.g., AMF 808 and/or SMF 810) exchanges communication with the remote UE 802 via the relay UE 804 to setup a NAS connection and/or establish a PDU session with the remote UE 802. The network (e.g., RAN 806) may provide an RRC reconfiguration complete message 828 to the relay UE 804 configuring a relaying DRB Uu RLC channel. The RAN 806 may provide an RRC reconfiguration complete message 830 to the remote UE 802 via the relay UE 804 configuring the Uu DRB, PDCP, and/or SDAP for the remote UE. The RAN 806 may leave the local RAT management to the remote UE 802 and the relay UE 804, e.g., based on a capability indication.

For example, the remote UE 802 may indicate to the network (e.g., RAN 806) the local RAT, e.g., the non-Uu RAT, that is the basis of the connection between the remote UE and the relay UE 804. The remote UE 802 may indicate to the network (e.g., RAN 806) whether the remote UE 802 supports a first type of L2 relay or a second type of L2 relay via the relay UE 804. The first type of L2 relay may include a local connection between the remote UE 802 and the relay UE 804 that includes one or more parameters configured by the network (e.g., RAN 806). The second type of L2 relay may be based on a local connection between the remote UE 802 and the relay UE 804 that is not managed by the network and is instead managed by the relay UE and/or the remote UE based on procedures for the local RAT used for the local connection. In some examples, the second type of L2 relay may be referred to as "L2 relay light" or a "simplified L2 relay operation," as an L2 relay based on a "remote connection" or by another name. The remote UE 802 may provide the indication as a UE capability indication, for example. In some examples, the remote UE 802 may provide the indication to the RAN 806 in an AS message such as the RRC setup request or an RRC resume message when setting up the connection with the network via the relay UE 804. The remote UE may provide the indication to a core network component, such as the AMF 808 or SMF 810, in NAS messages, e.g., in a registration, a PDU session establishment, or a PDU session modification request.

In some aspects, the network may configure one or more aspects of the local connection between the remote UE 802 and the relay UE 804 based on the indication of the type of RAT that is the basis of the local connection. In other examples, the network (e.g., RAN 808) may not manage the local connection between the remote UE 802 and the relay UE 804 based on the capability indication from the remote UE 802. The RAN 806 may configure security and QoS for the remote UE Uu DRBs/SRBs and the relay UE Uu logical channels, but may not configure parameters for the non-Uu connection between the remote UE 802 and the relay UE 804. In some examples, the relay UE 804 may configure/manage the QoS for the non-Uu connection.

The remote UE and/or the relay UE may be mobile. Thus, aspects presented herein provide for mobility support for the L2 relay. If the remote UE is mobile, the remote UE may reselect to a different relay UE in some examples. As a first option, the local RAT, e.g., the non-Uu RAT that is the basis of the connection between the remote UE and the relay UE may not be controlled by the network, and the remote UE may perform selection and/or reselection evaluation based on criteria for the non-Uu RAT. Alternatively, the remote UE may receive an indication from the network (e.g., a base station) that informs the remote UE to select/reselect the relay UE. For example, the base station may use measurements (e.g., regarding the Uu connection and/or measurements for another RAT), an indication from the remote UE, and/or an indication from the relay UE to control a mobility event.

The remote UE may also have mobility that leads to a new target path with a different base station. The remote UE may decide that the source path, e.g., between the remote UE and the current base station, is not suitable based on criteria that is either preconfigured or provided by a base station. The UE may select the target path based on local-RAT selection procedures. The UE may reestablish the NR connection (AS/NAS aspects) over the target path, e.g., performing an RR reestablishment.

Figure 9:
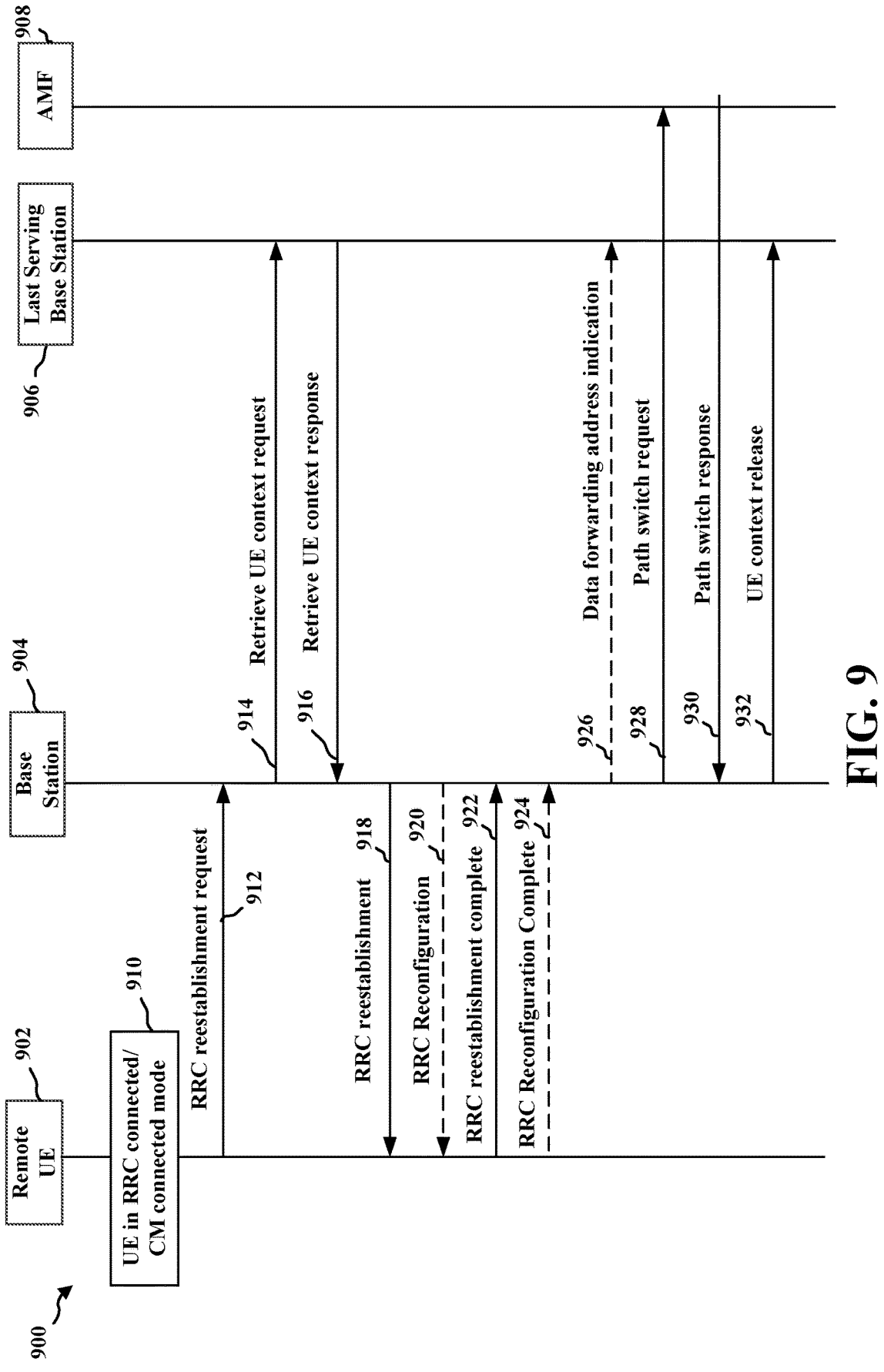
FIG. 9 is a communication flow diagram showing communication exchanged for a first wireless device to establish a connection with a second wireless device in order to exchange communication with a network entity.

FIG. 9 illustrates an example communication flow 900 between a remote UE 902, a target base station 904, a last serving base station 906, and an AMF 908. The remote UE 902 is in a connected mode, at 910. The remote UE transmits an RRC reestablishment request 912 to the base station 904, e.g., based on the target path. The remote UE may provide the PCI of the last serving base station, a C-RNTI, a short MAC identity (MAC-I) to the base station 904. The PCI may correspond to the relay UE serving cell PCI during L2 relay to Uu mobility, for example, such as the for the relay UE 804 in FIG. 8. The base station 904 forward a handover request to the last serving base station 906 to request the remote UE context from the source base station 906, at 914, using the information provided by the remote UE 902. The last serving base station 906 may respond with the UE context, at 916. The target base station 904 may send an RRC reestablishment 918 message and an RRC reconfiguration message 920 to the remote UE 902 using the retrieved UE context. The remote UE 902 may respond with an RRC reestablishment complete message 922 and/or RRC reconfiguration complete message 924. The base station 904 of the target path may provide a data forwarding address indication 926 to the previous base station 906 and/or a path switch request 928 to the AMF 908. The AMF 908 may respond with a path switch response 930 to the base station 904, and the base station 904 may provide an indication 932 to the prior base station 906 to release the remote UE context.

The remote UE may continue monitoring measurements for a Uu connection with the base station. For example, a remote UE that is capable of NR communication may continue monitoring NR measurements configured by the base station, directly or via the L2 relay path. The measurements may include radio resource management (RRM) measurements, for example. The remote UE may send measurement reports to the base station, e.g., directly over a Uu connection or via the L2 relay path using the relay UE. The remote UE may determine a radio link failure based on the measurements for the Uu link and may perform reselection or reestablishment based on the RLF. The relay UE may also perform RRM measurements. If the relay UE determines an RLF for the Uu connection with the network, the relay UE may release or suspend the local RAT connection with the remote UE. The relay UE may inform the remote UE of the RLF. The relay UE may stop advertising discovery of the local RAT or may advertise discovery without an indication of support to function as an L2 relay to the network. If the relay UE determines an RLF for the local RAT that forms the basis of the connection between the remote UE and the relay UE, the relay UE may indicate to the network, e.g., the base station, that there is a RLF for the local connection of the non-Uu interface between the remote UE and the relay UE. The relay UE may release the connection with the remote UE and may inform the base station that the relay connection is being released. The base station may release the remote UE context based on the indication from the relay UE.

A UE connected to a base station directly over a Uu connection directly is assigned a C-RNTI. The C-RNTI may provide a unique UE identification used by the base station as an identifier of the RRC Connection and for scheduling. The C-RNTI may be assigned to the UE during a RACH procedure, a handover procedure, an RRC Reconfiguration with synchronization, etc. The C-RNTI may be used by the base station in association with a UE context. The remote UE may send a C-RNTI to the target base station in an RRC Reestablishment request, and the target base station may use the C-RNTI to fetch UE context from source gNB during a forward handover, such as described in connection with FIG. 9.

Figure 10:
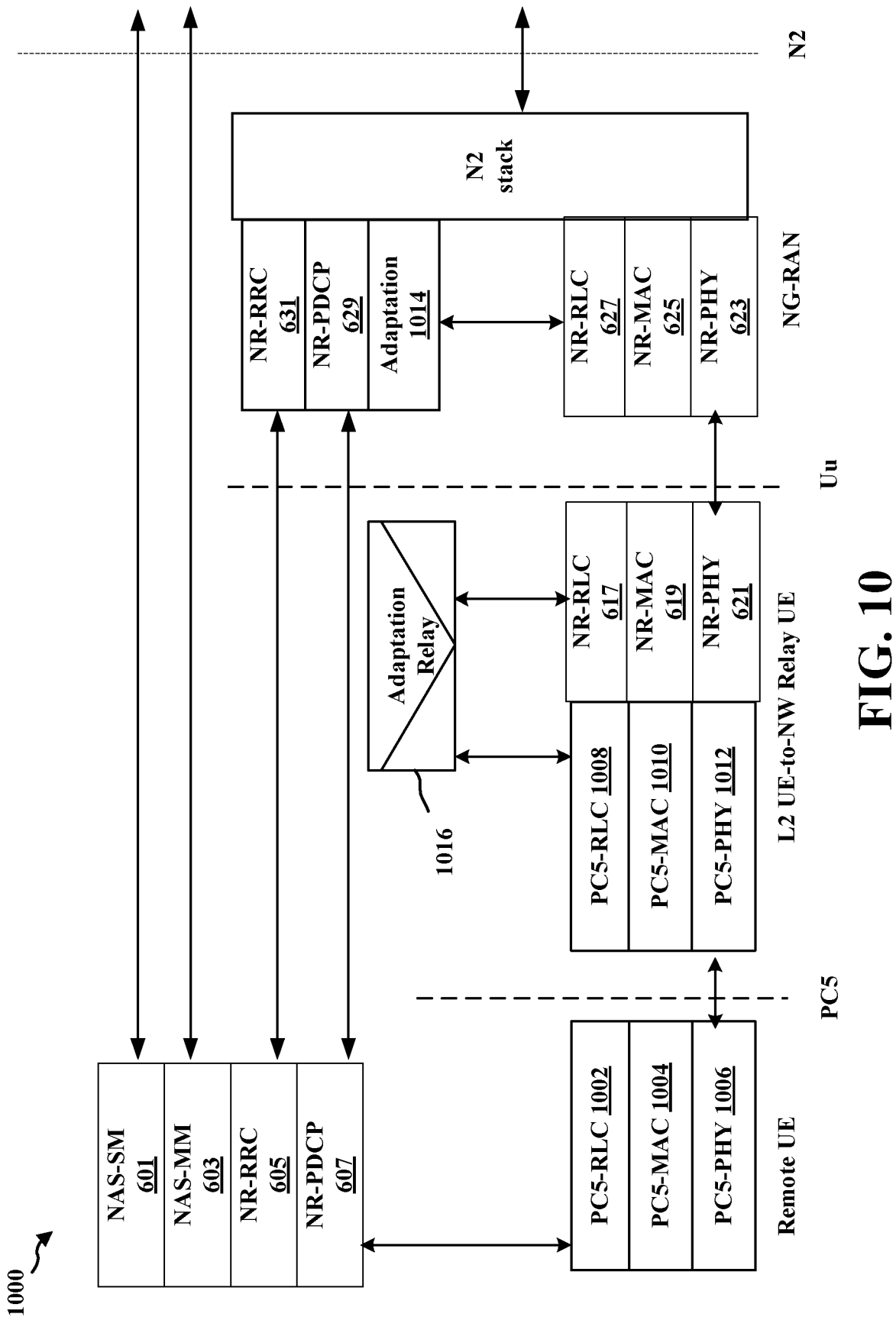
FIG. 10 is an example control plane stack illustrating layers for a first wireless device to establish a connection with a second wireless device for a second type of relay communication with a network entity.
Figure 11:
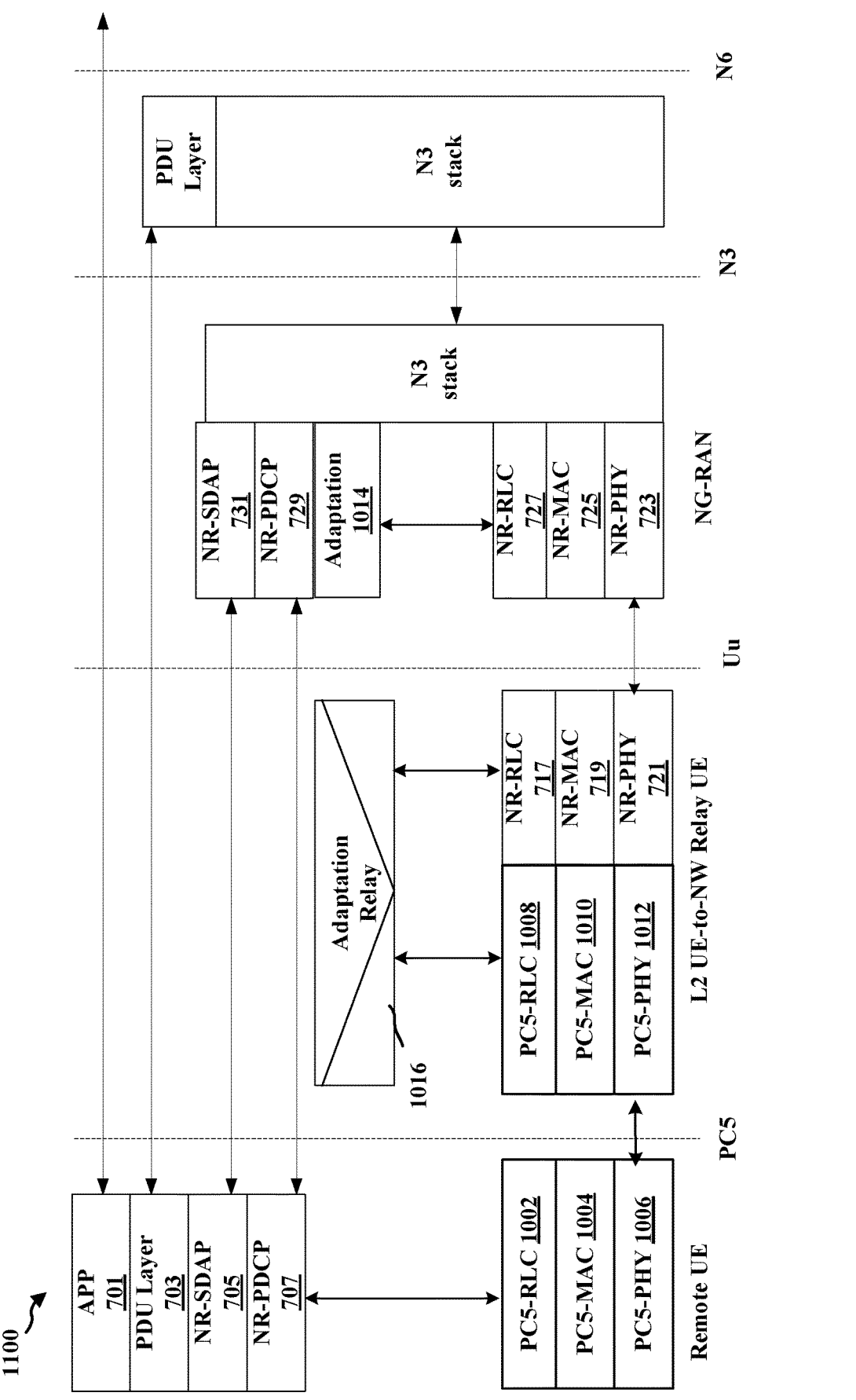
FIG. 11 is an example user plane stack illustrating layers for a first wireless device to establish a connection with a second wireless device for a second type of relay communication with a network entity.
Figure 22:
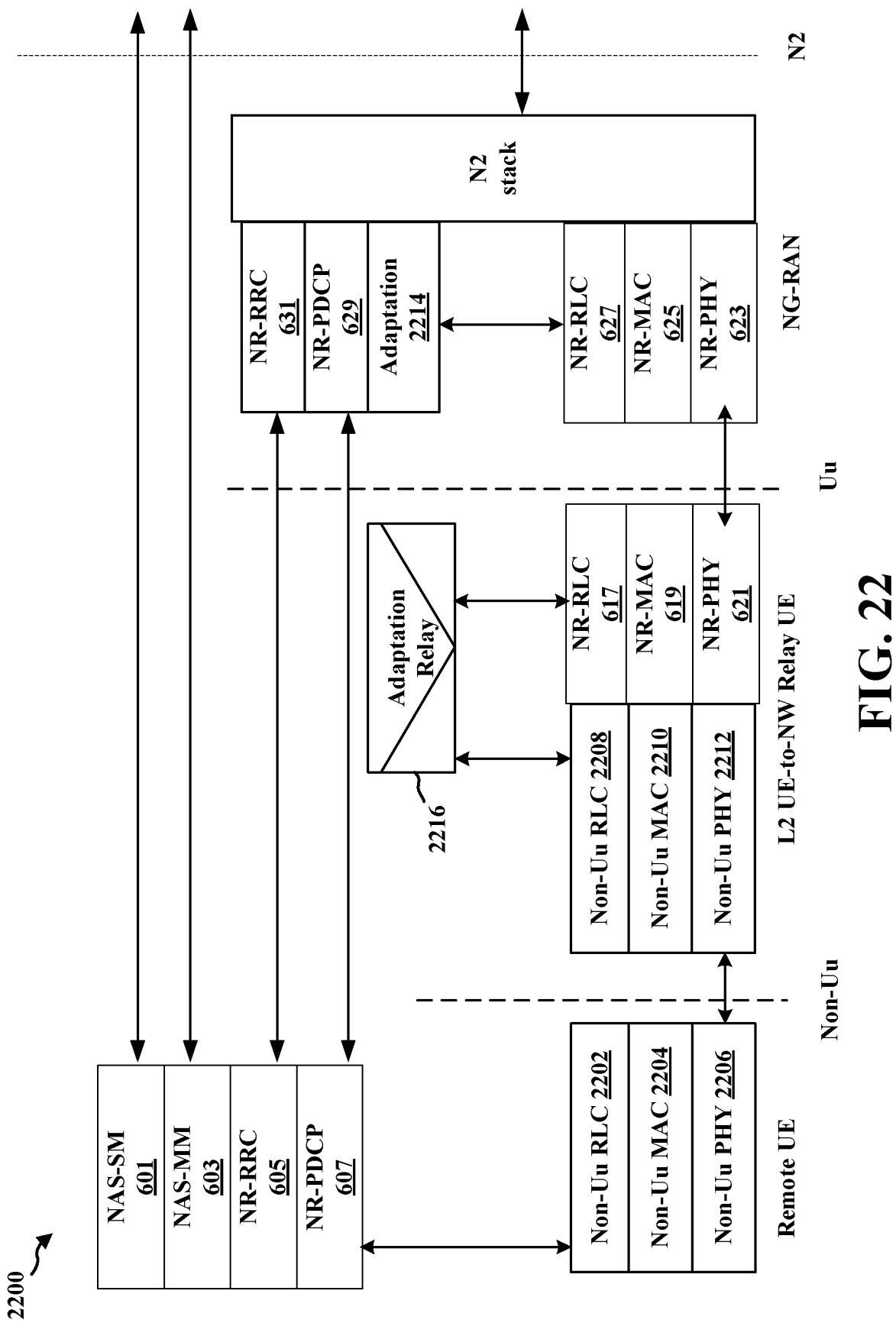
FIG. 22 is an example control plane stack illustrating layers for a first wireless device to establish a connection with a second wireless device for a second type of relay communication with a network entity.
Figure 23:
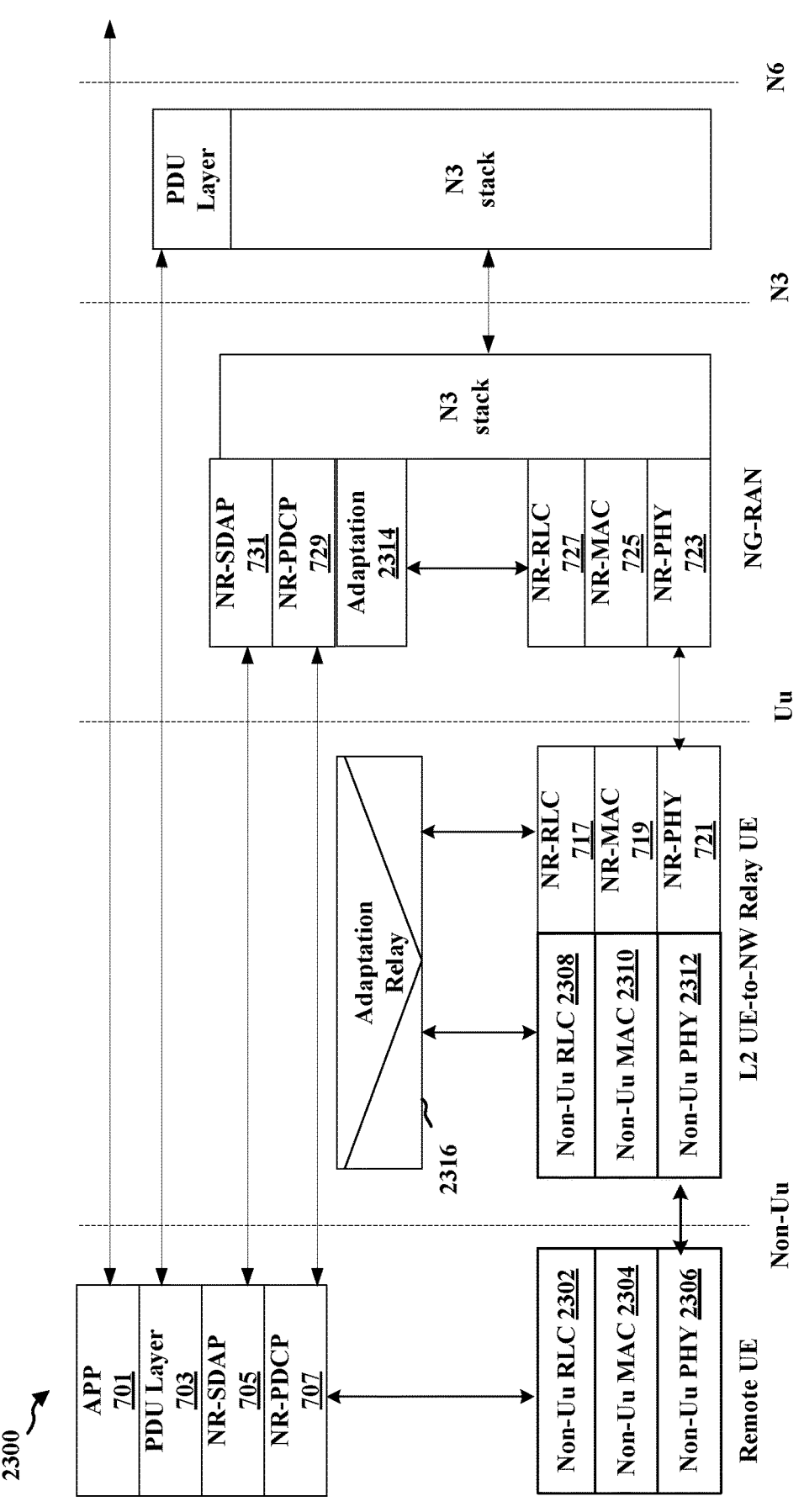
FIG. 23 is an example user plane stack illustrating layers for a first wireless device to establish a connection with a second wireless device for a second type of relay communication with a network entity.

FIG. 10 illustrates an example control plane stack 1000 for an L2 relay that supports adaptation functionality. Layers that have been described in connection with the protocol stack for the control plane in FIG. 6 are numbered with the same reference number. FIG. 10 includes an adaptation layer 1016 at the relay UE and an adaptation layer 1014 at the network. FIG. 10 illustrates an example in which the non-Uu interface is a PC5 interface. However, the concepts presented herein may be applied for a connection between the remote UE and the relay UE based on other non-Uu connections that are different than PC5, illustrated in the protocol stack 2200 in FIG. 22. Examples of other non-Uu connections include a Bluetooth low energy (BLE), a WiFi-D, WiFi, bluetooth (BL) regular, among other examples. Thus, the relay UE includes a PC5 RLC 1008, a PC5 MAC 1010, and a PC5 PHY layer 1012 that corresponds to the PC5 PHY layer 1006, the PC5 MAC 1004, and the PC5 RLC 1002 at the remote UE. In FIG. 22, the relay UE includes a non-Uu RLC 2208, a non-Uu MAC 2210, and a non-Uu PHY layer 2212 that corresponds to the non-Uu PHY layer 2206, the non-Uu MAC 2204, and the non-Uu RLC 2202 at the remote UE. FIG. 22 also illustrates the adaptation layer 2216 at the relay UE and an adaptation layer 2214 at the network. In FIG. 22, the layers that have been described in connection with FIG. 6 are numbered with the same reference number. In FIG. 10 or 22, the relay UE supports multiplexing multiple UE traffic on a relay UE Uu connection, whereas the relay UE in FIG. 6 receives a configuration of a Uu connection for each remote UE that the relay UE supports. In FIG. 10 or 22, the relay UE maps traffic from the remote UE Uu SRB to a corresponding PC5 (or other non-Uu) logical channel and Uu logical channel and performs the opposite mapping of the SRBs for the Uu logical channel to the corresponding PC5 (or other non-Uu) logical channel. FIGS. 11 and 23 illustrate a similar mapping for DRBs. The network uses a Uu RRC procedure to configure the remote UE with the Uu SRBs/DRBs and the corresponding NR-SDAP, NR-PDCP entities. The network uses the Uu RRC procedure to configure the relay UE with the remote UE's relaying Uu logical channels (e.g., the Uu RLC/MAC configuration) and the adaptation configuration, e.g., non-Uu to Uu logical channel mapping such as a PC5 to Uu logical channel mapping in FIG. 10. The network uses the Uu RRC procedure to configure the remote UE and the relay UE with the Non-Uu logical channel (e.g., the PC5 RLC/MAC) corresponding to the remote UE Uu bearers. The protocol stack illustrated in FIG. 10 may be referred to as the first type of L2 relay in which aspects of the local connection are configured or managed by the network.

FIG. 11 illustrates a user plane stack 1100 for the first type of L2 relay corresponding to the control plane stack in FIG. 10. Aspects of FIG. 11 that correspond to the user plane protocol stack in FIG. 7 are labeled with the same reference number. In contrast to the user plane stack 700 in FIG. 7, the user plane protocol stack 1100 in FIG. 11 includes an adaptation layer 1014 at the network and an adaptation layer 1016 at the relay UE, such as described in connection with FIG. 10. Other aspects that are similar to FIG. 10 are illustrated with the same reference number. FIG. 11 illustrates an example in which the non-Uu interface is a PC5 interface. However, the concepts presented herein may be applied for a connection between the remote UE and the relay UE based on other non-Uu connections that are different than PC5, illustrated in the protocol stack 2300 in FIG. 23. Examples of other non-Uu connections include a Bluetooth low energy (BLE), a WiFi-D, WiFi, bluetooth (BL) regular, among other examples. In FIG. 23, the relay UE includes a non-Uu RLC 2308, a non-Uu MAC 2310, and a non-Uu PHY layer 2312 that corresponds to the non-Uu PHY layer 2306, the non-Uu MAC 2304, and the non-Uu RLC 2302 at the remote UE. FIG. 23 also illustrates the adaptation layer 2316 at the relay UE and an adaptation layer 2314 at the network. In FIG. 23, the layers that have been described in connection with FIG. 7 are numbered with the same reference number.

In contrast to the first type of L2 relay with the control plane stack 1000 and the user plane protocol stack 1100 in FIGS. 10 and 11, the second type of L2 relay (e.g., L2 light relay, remote connection relay, relay that involves a locally managed non-Uu connection, etc.) performs the relaying operation at the L2 layer with the non-Uu link being managed locally by the remote UE and/or the relay UE.

The L2 relay, whether for the first type of L2 relay or the second type of L2 relay may not have a RACH procedure to perform an RRC connection setup with the network, e.g., via the relay UE in order to the remote UE to obtain a C-RNTI. In some examples, the remote UE may be out of coverage of a base station and may not have had an opportunity to obtain a C-RNTI. The UE may not be able to initiate a connection with the base station via the relay UE without a prior direct connection to the base station, e.g., a prior Uu link directly with the base station, over which the base station provides the UE with a C-RNTI.

For example, in the second type of L2 relay, the remote UE may perform reselection and reestablishment to setup the RRC connection to the base station without a reconfiguration with synchronization procedure. Aspects presented herein provide a modification to procedures for assigning a C-RNTI to enable an assignment to the remote UE via an L2 relay. In a first example, in FIG. 8, the C-RNTI may be provided to the remote UE 802 in the RRC setup message 816 and/or 818 via the relay UE 804. For UEs that connect to the base station without RACH or without a contention resolution procedure, the remote UE is able to receive a C-RNTI from the network. The RRC connection setup initiation message 814 may be sent on preconfigured channels, as described in connection with FIG. 8. The C-RNTI may be provided to the remote UE in an RRC setup message from the network via the relay UE. The C-RNTI may be sent in an RRC resume message or an RRC reestablishment message via the relay UE, in some examples. The RRC messages may be separate from random access messages.

Figure 12:
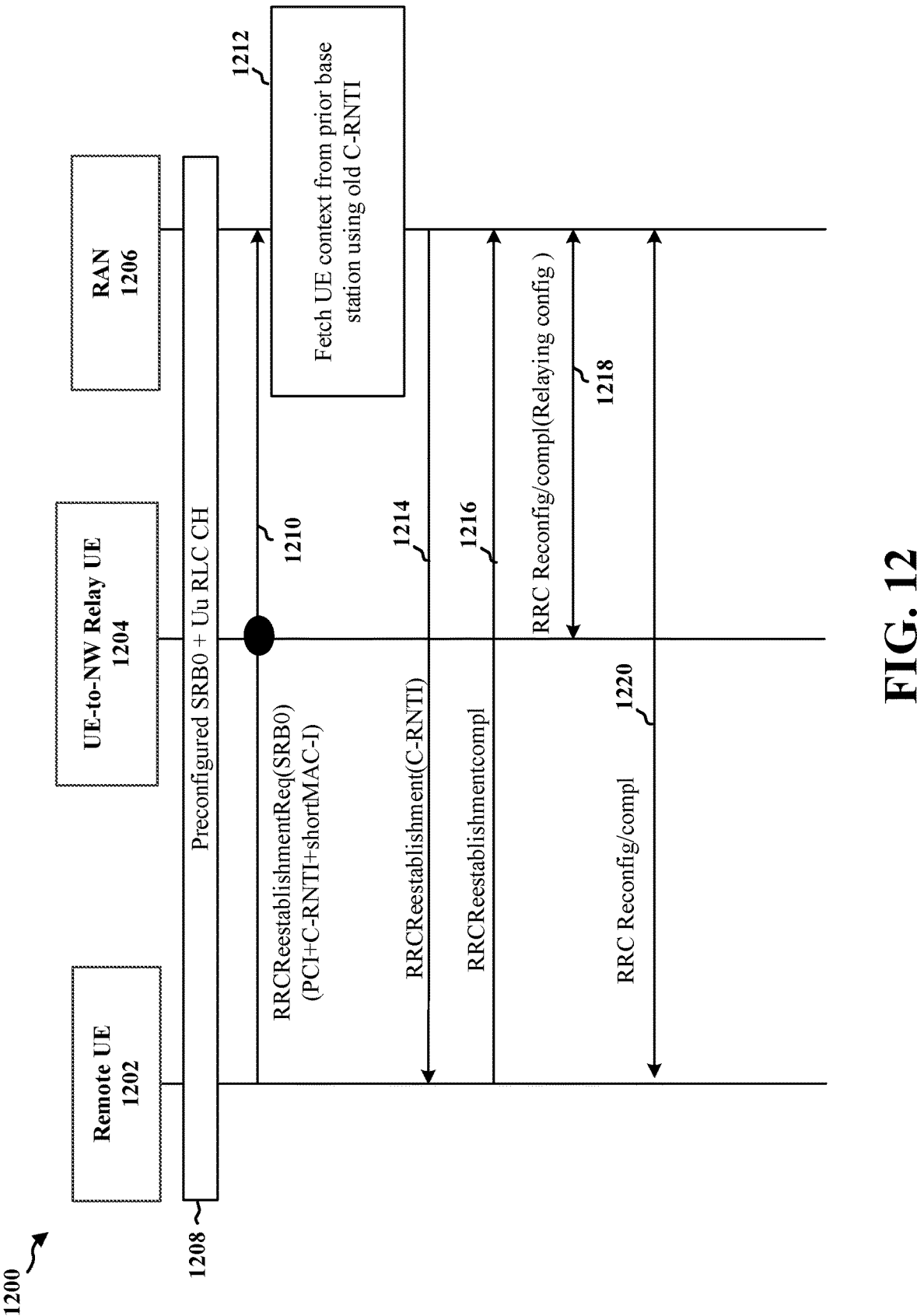
FIG. 12 is a communication flow diagram showing communication exchanged for a first wireless device to establish a connection with a second wireless device in order to exchange communication with a network entity including the provision of a cell radio network temporary identifier (C-RNTI).

In another example, the remote UE may perform reselection and RRC reestablishment with a new base station. The RRC connection reestablishment message may be sent on a preconfigured channel, such as described in connection with FIG. 8. FIG. 12 illustrates an example of reselection and RRC reestablishment 1200, similar to FIG. 9 and using an SRB 0 and Uu RLC channel configured, at 1208, for the remote UE 1202 to transmit an RRC reestablishment message 1210 to a base station 1206 via the relay UE 1204. The RRC reestablishment message may include a PCI for a previous serving base station, a C-RNTI for the remote UE, and a short MAC-I. The base station 1206 may use the C-RNTI from the message 1210 to retrieve the UE context of the remote UE from the last serving base station, at 1212, similar to the retrieval described in connection with FIG. 9. The base station may transmit an RRC reestablishment message 1214 to the remote UE 1202 via the relay UE 1204 and may indicate a new C-RNTI to the remote UE 1202. The remote UE 1202 may response with an RRC reestablishment complete message 1216. The base station 1206 may transmit an RRC reconfiguration complete message 1218 with the relaying configuration for the relay UE 1204 and an RRC reconfiguration complete message 1220 to the remote UE via the relay UE 1204.

Figure 13:
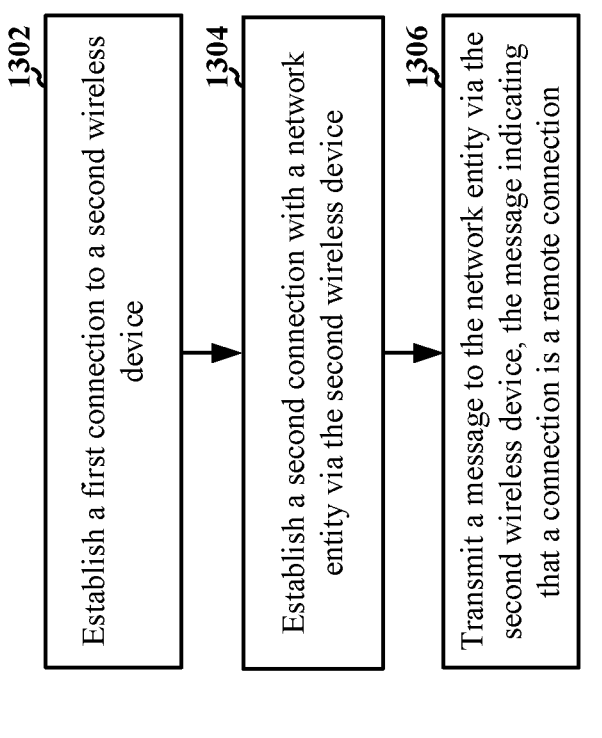
FIG. 13 is a flowchart of a method of wireless communication.

FIG. 13 is a flowchart 1300 of a method of wireless communication. The method may be performed by a first wireless device, e.g., a remote device 103, wireless device 402, remote UE 502, 602, 702, 802, 902, 1202; the apparatus 1502. The method may enable the remote UE to establish a connection with a network device via a second wireless device based on a remote connection.

At 1302, the first wireless device establishes a first connection to a second wireless device. The establishment may be performed, e.g., by the first connection component 1540 of the apparatus 1502 in FIG. 15. The establishment of the first connection may be based on a determination that the network entity is not reachable or not suitable for wireless traffic via a first RAT interface and/or a discovery of the second wireless device based on a discovery procedure for a second RAT, e.g., as described in connection with FIG. 4 or FIG. 5, for example. Discovering the second wireless device may further include the first wireless device receiving an indication that the second wireless device supports relaying to the network entity over the first RAT via a remote connection. In some examples, the second wireless device may be a relay UE, such as described in connection with any of FIGS. 4-12.

At 1304, the first wireless device establishes a second connection with a network entity via the second wireless device. The establishment may be performed, e.g., by the second connection component 1542 of the apparatus 1502 in FIG. 15. The first RAT may comprise a Uu interface, such as an NR Uu interface, and the second RAT may comprise a non-Uu interface, such at least one of a sidelink interface (for example, a PC5 interface), a BLE interface, a WiFi-D interface, a WiFi interface, or a BL regular interface. For example, the establishment of the second connection with the network entity may further include establishing a context with the network entity via the second wireless device and establishing a PDU session with the network entity for a first RAT via the second wireless device, such as described in connection with FIG. 5 or FIG. 8.

At 1306, the first wireless device transmits a message to the network entity via the second wireless device, the message indicating that a connection is a remote connection. For example, the message may indicate that the second connection is a remote connection. The first wireless device may transmit the message during an establishment of the second connection. The transmission may be performed, e.g., by the indication component 1544 via the transmission component 1534 of the apparatus 1502 in FIG. 15. The first connection and/or the second connection may be a remote connection. For example, the first connection may be a remote connection, such as described in connection with FIGS. 6 and 7 and may be managed by one or more of the second wireless device or the first wireless device. The indication of the remote connection to the network entity may include indicating that the network entity is unreachable or unsuitable for wireless traffic over a first RAT interface and/or transmitting a capability indicating a type of a second RAT for the first connection. In some aspects, the suitability may be based on a quality of a Uu connection. The UE may determine that the Uu connection is not available or is not suitable based on a quality measurement being below a threshold. In some examples, the UE may have a connection with the network entity, and a quality of the connection may change. Thus, an unsuitable connection may be based on a change in a quality of the connection. The capability may further indicate whether the first wireless device supports a first type of relayed communication with the network entity or a second type of relayed communication with the network entity, e.g., as described in connection with FIGS. 6, 7, 10, and 11. The first type of relayed communication may be based on the first connection being configured by the network entity, such as in FIGS. 10 and 11, and the second type of relayed communication may be based on the first connection being configured by the first or second wireless device, e.g., such as in FIGS. 6 and 7. The capability may indicate that the first wireless device supports the first type of relayed communication, and the first wireless device may receive one or more configuration parameters from the network entity for the first connection based on the type of the second RAT indicated in the capability.

FIG. 14 illustrates a flowchart 1400 of a method of wireless communication. The method may include aspects described in connection with FIG. 13. The method may be performed by a first wireless device, e.g., a remote device 103, wireless device 402, remote UE 502, 602, 702, 802, 902, 1202; the apparatus 1502. The method may enable the remote UE to establish a connection with a network device via a second wireless device based on a remote connection. Aspects that have been described in connection with FIG. 13, are shown with the same reference number. A method may include any subset, or combination, of aspects described in connection with FIGS. 13 and/or 14.

As illustrated at 1408, the first wireless device may receive initial messages for RRC setup, RRC resume, or RRC reestablishment from the network entity via the second wireless device on a first SRB corresponding to a first RAT of the network entity, and at 1412, may receive RRC messages on a second SRB corresponding to the first RAT after establishing the security context with the network entity, e.g., as described in connection with FIG. 8 and/or FIG. 12. The messages may be received, e.g., by the RRC component 1546 via the reception component 1530 of the apparatus 1502 in FIG. 15. As illustrated at 1410, the first wireless device may receive, from the network entity via the second wireless device, a configuration of the second SRB and a DRB for exchanging wireless traffic with the network entity.

As illustrated at 1416, the first wireless device may select a target path with a third wireless device to relay wireless traffic to the network entity. The first wireless device may select the target path based on a reselection procedure for a RAT for the second connection. The selection may be performed, e.g., by the target path component 1550 of the apparatus 1502 in FIG. 15. As illustrated at 1314, the first wireless device may receive, from the network entity, an indication to connect to the third wireless device to relay the wireless traffic to the network entity, wherein the first wireless device selects the target path based on the indication from the network entity. The reception may be performed, e.g., by the reception component 1530 of the apparatus 1502 in FIG. 15. In other examples, the first wireless device may make the selection without input from the network.

At 1418, the first wireless device reestablishes a security context and a PDU session with the network entity via the third wireless device. The reestablishment may be performed, e.g., by the second connection component 1542 of the apparatus 1502 in FIG. 15.

As illustrated at 1422, the first wireless device may transmit a measurement to the network entity via the second wireless device, wherein the indication to connect to the third wireless device is based on the measurement. The transmission may be performed, e.g., by the measurement component 1552 via the transmission component 1534 of the apparatus 1502.

In some examples, the first wireless device may provide, at 1424, one or more of a prior PCI, a C-RNTI for the first wireless device, or a short MAC-I to the network entity, e.g., such as described in connection with FIG. 9 and/or FIG. 12.

As illustrated at 1420, the first wireless device may perform measurements for a first RAT of the network entity, where the measurements are configured by the network entity over the first RAT connection or via the second connection. The measurements may be performed, e.g., by the measurement component 1552 of the apparatus 1502 in FIG. 15. The first wireless device may transmit, at 1422, a measurement report to the network entity over the first RAT connection or via the second connection. The measurements may comprise one or more of RRM measurements. The transmission may be performed, e.g., by the measurement component 1552 via the transmission component 1534 of the apparatus 1502.

As illustrated at 1426, the first wireless device may receive an indication to release the first connection due to radio link failure from the second wireless device for a link between the second wireless device and the network entity. The indication may be received, e.g., by the indication component 1544 via the reception component 1530 of the apparatus 1502 in FIG. 15.

As illustrated at 1428, the first wireless device may receive a C-RNTI from the network entity via the second wireless device in a RRC setup message or an RRC resume message, or RRC reestablishment message, e.g., as described in connection with FIG. 8 or FIG. 12. The reception may be performed, e.g., by the C-RNTI component 1554 via the reception component 1530 of the apparatus 1502. In some examples, the first wireless device may provide a first C-RNTI to the network entity, e.g., as described in connection with FIG. 12, and may receive a second C-RNTI from the network entity via the second wireless device in a RRC reestablishment message.

Figure 15:
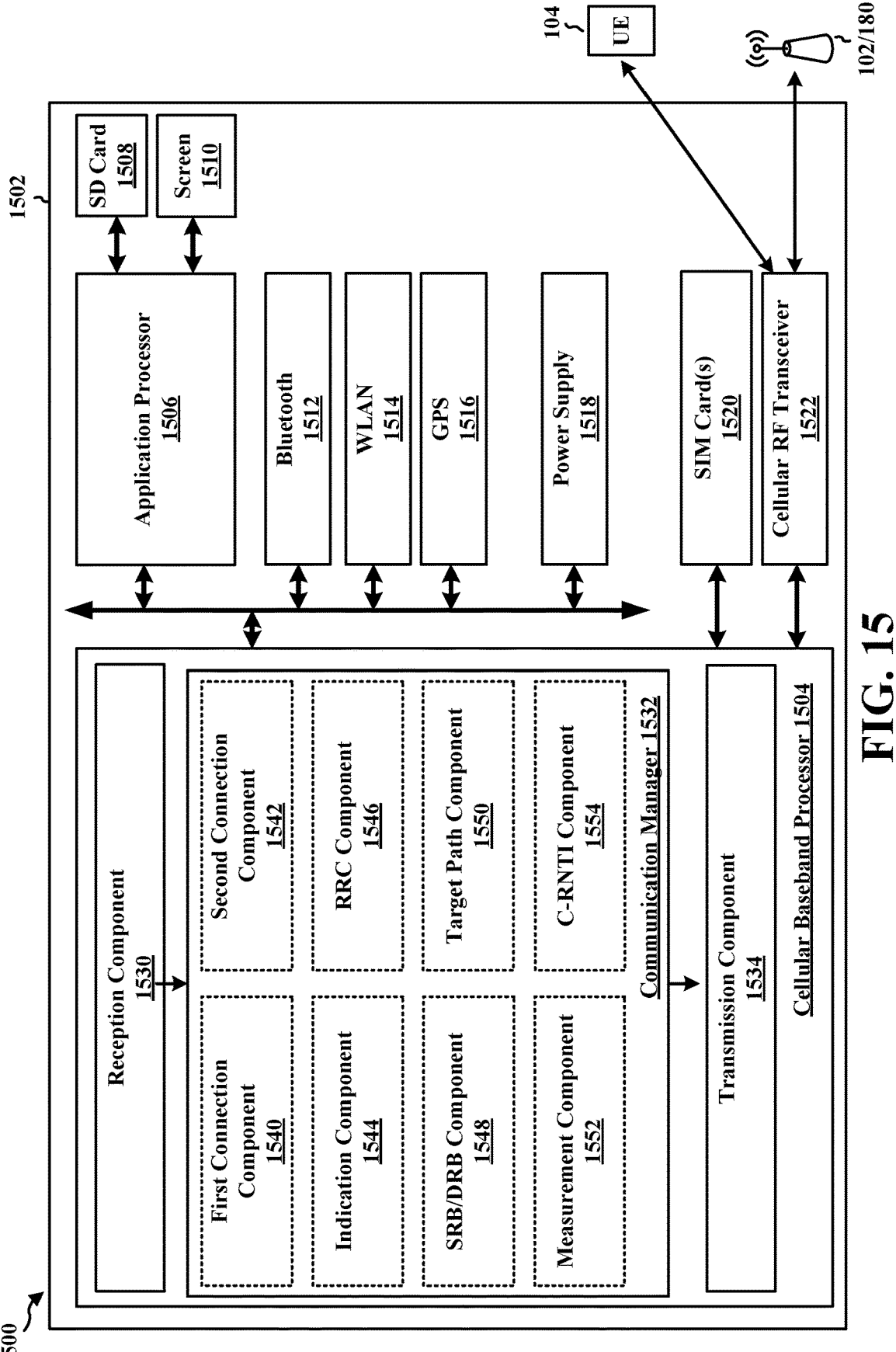
FIG. 15 is a diagram illustrating an example of a hardware implementation for an example apparatus.

FIG. 15 is a diagram 1500 illustrating an example of a hardware implementation for an apparatus 1502. The apparatus 1502 is a remote device, e.g., a UE or other wireless device, such as a remote device 103, wireless device 402, remote UE 502, 602, 702, 802, 902, 1202. As an example, the apparatus 1502 may be a UE, a component of a UE, or may implement UE functionality. The apparatus 1502 may further include a cellular baseband processor 1504 (also referred to as a modem) coupled to a cellular RF transceiver 1522 and one or more subscriber identity modules (SIM) cards 1520, an application processor 1506 coupled to a secure digital (SD) card 1508 and a screen 1510, a Bluetooth module 1512, a wireless local area network (WLAN) module 1514, a Global Positioning System (GPS) module 1516, and a power supply 1518. The cellular baseband processor 1504 communicates through the cellular RF transceiver 1522 with the UE 104 and/or BS 102/180. The cellular baseband processor 1504 may include a computer-readable medium/memory. The computer-readable medium/memory may be non-transitory. The cellular baseband processor 1504 is responsible for general processing, including the execution of software stored on the computer-readable medium/ memory. The software, when executed by the cellular baseband processor 1504, causes the cellular baseband processor 1504 to perform the various functions described supra. The computer-readable medium/memory may also be used for storing data that is manipulated by the cellular baseband processor 1504 when executing software. The cellular baseband processor 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the cellular baseband processor 1504. The cellular baseband processor 1504 may be a component of the wireless device 350 and may include the memory 360 and/or at least one of the TX processor 368, the RX processor 356, and the controller/processor 359. In one configuration, the apparatus 1502 may be a modem chip and include just the baseband processor 1504, and in another configuration, the apparatus 1502 may be the entire UE (e.g., see 350 of FIG. 3) and include the additional modules of the apparatus 1502.

The communication manager 1532 includes a first connection component 1540 that is configured to establish a first connection, e.g., a non-Uu connection, to a second wireless device, e.g., as described in connection with 1302. The communication manager 1532 further includes a second connection component 1542 is configured to establish a second connection with a network entity via the second wireless device, e.g., as described in connection with 1304. The communication manager 1532 further includes an indication component 1544 that indicates that a connection is a remote connection, e.g., as described in connection with 1306. The apparatus 1502 may further include an RRC component 1546 configured to perform the aspects described in connection with 1408 and/or 1412. The apparatus 1502 may further include an SRB/DRB component 1548 configured to perform the aspects described in connection with 1408, 1410, and/or 1412. The apparatus 1502 may further include a target path component 1550 configured to determine a target path, e.g., as described in connection with 1414, 1416, and/or 1418. The apparatus may further include a measurement component 1552 configured to perform RRM measurements or to report measurements, e.g., as described in connection with 1422 and/or 1424. The apparatus may further include a C-RNTI component 1554 configured to receive a C-RNTI in an RRC message, e.g., as described in connection with 1428.

The apparatus may include additional components that perform each of the blocks of the algorithm in the flowcharts of FIG. 5, 8, 9, 12, 13 or 14. As such, each block in the flowcharts of FIG. 5, 8, 9, 12, 13, or 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1502, and in particular the cellular baseband processor 1504, includes means for establishing a first connection to a second wireless device; means for establishing a second connection with a network entity via the second wireless device; and means for transmitting a message to the network entity via the second wireless device, the message indicating that a connection is a remote connection. The apparatus 1502 may further include means for determining that the network entity is not reachable via a first RAT interface and means for discovering the second wireless device based on a discovery procedure for a second RAT. The apparatus 1502 may further include means for receiving an indication that the second wireless device supports relaying to the network entity over the first RAT via a remote connection. The apparatus 1502 may further include means for establishing a context with the network entity via the second wireless device; and establishing a PDU session with the network entity for a first RAT via the second wireless device. The apparatus 1502 may further include means for receiving initial messages for RRC setup, RRC resume, or RRC reestablishment from the network entity via the second wireless device on a first SRB corresponding to a first RAT of the network entity; and means for receiving RRC messages on a second SRB corresponding to the first RAT after establishing the security context with the network entity. The apparatus 1502 may further include means for receiving, from the network entity via the second wireless device, a configuration of the second SRB and a DRB for exchanging wireless traffic with the network entity. The apparatus 1502 may further include means for indicating that the network entity is not reachable over a first radio access technology RAT interface; and means for transmitting a capability indicating a type of a second RAT for the first connection. The apparatus 1502 may further include means for receiving one or more configuration parameters from the network entity for the first connection based on the type of the second RAT indicated in the capability. The apparatus 1502 may further include means for selecting a target path with a third wireless device to relay wireless traffic to the network entity; and means for reestablishing a security context and a PDU session with the network entity via the third wireless device. The apparatus 1502 may further include means for receiving, from the network entity, an indication to connect to the third wireless device to relay the wireless traffic to the network entity, wherein the first wireless device selects the target path based on the indication from the network entity. The apparatus 1502 may further include means for transmitting a measurement to the network entity via the second wireless device, wherein the indication to connect to the third wireless device is based on the measurement. The apparatus 1502 may further include means for reestablishing the security context and the PDU session with the network entity via the third wireless device. The apparatus 1502 may further include means for providing one or more of a prior PCI, a C-RNTI for the first wireless device, or a short MAC-I to the network entity. The apparatus 1502 may further include means for performing measurements for a first RAT of the network entity, wherein the measurements are configured by the network entity over the first RAT connection or via the second connection. The apparatus 1502 may further include means for sending a measurement report to the network entity over the first RAT connection or via the second connection. The apparatus 1502 may further include means for receiving an indication to release the first connection due to radio link failure from the second wireless device for a link between the second wireless device and the network entity. The apparatus 1502 may further include means for receiving a C-RNTI from the network entity via the second wireless device in an RRC setup message or an RRC resume message. The apparatus 1502 may further include means for providing a first C-RNTI to the network entity; and means for receiving a second C-RNTI from the network entity via the second wireless device in an RRC reestablishment message. The means may be one or more of the components of the apparatus 1502 configured to perform the functions recited by the means. As described supra, the apparatus 1502 may include the TX Processor 368, the RX Processor 356, and the controller/processor 359. As such, in one configuration, the means may be the TX Processor 368, the RX Processor 356, and the controller/processor 359 configured to perform the functions recited by the means.

FIG. 16 is a flowchart 1600 of a method of wireless communication to relay wireless communication to a first wireless device. The method may be performed by a second wireless device, e.g., a relay UE 104, relay UE 404, 504, 604, 704, 804, 1204; the apparatus 1802. The method may enable a remote UE to establish a connection with a network device by providing a L2 relay based on a remote connection.

At 1604, the second wireless device establishes a first connection with a first wireless device to relay traffic between a network entity and the first wireless device. The first connection may be established, e.g., by the first connection component 1840 of the apparatus 1802 in FIG. 18. The first connection may be managed by one or more of the second wireless device or the first wireless device, e.g., as a remote connection. The first connection may include a non-Uu interface, for example.

At 1606, the second wireless device establishes a second connection with the network entity to relay the traffic between the network entity and the first wireless device. The second connection may be a Uu connection, whereas the first connection may be a non-Uu connection. The second connection may be established, e.g., by the second connection component 1842 of the apparatus 1802 in FIG. 18.

At 1607, the second wireless device receives a configuration from the network entity for the second connection between the network entity and the second wireless device for relaying the traffic for the first wireless device, where the first connection is configured by one or more of the first wireless device or the second wireless device. The reception may be performed, e.g., by the control context component 1846 of the apparatus 1802 in FIG. 18.

FIG. 17 illustrates a flowchart 1700 of a method of wireless communication to relay wireless communication to a first wireless device. The method may include aspects described in connection with FIG. 16. The method may be performed by a second wireless device, e.g., a relay UE 104, relay UE 404, 504, 604, 704, 804, 1204; the apparatus 1802. The method may enable a remote UE to establish a connection with a network device by providing a L2 relay based on a remote connection. Aspects that have been described in connection with FIG. 16, are shown with the same reference number. A method may include any subset, or combination, of aspects described in connection with FIGS. 16 and/or 17.

As an example, the first connection that is established at 1604 may be for a RAT that is different than the second connection, and as illustrated at 1702, the second wireless device may perform discovery with the second wireless device based on a discovery procedure for the RAT. Performing the discovery with the second wireless device may further comprise transmitting an indication that the second wireless device supports relaying to the network entity with a connection for the RAT controlled by the second wireless device. The discovery may be performed, e.g., by the discovery component 1844 of the apparatus 1802 in FIG. 18.

As illustrated at 1718, the second wireless device may perform relaying for the second wireless device, e.g., as described in connection with any of FIGS. 4-9 and 12. The relaying may be performed, e.g., by the relay component 1852 of the apparatus 1802, such as via the reception component 1830 and the transmission component 1834. The second wireless device may perform relaying for multiple UEs using a dedicated first RAT RLC channel for each UE. The second wireless device may relay the traffic between the network entity and the first wireless device without an adaptation function. The second wireless device may relay the traffic based on a mapping between a first RAT link with the network entity for relaying to the first wireless device and a second RAT link with the first wireless device.

As illustrated at 1716, the second wireless device may receive the traffic from the network entity over a first RAT SRB or DRB configured by the network entity for the first wireless device and may relay the traffic to the first wireless device over the first connection, at 1718. The reception of the traffic may be performed, e.g., by the traffic component 1850 via the reception component 1830 of the apparatus 1802 in FIG. 18.

As illustrated at 1712, the second wireless device may receive a configuration from the network entity for a relaying radio link channel and a first quality of service for the second connection based on the first RAT DRB for the first wireless device. In contrast, at 1714, the second wireless device may manage a second quality of service and a context for the first connection with the first wireless device based on a second RAT. The second wireless device may receive a configuration for a first RAT RLC channel for the SRB for the first wireless device and a second first RAT RLC channel for the DRB for the first wireless device. The configuration may be received, e.g., by the reception component 1830 of the apparatus 1802 in FIG. 18.

As illustrated at 1720, the second wireless device may determine a radio link failure.

For example, the second wireless device may determine a radio link failure for the second connection with the network entity and may release or suspend the first connection with the first wireless device in response to detecting the radio link failure for the second connection, at 1722. The determination of the RLF may be performed, e.g., by the RLF component 1854 of the apparatus 1802 in FIG. 18.

In another example, at 1720, the second wireless device may determine a radio link failure for the second connection with the network entity and may stop discovery advertisement for a RAT of the first connection with the first wireless device in response to detecting the radio link failure for the second connection, e.g., at 1724. The determination of the RLF may be performed, e.g., by the RLF component 1854 of the apparatus 1802 in FIG. 18.

In another example, at 1720, the second wireless device may determine a radio link failure for the first connection with the first wireless device, and, at 1726, the second wireless device may inform the network entity of the radio link failure for the first connection. The determination of the RLF may be performed, e.g., by the RLF component 1854 of the apparatus 1802 in FIG. 18.

Figure 18:
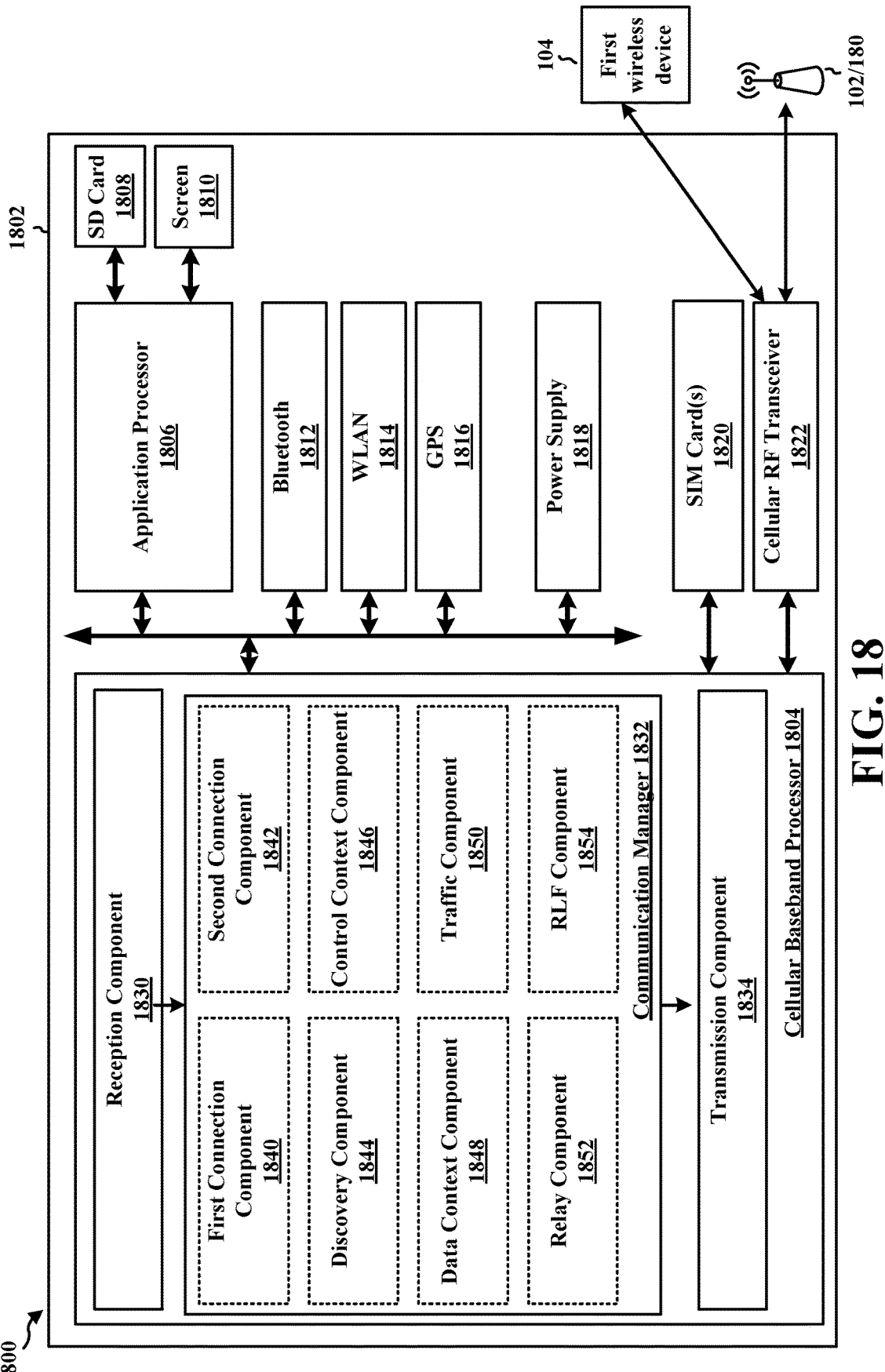
FIG. 18 is a diagram illustrating an example of a hardware implementation for an example apparatus.

FIG. 18 is a diagram 1800 illustrating an example of a hardware implementation for an apparatus 1802. The apparatus 1802 is a wireless device, e.g., a relay UE 104, relay UE 404, 504, 604, 704, 804, 1204. As an example, the apparatus 1802 may be a UE, a component of a UE, or may implement UE functionality. The apparatus 1802 may further include a cellular baseband processor 1804 (also referred to as a modem) coupled to a cellular RF transceiver 1822. The apparatus 1802 may further include one or more SIM cards 1820, an application processor 1806 coupled to an SD card 1808 and a screen 1810, a Bluetooth module 1812, a WLAN module 1814, a GPS module 1816, and/or a power supply 1818. The cellular baseband processor 1804 communicates through the cellular RF transceiver 1822 with the UE 104 and/or BS 102/180. The cellular baseband processor 1804 may include a computer-readable medium/memory. The computer-readable medium/memory may be non-transitory. The cellular baseband processor 1804 is responsible for general processing, including the execution of software stored on the computer-readable medium/memory. The software, when executed by the cellular baseband processor 1804, causes the cellular baseband processor 1804 to perform the various functions described supra. The computer-readable medium/memory may also be used for storing data that is manipulated by the cellular baseband processor 1804 when executing software. The cellular baseband processor 1804 further includes a reception component 1830, a communication manager 1832, and a transmission component 1834. The communication manager 1832 includes the one or more illustrated components. The components within the communication manager 1832 may be stored in the computer-readable medium/memory and/or configured as hardware within the cellular baseband processor 1804. The cellular baseband processor 1804 may be a component of the wireless device 350 and may include the memory 360 and/or at least one of the TX processor 368, the RX processor 356, and the controller/processor 359. In one configuration, the apparatus 1802 may be a modem chip and include just the baseband processor 1804, and in another configuration, the apparatus 1802 may be the entire UE (e.g., see 350 of FIG. 3) and include the additional modules of the apparatus 1802.

The communication manager 1832 includes a first connection component 1840 that is configured to establish a first connection with a second wireless device, e.g., as described in connection with 1604. The communication manager 1832 further includes a second connection component 1842 that establish a second connection with a network to relay traffic to the second wireless device, e.g., as described in connection with 1606. The communication manager 1832 may further include a discovery component 1844 that is configured to perform discovery, e.g., as described in connection with 1702. The communication manager 1832 may further include a control context component 1846 that is configured to receive a control context for the second wireless device, e.g., as described in connection with 1608. The communication manager 1832 may further include a data context component 1848 that is configured to receive a data context for the second wireless device, e.g., as described in connection with 1610. The communication manager 1832 may further include a traffic component 1850 that is configured to receive traffic from the network for the second wireless device, e.g., as described in connection with 1716. The communication manager 1832 may further include a relay component 1852 that is configured to relay traffic between the network and the UE, e.g., as described in connection with 1718. The communication manager 1832 may further include an RLF component 1854 that is configured to determine an RLF and take an action, e.g., as described in connection with any of 1720-1726.

The apparatus may include additional components that perform each of the blocks of the algorithm in the flowcharts of FIG. 4, 5, 8, 12, 16, or 17. As such, each block in the flowcharts of FIG. 4, 5, 8, 12, 16, or 17 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1802, and in particular the cellular baseband processor 1804, includes means for establishing a first connection with a second wireless device to relay traffic between a network entity and the second wireless device, means for establishing a second connection with the network entity to relay the traffic between the network entity and the second wireless device, means for receiving a remote control context from the network entity for the second wireless device, and means for receiving a remote data context from the network entity for the second wireless device. The apparatus 1802 may further include means for performing discovery with the second wireless device based on a discovery procedure for the RAT. The apparatus 1802 may further include means for transmitting an indication that the first wireless device supports relaying to the network entity with a connection for the RAT controlled by the first wireless device. The apparatus 1802 may further include means for performing relaying for multiple UEs using a dedicated first RAT RLC channel for each UE. The apparatus 1802 may further include means for relaying the traffic between the network entity and the second wireless device without an adaptation function. The apparatus 1802 may further include means for receiving the traffic from the network entity over a first RAT SRB or DRB configured by the network entity for the second wireless device; and means for relaying the traffic to the second wireless device over the first connection. The apparatus 1802 may further include means for receiving a configuration from the network entity for a relaying radio link channel and a first quality of service for the second connection based on the first RAT DRB for the second wireless device; and means for managing, by the first wireless device, a second quality of service and a context for the first connection with the second wireless device based on a second RAT. The apparatus 1802 may further include means for detecting a radio link failure for the second connection with the network entity; and means for releasing or suspending the first connection with the second wireless device in response to detecting the radio link failure for the second connection. The apparatus 1802 may further include means for detecting a radio link failure for the second connection with the network entity; and means for stopping discovery advertisement for a RAT of the first connection with the second wireless device in response to detecting the radio link failure for the second connection. The apparatus 1802 may further include means for detecting a radio link failure for the first connection with the second wireless device; and means for informing the network entity of the radio link failure for the first connection. The means may be one or more of the components of the apparatus 1802 configured to perform the functions recited by the means. As described supra, the apparatus 1802 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 19:
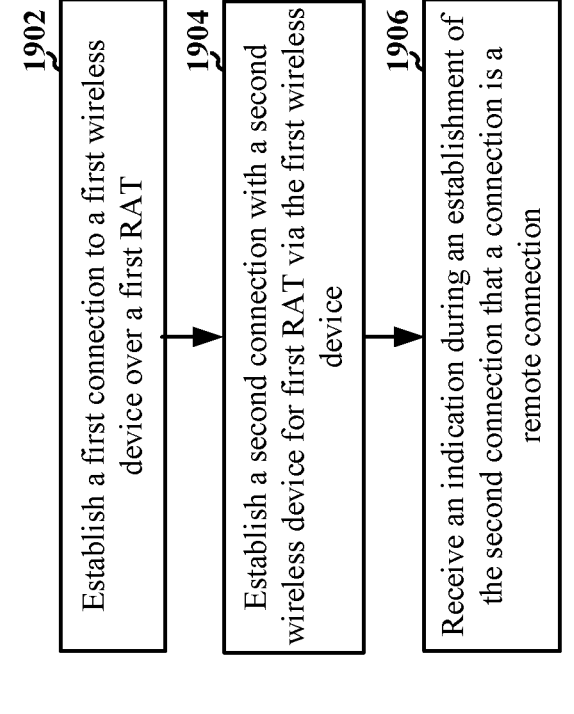
FIG. 19 is a flowchart of a method of wireless communication.

FIG. 19 is a flowchart 1900 of a method of wireless communication. The method may be performed by a network entity, e.g., a base station 102, 180, CU 406, DU 404, RAN 506, 806, 1206, base station 904, core network component; the apparatus 1802. The method may enable a network entity to establish a connection with a remote device by providing a L2 relay based on a remote connection.

At 1902, the network entity establishes a first connection to a first wireless device over a first RAT. The first connection may comprise a Uu connection. The establishment of the first connection may be performed, e.g., by the first connection component 2140 of the apparatus 2102 in FIG. 21.

At 1904, the network entity establishes a second connection with a second wireless device for first RAT via the first wireless device. Establishing the second connection to the second wireless device may include establishing a security context with the second wireless device for the first RAT and establishing a PDU session with the second wireless device for the first RAT, e.g., as described in connection with any of FIGS. 4-9 and 12. The establishment of the second connection may be performed, e.g., by the second connection component 2142 of the apparatus 2102 in FIG. 21.

At 1906, the network entity receives an indication during an establishment of the second connection that a connection is a remote connection. The reception may be performed, e.g., by the indication component 2144 of the apparatus 2102 in FIG. 21. Reception of the indication that the second connection is the remote connection, at 1906, may include receiving the indication that indicates that the network entity is unreachable or unsuitable over a first RAT interface and/or receiving capability information from the second wireless device via the first wireless device, the capability information indicating a type of RAT for the second connection between the first wireless device and second wireless device and indicating that the remote connection is managed by one or more of the second wireless device or the first wireless device. In some aspects, the suitability may be based on a quality of a Uu connection. The UE may determine that the Uu connection is not available or is not suitable based on a quality measurement being below a threshold. In some examples, the network entity may have a connection with the UE, and a quality of the connection may change. Thus, an unsuitable connection may be based on a change in a quality of the connection. The second RAT connection may comprise at least one of a sidelink interface (such as a PC5 interface), a BLE interface, a WiFi-D interface, a WiFi interface, or a BL regular interface. The capability information may further indicate whether the second wireless device supports a first type of relayed communication with the network entity or a second type of relayed communication with the network entity. The first type of relayed communication may be based on the second connection being configured by the network entity, e.g., as in FIGS. 10 and 11, and the second type of relayed communication is based on the second connection being configured by the first wireless device or the second wireless device, e.g., as in FIGS. 6 and 7. The network entity may transmit one or more configuration parameters for the second connection based on the capability information.

FIG. 20 illustrates a flowchart 2000 of a method of wireless communication. The method may include aspects described in connection with FIG. 19. The method may be performed by a network entity, e.g., a base station 102, 180, CU 406, DU 404, RAN 506, 806, 1206, base station 904, core network component; the apparatus 2102. The method may enable the remote UE to establish a connection with a network device via a second wireless device based on a remote connection. Aspects that have been described in connection with FIG. 19, are shown with the same reference number. A method may include any subset, or combination, of aspects described in connection with FIGS. 19 and/or 20.

The first wireless device may relay to multiple UEs, and at 2014, the network entity may configure multiple RLC channels for the first wireless device based on a first RAT of the network entity, an RLC channel for each of the multiple UEs.

At 2016, the network entity may configure a QoS for the first RAT connection with the first wireless device. The configuration may be performed, e.g., by the configuration component 2150 of the apparatus 2102 in FIG. 21.

As illustrated at 2008, the network entity may transmit initial messages for RRC setup, RRC resume, or RRC reestablishment to the second wireless device via the first wireless device on a first SRB corresponding to a first RAT of the network entity, and at 2012, may transmit RRC messages on a second SRB corresponding to the first RAT after establishing a security context with the second wireless device, e.g., such as described in connection with FIG. 8 or 12. The transmission may be performed, e.g., by the RRC component 2146 of the apparatus 2102 in FIG. 21. As illustrated at 2010, the network entity may transmit, to the second wireless device via the first wireless device, a configuration of the second SRB for the first RAT and a DRB for exchanging the traffic with the network entity.

As illustrated at 2020, the network entity may receive measurements from one or more of the first wireless device and the second wireless device, and at 2022, the network entity may select a third wireless device based on the measurements. The reception may be performed, e.g., by the reception component 2130 of the apparatus 2102 in FIG. 21. The network entity may indicate for the second wireless device to connect to the third wireless device for relaying communication between the second wireless device and the network entity. The indication may be performed, e.g., by the indication component 2144 via the transmission component 2134 of the apparatus 2102 in FIG. 21. In some examples, the network entity may configure the second wireless device to perform measurements based on a first RAT of the network entity, at 2018, and may receive a measurement report, from the second wireless device based on the configuration, at 2020. The configuration may be performed, e.g., by the configuration component 2150 and the report may be received by the report component 2152 of the apparatus 2102 in FIG. 21. The network entity may configure the second wireless device over a connection based on the first RAT or via the second RAT connection to perform the measurements. The measurement report may be received from the second wireless device over the connection based on the first RAT or via the second RAT connection. The measurements may comprise RRM measurements.

At 2028, the network entity may receive an indication of radio link failure from the first wireless device for the second RAT connection between the first wireless device and the second wireless device, and at 2030, may release a context for the second wireless device based on the indication. The reception may be performed, e.g., by the indication component 2144 of the apparatus 2102 in FIG. 21.

As illustrated at 2024, the network entity may receive, from the second wireless device, one or more of a prior PCI, a C-RNTI for the second wireless device, or a short MAC-I. The network entity may retrieve a context for the second wireless device based on the prior PCI. The reception may be performed by the C-RNTI component 2154 via the reception component 2130 of the apparatus 2102.

The network entity may transmit a C-RNTI to the second wireless device via the first wireless device in a RRC setup message or an RRC resume message, or RRC reestablishment message. The transmission may be performed, e.g., by the C-RNTI component 2154 via the transmission component 2134 of the apparatus 2102 in FIG. 21.

For example, the network entity may receive a first C-RNTI from the first wireless device, at 1724, and may transmit a second C-RNTI to the second wireless device, at 1726, via the first wireless device in a RRC reestablishment message. The reception may be performed, e.g., by the C-RNTI component 2154 via the reception component 2130 of the apparatus 2102 in FIG. 21.

Figure 21:
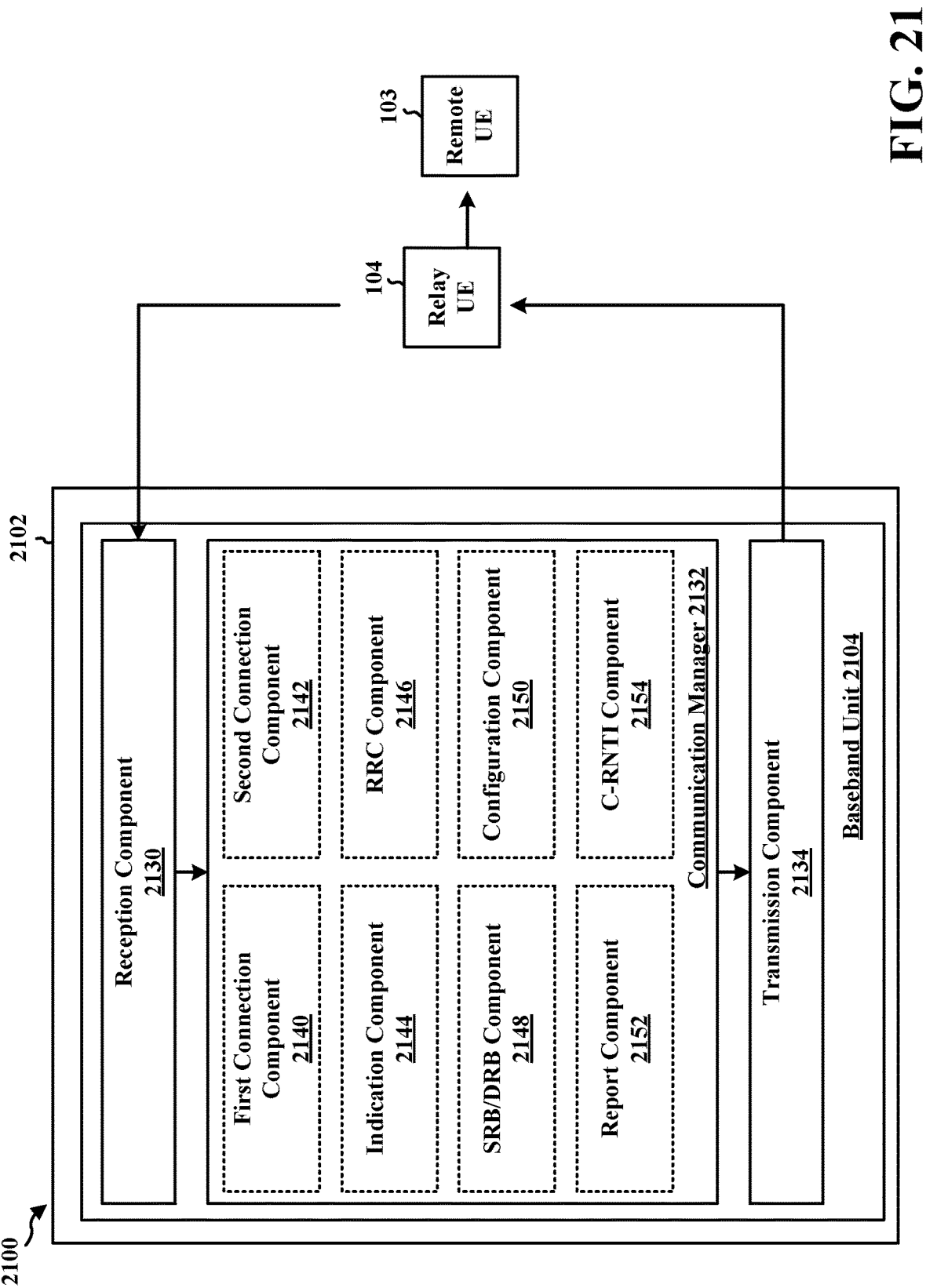
FIG. 21 is a diagram illustrating an example of a hardware implementation for an example apparatus.

FIG. 21 is a diagram 2100 illustrating an example of a hardware implementation for an apparatus 2102. The apparatus 2102 may be a network entity, a component of a network entity, or may implement network functionality. As an example, the apparatus 2102, may be a base station 102, 180, CU 406, DU 404, RAN 506, 806, 1206, base station 904, core network component. The apparatus 2102 includes a baseband unit 2104. The baseband unit 2104 may communicate through a cellular RF transceiver with the UE 104. The baseband unit 2104 may include a computer-readable medium/memory. The baseband unit 2104 is responsible for general processing, including the execution of software stored on the computer-readable medium/memory. The software, when executed by the baseband unit 2104, causes the baseband unit 2104 to perform the various functions described supra. The computer-readable medium/memory may also be used for storing data that is manipulated by the baseband unit 2104 when executing software. The baseband unit 2104 further includes a reception component 2130, a communication manager 2132, and a transmission component 2134. The communication manager 2132 includes the one or more illustrated components. The components within the communication manager 2132 may be stored in the computer-readable medium/memory and/or configured as hardware within the baseband unit 2104. The baseband unit 2104 may be a component of the wireless device 310 and may include the memory 376 and/or at least one of the TX processor 316, the RX processor 370, and the controller/processor 375.

The communication manager 2132 includes a first connection component 2140 that is configured to establish a first connection over a first RAT with a first wireless device, e.g., as described in connection with 1902. The communication manager 2132 further includes a second connection component 2142 is configured to establish a second connection with a second wireless device for first RAT via the first wireless device, e.g., as described in connection with 1904. The communication manager 2132 further includes an indication component 2144 configured to receive an indication that a connection is a remote connection, e.g., as described in connection with 1906. The apparatus 2102 may further include an RRC component 2146 configured to perform the aspects described in connection with 2008 and/or 2012. The apparatus 2102 may further include an SRB/DRB component 2148 configured to perform the aspects described in connection with 2008, 2010, and/or 2012. The apparatus 2102 may further include a configuration component 2150 that provides configurations, e.g., as described in connection with any of 2014, 2016, 2018, etc. The apparatus may further include a report component 2152 configured to receive RRM measurements and/or indications of RLF, e.g., as described in connection with 2020 and/or 2028. The apparatus may further include a C-RNTI component 2154 configured to receive a C-RNTI and/or to transmit a C-RNTI in an RRC message, e.g., as described in connection with 2024 or 2026.

The apparatus may include additional components that perform each of the blocks of the algorithm in the flowcharts of FIG. 4, 5, 6, 7, 8, 9, 12, 19, or 20. As such, each block in the flowcharts of FIG. 4, 5, 6, 7, 8, 9, 12, 19, or 20 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 2102, and in particular the baseband unit 2104, includes means for means for establishing a first connection to a first wireless device over a first RAT; means for establishing a second connection with a second wireless device for first RAT via the first wireless device; and means for receiving an indication during an establishment of the second connection that a connection is a remote connection. The apparatus 2102 may further include means for establishing a security context with the second wireless device for the first RAT; and means for establishing a PDU session with the second wireless device for the first RAT. The apparatus 2102 may further include means for configuring multiple RLC channels for the first wireless device based on a first RAT of the network entity, an RLC channel for each of the multiple UEs. The apparatus 2102 may further include means for configuring a QoS for the first RAT connection with the first wireless device. The apparatus 2102 may further include means for transmitting initial messages for RRC setup, RRC resume, or RRC reestablishment to the second wireless device via the first wireless device on a first SRB corresponding to a first RAT of the network entity; and means for transmitting RRC messages on a second SRB corresponding to the first RAT after establishing a security context with the second wireless device. The apparatus 2102 may further include means for transmitting, to the second wireless device via the first wireless device, a configuration of the second SRB for the first RAT and a DRB for exchanging the traffic with the network entity. The apparatus 2102 may further include means for receiving the indication that indicates that the network entity is not reachable over a first RAT interface; and means for receiving capability information from the second wireless device via the first wireless device, the capability information indicating a type of RAT for the second connection between the first wireless device and second wireless device and indicating that the remote connection is managed by one or more of the second wireless device or the first wireless device. The apparatus 2102 may further include means for transmitting one or more configuration parameters for the second connection based on the capability information. The apparatus 2102 may further include means for receiving measurements from one or more of the first wireless device and the second wireless device; means for selecting a third wireless device based on the measurements; and means for indicating for the second wireless device to connect to the third wireless device for relaying communication between the second wireless device and the network entity. The apparatus 2102 may further include means for receiving, from the second wireless device, one or more of a prior PCI, a C-RNTI for the second wireless device, or a short MAC-I. The apparatus 2102 may further include means for retrieving a context for the second wireless device based on the prior PCI. The apparatus 2102 may further include means for configuring the second wireless device to perform measurements based on a first RAT of the network entity; and means for receiving a measurement report, from the second wireless device based on the configuration. The apparatus 2102 may further include means for receiving an indication of radio link failure from the first wireless device for the second RAT connection between the first wireless device and the second wireless device; and means for releasing a context for the second wireless device based on the indication. The apparatus 2102 may further include means for transmitting a C-RNTI to the second wireless device via the first wireless device in an RRC setup message or an RRC resume message. The apparatus 2102 may further include means for receiving a first C-RNTI the first wireless device; and means for transmitting a second C-RNTI to the second wireless device via the first wireless device in an RRC reestablishment message. The means may be one or more of the components of the apparatus 2102 configured to perform the functions recited by the means. As described supra, the apparatus 2102 may include the TX Processor 316, the RX Processor 370, and the controller/processor 375. As such, in one configuration, the means may be the TX Processor 316, the RX Processor 370, and the controller/processor 375 configured to perform the functions recited by the means.

FIG. 25 is a flowchart 2500 of a method of wireless communication. The method may be performed by a first wireless device, e.g., a remote device 103, wireless device 402, remote UE 502, 602, 702, 802, 902, 1202; the apparatus 1502. The method may enable the remote UE to establish a connection with a network device via a second wireless device based on a remote connection.

At 2502, the first wireless device establishes a first connection to a second wireless device. The establishment of the first connection may be based on a determination that the network entity is not reachable via a first RAT interface and/or a discovery the second wireless device based on a discovery procedure for a second RAT, e.g., as described in connection with FIG. 4 or FIG. 5, for example. Discovering the second wireless device may further include the first wireless device receiving an indication that the second wireless device supports relaying to the network entity over the first RAT via a remote connection. In some examples, the second wireless device may be a relay UE, such as described in connection with any of FIGS. 4-12.

At 2504, the first wireless device establishes a second connection with a network entity via the second wireless device. The first RAT may comprise a Uu interface, such as an NR Uu interface, and the second RAT may comprise a non-Uu interface, such at least one of a PC5 interface, a BLE interface, a WiFi-D interface, a WiFi interface, or a BL regular interface. For example, the establishment of the second connection with the network entity may further include establishing a context with the network entity via the second wireless device and establishing a PDU session with the network entity for a first RAT via the second wireless device, such as described in connection with FIG. 5 or FIG. 8.

At 2506, the first wireless device indicates during an establishment of the second connection that a connection is a remote connection. The first connection and/or the second connection may be a remote connection. For example, the first connection may be a remote connection, such as described in connection with FIGS. 6 and 7 and may be managed by one or more of the second wireless device or the first wireless device. The indication of the remote connection to the network entity may include indicating that the network entity is not reachable over a first RAT interface and/or transmitting a capability indicating a type of a second RAT for the first connection. The capability may further indicate whether the first wireless device supports a first type of relayed communication with the network entity or a second type of relayed communication with the network entity, e.g., as described in connection with FIGS. 6, 7, 10, and 11. The first type of relayed communication may be based on the first connection being configured by the network entity, such as in FIGS. 10 and 11, and the second type of relayed communication may be based on the first connection being configured by the first or second wireless device, e.g., such as in FIGS. 6 and 7. The capability may indicate that the first wireless device supports the first type of relayed communication, and the first wireless device may receive one or more configuration parameters from the network entity for the first connection based on the type of the second RAT indicated in the capability.

As illustrated at 2508, the first wireless device may receive initial messages for RRC setup, RRC resume, or RRC reestablishment from the network entity via the second wireless device on a first SRB corresponding to a first RAT of the network entity, and at 2512, may receive RRC messages on a second SRB corresponding to the first RAT after establishing the security context with the network entity, e.g., as described in connection with FIG. 8 and/or FIG. 12. As illustrated at 2510, the first wireless device may receive, from the network entity via the second wireless device, a configuration of the second SRB and a DRB for exchanging wireless traffic with the network entity.

As illustrated at 2516, the first wireless device may select a target path with a third wireless device to relay wireless traffic to the network entity. The first wireless device may select the target path based on a reselection procedure for a RAT for the second connection. As illustrated at 2514, the first wireless device may receive, from the network entity, an indication to connect to the third wireless device to relay the wireless traffic to the network entity, wherein the first wireless device selects the target path based on the indication from the network entity. In other examples, the first wireless device may make the selection without input from the network.

At 2518, the first wireless device reestablishes a security context and a PDU session with the network entity via the third wireless device.

As illustrated at 2522, the first wireless device may transmit a measurement to the network entity via the second wireless device, wherein the indication to connect to the third wireless device is based on the measurement.

In some examples, the first wireless device may provide, at 2524, one or more of a prior PCI, a C-RNTI for the first wireless device, or a short MAC-I to the network entity, e.g., such as described in connection with FIG. 9 and/or FIG. 12.

As illustrated at 2520, the first wireless device may perform measurements for a first RAT of the network entity, where the measurements are configured by the network entity over the first RAT connection or via the second connection. The first wireless device may transmit, at 2522, a measurement report to the network entity over the first RAT connection or via the second connection. The measurements may comprise one or more of RRM measurements.

As illustrated at 2526, the first wireless device may receive an indication to release the first connection due to radio link failure from the second wireless device for a link between the second wireless device and the network entity.

As illustrated at 2528, the first wireless device may receive a C-RNTI from the network entity via the second wireless device in a RRC setup message or an RRC resume message, or RRC reestablishment message, e.g., as described in connection with FIG. 8 or FIG. 12. In some examples, the first wireless device may provide a first C-RNTI to the network entity, e.g., as described in connection with FIG. 12, and may receive a second C-RNTI from the network entity via the second wireless device in a RRC reestablishment message.

FIG. 26 is a flowchart 2600 of a method of wireless communication. The method may be performed by a first wireless device, e.g., a relay UE 104, relay UE 404, 504, 604, 704, 804, 1204; the apparatus 1802. The method may enable a remote UE to establish a connection with a network device by providing a L2 relay based on a remote connection.

At 2604, the first wireless device establishes a first connection with a second wireless device to relay traffic between a network entity and the second wireless device. The first connection may be managed by one or more of the first wireless device or the second wireless device, e.g., as a remote connection. The first connection may include a non-Uu interface, for example. The first connection may be for a RAT that is different than the second connection, and as illustrated at 2602, the first wireless device may perform discovery with the second wireless device based on a discovery procedure for the RAT. Performing the discovery with the second wireless device may further comprise transmitting an indication that the first wireless device supports relaying to the network entity with a connection for the RAT controlled by the first wireless device.

At 2606, the first wireless device establishes a second connection with the network entity to relay the traffic between the network entity and the second wireless device;

At 2608, the first wireless device receives a remote control context from the network entity for the second wireless device. At 2610, the first wireless device receives a remote data context from the network entity for the second wireless device.

As illustrated at 2618, the first wireless device may perform relaying for the first wireless device, e.g., as described in connection with any of FIGS. 4-9 and 12. The first wireless device may perform relaying for multiple UEs using a dedicated first RAT RLC channel for each UE. The first wireless device may relay the traffic between the network entity and the second wireless device without an adaptation function. The first wireless device may relay the traffic based on a mapping between a first RAT link with the network entity for relaying to the second wireless device and a second RAT link with the second wireless device.

As illustrated at 2616, the first wireless device may receive the traffic from the network entity over a first RAT SRB or DRB configured by the network entity for the second wireless device and may relay the traffic to the second wireless device over the first connection, at 2618.

As illustrated at 2612, the first wireless device may receive a configuration from the network entity for a relaying radio link channel and a first quality of service for the second connection based on the first RAT DRB for the second wireless device. In contrast, at 2614, the first wireless device may manage a second quality of service and a context for the first connection with the second wireless device based on a second RAT. The first wireless device may receive a configuration for a first RAT RLC channel for the SRB for the second wireless device and a second first RAT RLC channel for the DRB for the second wireless device.

As illustrated at 2620, the first wireless device may determine a radio link failure. For example, the first wireless device may determine a radio link failure for the second connection with the network entity and may release or suspend the first connection with the second wireless device in response to detecting the radio link failure for the second connection, at 2622.

In another example, at 2620, the first wireless device may determine a radio link failure for the second connection with the network entity and may stop discovery advertisement for a RAT of the first connection with the second wireless device in response to detecting the radio link failure for the second connection, e.g., at 2624.

In another example, at 2620, the first wireless device may determine a radio link failure for the first connection with the second wireless device, and, at 2626, the first wireless device may inform the network entity of the radio link failure for the first connection.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and aspects thereof may be combined with aspects of other examples or teaching described herein, without limitation.

Aspect 1 is a method of wireless communication at a first wireless device, comprising: establishing a first connection to a second wireless device; establishing a second connection with a network entity via the second wireless device; and indicating during an establishment of the second connection that a connection is a remote connection.

In aspect 2, the method of aspect 1 further includes establishing the first connection, is based on: determining that the network entity is not reachable via a first RAT interface; and discovering the second wireless device based on a discovery procedure for a second RAT.

In aspect 3, the method of aspect 1 or 2 further includes discovering the second wireless device further comprises: receiving an indication that the second wireless device supports relaying to the network entity over the first RAT via a remote connection.

In aspect 4, the method of any of aspects 1-3 further includes that the first RAT comprises a NR Uu interface and the second RAT comprises at least one of a PC5 interface, a BLE interface, a WiFi-D interface, a WiFi interface, or a BL regular interface.

In aspect 5, the method of any of aspects 1-4 further includes that the first connection is a remote connection and is managed by one or more of the second wireless device or the first wireless device.

In aspect 6, the method of any of aspects 1-5 further includes that establishing the second connection with the network entity, further comprises: establishing a context with the network entity via the second wireless device; and establishing a PDU session with the network entity for a first RAT via the second wireless device.

In aspect 7, the method of any of aspects 1-6 further includes receiving initial messages for RRC setup, RRC resume, or RRC reestablishment from the network entity via the second wireless device on a first SRB corresponding to a first RAT of the network entity; and receiving RRC messages on a second SRB corresponding to the first RAT after establishing the security context with the network entity.

In aspect 8, the method of any of aspects 1-7 further includes receiving, from the network entity via the second wireless device, a configuration of the second SRB and a DRB for exchanging wireless traffic with the network entity.

In aspect 9, the method of any of aspects 1-8 further includes that indicating the remote connection to the network entity, further comprises: indicating that the network entity is not reachable over a first RAT interface; and transmitting a capability indicating a type of a second RAT for the first connection.

In aspect 10, the method of any of aspects 1-9 further includes that the capability further indicates whether the first wireless device supports a first type of relayed communication with the network entity or a second type of relayed communication with the network entity.

In aspect 11, the method of any of aspects 1-10 further includes that the first type of relayed communication is based on the first connection configured by the network entity and the second type of relayed communication is based on the first connection configured by the first or second wireless device.

In aspect 12, the method of any of aspects 1-11 further includes that the capability indicates that the first wireless device supports the first type of relayed communication, the method further comprising: receiving one or more configuration parameters from the network entity for the first connection based on the type of the second RAT indicated in the capability.

In aspect 13, the method of any of aspects 1-12 further includes that selecting a target path with a third wireless device to relay wireless traffic to the network entity; and reestablishing a security context and a PDU session with the network entity via the third wireless device.

In aspect 14, the method of aspect 13 further includes that the first wireless device selects the target path based on a reselection procedure for a RAT for the second connection.

In aspect 15, the method of any of aspect 14 further includes receiving, from the network entity, an indication to connect to the third wireless device to relay the wireless traffic to the network entity, wherein the first wireless device selects the target path based on the indication from the network entity.

In aspect 16, the method of aspect 15 further includes transmitting a measurement to the network entity via the second wireless device, wherein the indication to connect to the third wireless device is based on the measurement.

In aspect 17, the method of any of aspects 1-16 further includes reestablishing the security context and the PDU session with the network entity via the third wireless device.

In aspect 18, the method of any of aspects 1-17 further includes providing one or more of a prior PCI, a C-RNTI for the first wireless device, or a short MAC-I to the network entity.

In aspect 19, the method of any of aspects 1-18 further includes performing measurements for a first RAT of the network entity, wherein the measurements are configured by the network entity over the first RAT connection or via the second connection.

In aspect 20, the method of aspect 19 further includes sending a measurement report to the network entity over the first RAT connection or via the second connection.

In aspect 21, the method of aspect 20 further includes that the measurements comprise one or more of RRM measurements.

In aspect 22, the method of any of aspects 1-21 further includes receiving an indication to release the first connection due to radio link failure from the second wireless device for a link between the second wireless device and the network entity.

In aspect 23, the method of any of aspects 1-22 further includes receiving a C-RNTI from the network entity via the second wireless device in a RRC setup message or an RRC resume message.

In aspect 24, the method of any of aspects 1-22 further includes providing a first C-RNTI to the network entity; and receiving a second C-RNTI from the network entity via the second wireless device in a RRC reestablishment message.

Aspect 25 is a method of wireless communication at a first wireless device, comprising: establishing a first connection to a second wireless device; establishing a second connection with a network entity via the second wireless device; and transmitting a message to the network entity via the second wireless device, the message indicating that the second connection is a remote connection.

In aspect 26, the method of aspect 25 further includes that the UE transmits the message during an establishment of the second connection.

In aspect 27, the method of aspect 25 or aspect 26 further includes establishing the first connection, is based on: determining that the network entity is unreachable or unsuitable for wireless communication via a first RAT interface and discovery of the second wireless device based on a discovery procedure for a second RAT.

In aspect 28, the method of any of aspects 25-27, wherein to discover the second wireless device, the method further comprises: receiving an indication that the second wireless device supports relaying to the network entity over the first RAT via a remote connection.

In aspect 29, the method of any of aspects 25-28 further includes that the first RAT comprises a NR Uu interface and the second RAT comprises sidelink.

In aspect 30, the method of any of aspects 25-28 further includes that the first RAT comprises an NR Uu interface and the second RAT comprises at least one of a BLE interface, a WiFi-D interface, a WiFi interface, or a BL regular interface.

In aspect 31, the method of any of aspects 25-30 further includes that the first connection is a remote connection and is managed by one or more of the second wireless device or the first wireless device.

In aspect 32, the method of any of aspects 25-31 further includes that establishing the second connection with the network entity, further comprises: establishing a context with the network entity via the second wireless device; and establishing a PDU session with the network entity for a first RAT via the second wireless device.

In aspect 33, the method of any of aspects 25-32 further includes receiving initial messages for RRC setup, RRC resume, or RRC reestablishment from the network entity via the second wireless device on a first SRB corresponding to a first RAT of the network entity; and receiving RRC messages on a second SRB corresponding to the first RAT after establishing the security context with the network entity.

In aspect 34, the method of any of aspects 25-33 further includes receiving, from the network entity via the second wireless device, a configuration of the second SRB and a DRB for exchanging wireless traffic with the network entity.

In aspect 35, the method of any of aspects 25-34 further includes that indicating the remote connection to the network entity, further comprises: indicating that the network entity is not reachable over a first RAT interface; and transmitting an indication of support for a capability associated with a type of a second RAT for the first connection.

In aspect 36, the method of any of aspects 25-35 further comprising indicating whether the first wireless device supports a first type of relayed communication with the network entity or a second type of relayed communication with the network entity.

In aspect 37, the method of any of aspects 25-36 further includes that the first type of relayed communication is based on the first connection configured by the network entity and the second type of relayed communication is based on the first connection configured by the first or second wireless device.

In aspect 38, the method of any of aspects 25-37 further includes that the capability indicates that the first wireless device supports the first type of relayed communication, the method further comprising: receiving one or more configuration parameters from the network entity for the first connection based on the type of the second RAT indicated in the capability.

In aspect 39, the method of any of aspects 25-38 further includes that selecting a target path with a third wireless device to relay wireless traffic to the network entity; and reestablishing a security context and a PDU session with the network entity via the third wireless device.

In aspect 40, the method of aspect 39 further includes that the first wireless device selects the target path based on a reselection procedure for a RAT for the second connection.

In aspect 41, the method of any of aspect 39 further includes receiving, from the network entity, an indication to connect to the third wireless device to relay the wireless traffic to the network entity, wherein the first wireless device selects the target path based on the indication from the network entity.

In aspect 42, the method of aspect 41 further includes transmitting a measurement to the network entity via the second wireless device, wherein the indication to connect to the third wireless device is based on the measurement.

In aspect 43, the method of any of aspects 25-38 further includes reestablishing the security context and the PDU session with the network entity via the third wireless device.

In aspect 44, the method of any of aspects 25-43 further includes providing one or more of a prior PCI, a C-RNTI for the first wireless device, or a short MAC-I to the network entity.

In aspect 45, the method of any of aspects 25-44 further includes performing measurements for a first RAT of the network entity, wherein the measurements are configured by the network entity over the first RAT connection or via the second connection.

In aspect 46, the method of aspect 45 further includes sending a measurement report to the network entity over the first RAT connection or via the second connection.

In aspect 47, the method of aspect 46 further includes that the measurements comprise one or more of RRM measurements.

In aspect 48, the method of any of aspects 25-47 further includes receiving an indication to release the first connection due to radio link failure from the second wireless device for a link between the second wireless device and the network entity.

In aspect 49, the method of any of aspects 25-48 further includes receiving a C-RNTI from the network entity via the second wireless device in a RRC setup message or an RRC resume message.

In aspect 50, the method of any of aspects 25-48 further includes providing a first C-RNTI to the network entity; and receiving a second C-RNTI from the network entity via the second wireless device in a RRC reestablishment message.

Aspect 51 is an apparatus for wireless communication comprising memory and at least one processor coupled to the memory, the memory and the at least one processor being configured to perform the method of any of aspects 25-50.

In aspect 52, the apparatus of aspect 51 further includes at least one antenna and a transceiver coupled to the at least one antenna and the at least one processor.

Aspect 53 is an apparatus for wireless communication means to perform the method of any of aspects 25-50.

In aspect 54, the apparatus of aspect 53 further includes at least one antenna and a transceiver coupled to the at least one antenna and the at least one processor.

Aspect 55 is a non-transitory computer-readable storage medium storing computer executable code, the code when executed by one or more processors cause the one or more processors to perform a method as in any of aspects 25-50.

Aspect 56 is a device including one or more processors and one or more memories in electronic communication with the one or more processors storing instructions executable by the one or more processors to cause the device to implement a method as in any of aspects 25-50.

Aspect 57 is a system or apparatus including means for implementing a method or realizing an apparatus as in any of aspects 25-50.

Aspect 58 is a method of wireless communication at a second wireless device, comprising: establishing a first connection with a first wireless device to relay traffic between a network entity and the first wireless device; establishing a second connection with the network entity to relay the traffic between the network entity and the first wireless device; receiving a remote control context from the network entity for the first wireless device; and receiving a remote data context from the network entity for the first wireless device.

Aspect 59 is a method of wireless communication to relay traffic for a first wireless device by a second wireless device, comprising: establishing a first connection with the first wireless device to relay traffic between a network entity and the first wireless device; establishing a second connection with the network entity to relay the traffic between the network entity and the first wireless device; receiving a configuration from the network entity for the second connection between the network entity and the second wireless device for relaying the traffic to the first wireless device.

In aspect 60, the method of aspect 58 or 59 further includes that the first connection is managed by one or more of the first wireless device or the second wireless device.

In aspect 61, the method of any of aspects 58, 59 or 60 further includes that the first connection is for a RAT that is different than the second connection, the method further comprising: performing discovery with the first wireless device based on a discovery procedure for the RAT.

In aspect 62, the method of any of aspects 58-61 further includes that performing the discovery with the first wireless device further comprises: transmitting an indication that the second wireless device supports relaying to the network entity with a connection for the RAT controlled by the first wireless device or the second wireless device.

In aspect 63, the method of any of aspects 58-62 further includes performing relaying for multiple UEs using a dedicated first RAT RLC channel for each UE.

In aspect 64, the method of any of aspects 58-63 further includes relaying the traffic between the network entity and the first wireless device without an adaptation function.

In aspect 65, the method of any of aspects 58-64 further includes that the second wireless device relays the traffic based on a mapping between a first RAT link with the network entity for relaying to the first wireless device and a second RAT link with the first wireless device.

In aspect 66, the method of any of aspects 58-65 further includes receiving the traffic from the network entity over a first RAT SRB or DRB configured by the network entity for the first wireless device; and relaying the traffic to the first wireless device over the first connection.

In aspect 67, the method of any of aspects 58-66 further includes receiving a configuration from the network entity for a relaying radio link channel and a first quality of service for the second connection based on the first RAT DRB for the first wireless device; and managing, by the second wireless device, a second quality of service and a context for the first connection with the first wireless device based on a second RAT.

In aspect 68, the method of any of aspects 58-67 further includes that the second wireless device receives a configuration for a first RAT RLC channel for the SRB for the first wireless device and a second first RAT RLC channel for the DRB for the first wireless device.

In aspect 69, the method of any of aspects 58-68 further includes detecting a radio link failure for the second connection with the network entity; and releasing or suspending the first connection with the second wireless device in response to detecting the radio link failure for the second connection.

In aspect 70, the method of any of aspects 58-68 further includes detecting a radio link failure for the second connection with the network entity; and stopping discovery advertisement for a RAT of the first connection with the first wireless device in response to detecting the radio link failure for the second connection.

In aspect 71, the method of any of aspects 58-68 further includes detecting a radio link failure for the first connection with the first wireless device; and informing the network entity of the radio link failure for the first connection.

Aspect 72 is an apparatus for wireless communication comprising memory and at least one processor coupled to the memory, the memory and the at least one processor being configured to perform the method of any of aspects 58-71.

In aspect 73, the apparatus of aspect 72 further includes at least one antenna and a transceiver coupled to the at least one antenna and the at least one processor.

Aspect 74 is an apparatus for wireless communication comprising means to perform the method of any of aspects 58-71.

In aspect 75, the apparatus of aspect 74 further includes at least one antenna and a transceiver coupled to the at least one antenna and the at least one processor.

Aspect 76 is a non-transitory computer-readable storage medium storing computer executable code, the code when executed by one or more processors cause the one or more processors to perform a method as in any of aspects 58-71.

Aspect 77 is a method of wireless communication at a network entity, comprising: establishing a first connection to a first wireless device over a first RAT; establishing a second connection with a second wireless device for first RAT via the first wireless device; and receiving an indication that the second connection is a remote connection.

In aspect 78, the method of aspect 77 further includes receiving the indication during an establishment of the second connection.

In aspect 79, the method of aspect 77 or aspect 78 further includes establishing the second connection to the second wireless device includes: establishing a security context with the second wireless device for the first RAT; and establishing a PDU session with the second wireless device for the first RAT.

In aspect 80, the method of any of aspects 77-79 further includes that the first connection comprises a Uu connection.

In aspect 81, the method of any of aspects 77-80 further includes that the first wireless device relays to multiple UEs, the method further comprising: configuring multiple RLC channels for the first wireless device based on a first RAT of the network entity, an RLC channel for each of the multiple UEs.

In aspect 82, the method of any of aspects 77-81 further includes configuring a QoS for the first RAT connection with the first wireless device.

In aspect 83, the method of any of aspects 77-82 further includes transmitting initial messages for RRC setup, RRC resume, or RRC reestablishment to the second wireless device via the first wireless device on a first SRB corresponding to a first RAT of the network entity; and transmitting RRC messages on a second SRB corresponding to the first RAT after establishing a security context with the second wireless device.

In aspect 84, the method of any of aspects 77-83 further includes transmitting, to the second wireless device via the first wireless device, a configuration of the second SRB for the first RAT and a DRB for exchanging the traffic with the network entity.

In aspect 85, the method of any of aspects 77-84 further includes that receiving the indication that the second connection is the remote connection further comprises: receiving the indication that indicates that the network entity is not reachable over a first RAT interface; and receiving capability information from the second wireless device via the first wireless device, the capability information indicating a type of RAT for the second connection between the first wireless device and second wireless device and indicating that the remote connection is managed by one or more of the second wireless device or the first wireless device.

In aspect 86, the method of any of aspects 77-85 further includes that receiving the indication that the second connection is the remote connection further comprises: receiving the indication that indicates that the network entity is unreachable or unsuitable for wireless traffic over a first RAT interface; and receiving capability information from the second wireless device via the first wireless device, the capability information indicating a type of RAT for the second connection between the first wireless device and second wireless device and indicating that the remote connection is managed by one or more of the second wireless device or the first wireless device.

In aspect 87, the method of any of aspects 77-86 further includes that the first RAT connection comprises an NR Uu connection and the second RAT connection comprises sidelink.

In aspect 88, the method of any of aspects 77-86 further includes that the first RAT connection comprises an NR Uu connection and the second RAT connection comprises at least one of a BLE connection, a WiFi-D connection, a WiFi connection, or a BL regular connection.

In aspect 89, the method of any of aspects 77-88 further includes that the capability information further indicates whether the second wireless device supports a first type of relayed communication with the network entity or a second type of relayed communication with the network entity.

In aspect 90, the method of aspect 89 further includes that the first type of relayed communication is based on the second connection being configured by the network entity and the second type of relayed communication is based on the second connection being configured by the first wireless device or the second wireless device.

In aspect 91, the method of any of aspects 77-90 further includes transmitting one or more configuration parameters for the second connection based on the capability information.

In aspect 92, the method of any of aspects 77-91 further includes receiving measurements from one or more of the first wireless device and the second wireless device; selecting a third wireless device based on the measurements; and indicating for the second wireless device to connect to the third wireless device for relaying communication between the second wireless device and the network entity.

In aspect 93, the method of any of aspects 77-92 further includes receiving, from the second wireless device, one or more of a prior PCI, a C-RNTI for the second wireless device, or a short MAC-I.

In aspect 94, the method of aspect 93 further includes retrieving a context for the second wireless device based on the prior PCI.

In aspect 95, the method of any of aspects 77-94 further includes configuring the second wireless device to perform measurements based on a first RAT of the network entity; and receiving a measurement report, from the second wireless device based on the configuration.

In aspect 96, the method of any of aspects 77-95 further includes configuring the second wireless device to perform RRM measurements based on a first RAT of the network entity; and receiving a measurement report, from the second wireless device based on the configuration.

In aspect 97, the method of aspect 95 or 96 further includes that the network entity configures the second wireless device over a connection based on the first RAT or via the second RAT connection to perform the measurements.

In aspect 98, the method of aspect any of aspects 95-97 further includes that the measurement report is received from the second wireless device over the connection based on the first RAT or via the second RAT connection.

In aspect 99, the method of any of aspects 95-98 further includes configuring the second wireless device to perform measurements based on a first RAT of the network entity; and receiving a measurement report, from the second wireless device based on the configuration.

In aspect 100, the method of any of aspects 95-99 further includes that the measurements comprise RRM measurements.

In aspect 101, the method of any of aspects 77-100 further includes receiving an indication of radio link failure from the first wireless device for the second RAT connection between the first wireless device and the second wireless device; and releasing a context for the second wireless device based on the indication.

In aspect 102, the method of any of aspects 77-101 further includes transmitting a C-RNTI to the second wireless device via the first wireless device in a RRC setup message or an RRC resume message.

In aspect 103, the method of any of aspects 77-101 further includes receiving a first C-RNTI from the first wireless device; and transmitting a second C-RNTI to the second wireless device via the first wireless device in a RRC reestablishment message.

Aspect 104 is an apparatus for wireless communication comprising memory and at least one processor coupled to the memory, the memory and the at least one processor being configured to perform the method of any of aspects 77-103.

In aspect 105, the apparatus of aspect 104 further includes at least one antenna and a transceiver coupled to the at least one antenna and the at least one processor.

Aspect 106 is an apparatus for wireless communication means to perform the method of any of aspects 77-103.

In aspect 107, the apparatus of aspect 106 further includes at least one antenna and a transceiver coupled to the at least one antenna and the at least one processor.

Aspect 108 is a non-transitory computer-readable storage medium storing instructions computer executable code, the code when executed by one or more processors cause the one or more processors to perform a method as in any of aspects 77-103.

What is claimed is:

1. An apparatus for wireless communication at a first wireless device, comprising:

memory; and one or more processors coupled to the memory and configured to cause the first wireless device to:

establish a first connection to a second wireless device;

establish a second connection with a network entity via the second wireless device;

transmit a message to the network entity via the second wireless device, wherein the message indicates that the second connection is a remote connection; and transmit traffic to or receive traffic from the network entity via the second wireless device without an adaptation function.

2. The apparatus of claim 1, wherein the one or more processors are further configured to cause the first wireless device to transmit the message to the network entity during an establishment of the second connection.

3. The apparatus of claim 1, wherein to indicate the remote connection to the network entity, the one or more processors are further configured to cause the first wireless device to:

indicate that the network entity is unreachable or unsuitable for wireless traffic over a first radio access technology (RAT) interface; and transmit an indication of support for a capability associated with a type of a second RAT for the first connection.

4. The apparatus of claim 3, wherein the indication indicates the support for the type of relayed communication from a first type of relayed communication with the network entity and a second type of relayed communication with the network entity.

5. The apparatus of claim 4, wherein the first type of the relayed communication is based on the first connection configured by the network entity and the second type of the relayed communication is based on the first connection configured by the first wireless device or the second wireless device.

6. The apparatus of claim 5, wherein the indication indicates the support for the first type of the relayed communication, the one or more processors are further configured to cause the first wireless device to:

receive one or more configuration parameters from the network entity for the first connection based on the type of the second RAT indicated in the capability.

7. The apparatus of claim 1, wherein the first connection is based on one or more of:

the network entity is unreachable or unsuitable for wireless traffic via a first radio access technology (RAT) interface, discovery of the second wireless device based on a discovery procedure for a second RAT, or an indication that the second wireless device supports relaying to the network entity over the first RAT via the remote connection.

8. The apparatus of claim 7, wherein the first RAT comprises a NR Uu interface and the second RAT comprises sidelink.

9. The apparatus of claim 7, wherein the first RAT comprises an NR Uu interface, and the second RAT comprises a Bluetooth low energy (BLE) interface, a WiFi-D interface, a WiFi interface, or a bluetooth (BL) regular interface.

10. The apparatus of claim 1, wherein the first connection is managed by one or more of the second wireless device or the first wireless device.

11. The apparatus of claim 1, wherein to establish the second connection with the network entity, the one or more processors are further configured to cause the first wireless device to:

establish a context with the network entity via the second wireless device; and establish a protocol data unit (PDU) session with the network entity for a first RAT via the second wireless device.

12. The apparatus of claim 11, wherein the one or more processors are further configured to cause the first wireless device to:

receive one or more initial messages for radio resource control (RRC) setup, RRC resume, or RRC reestablishment from the network entity via the second wireless device on a first signaling radio bearer (SRB) that corresponds to the first RAT of the network entity;

receive one or more RRC messages on a second SRB that corresponds to the first RAT after establishment of a security context with the network entity; and receive, from the network entity via the second wireless device, a configuration of the second SRB and a data radio bearer (DRB) for exchanging wireless traffic with the network entity.

13. The apparatus of claim 1, wherein the one or more processors are further configured to cause the first wireless device to:

select a target path with a third wireless device to relay wireless traffic to the network entity based on a reselection procedure for a RAT for the second connection;

reestablish a security context and a protocol data unit (PDU) session with the network entity via the third wireless device;

receive, from the network entity, an indication to connect to the third wireless device to relay the wireless traffic to the network entity, wherein the target path is based on the indication from the network entity; and transmit a measurement to the network entity via the second wireless device, wherein the indication to connect to the third wireless device is based on the measurement.

14. The apparatus of claim 13, wherein the one or more processors are further configured to cause the first wireless device to:

reestablish the security context and the PDU session with the network entity via the third wireless device.

15. The apparatus of claim 1, wherein the one or more processors are further configured to cause the first wireless device to:

provide one or more of a prior physical cell identity (PCI), a cell radio network temporary identifier (C-RNTI) for the first wireless device, or a short medium access control identity (MAC-I) to the network entity.

16. The apparatus of claim 1, wherein the one or more processors are further configured to cause the first wireless device to:

perform a radio resource management (RRM) measurement for a first RAT of the network entity, wherein the RRM measurement is configured by the network entity over the first connection or via the second connection; and send a measurement report to the network entity over the first connection or via the second connection.

17. The apparatus of claim 1, wherein the one or more processors are further configured to cause the first wireless device to:

receive an indication to release the first connection due to radio link failure from the second wireless device for a link between the second wireless device and the network entity.

18. The apparatus of claim 1, wherein the one or more processors are further configured to cause the first wireless device to:

receive a cell radio network temporary identifier (C-RNTI) from the network entity via the second wireless device in a radio resource control (RRC) setup message or an RRC resume message.

19. The apparatus of claim 1, wherein the one or more processors are further configured to cause the first wireless device to:

provide a first cell radio network temporary identifier (C-RNTI) to the network entity; and receive a second C-RNTI from the network entity via the second wireless device in a radio resource control (RRC) reestablishment message.

20. An apparatus for wireless communication to relay traffic for a first wireless device by a second wireless device, comprising:

memory; and one or more processors coupled to the memory and configured to cause the second wireless device to:

establish a first connection with the first wireless device to relay the traffic between a network entity and the first wireless device;

establish a second connection with the network entity to relay the traffic between the network entity and the first wireless device;

receive a configuration from the network entity for the second connection between the network entity and the second wireless device for relaying the traffic for the first wireless device, wherein the first connection is configured by one or more of the first wireless device or the second wireless device; and relay the traffic between the network entity and the first wireless device without an adaptation function.

21. The apparatus of claim 20, wherein the first connection is for a radio access technology (RAT) that is different than the second connection, and wherein the one or more processors are further configured to cause the second wireless device to:

perform discovery of the first wireless device based on a discovery procedure for the RAT, wherein the discovery procedure includes transmission of an indication that the second wireless device supports relaying to the network entity with a connection for the RAT controlled by the second wireless device.

22. The apparatus of claim 20, wherein the one or more processors are further configured to cause the second wireless device to:

perform relaying for multiple user equipment (UEs) with a dedicated first radio access technology (RAT) radio link control (RLC) channel for each UE, wherein relay of the traffic between the network entity and the first wireless device is based on a mapping between a first radio access technology (RAT) link with the network entity for relaying to the first wireless device and a second RAT link with the first wireless device.

23. The apparatus of claim 20, wherein the one or more processors are further configured to cause the second wireless device to:

receive the traffic from the network entity over a first RAT signaling radio bearer (SRB) or a first RAT data radio bearer (DRB) configured by the network entity for the first wireless device;

relay the traffic to the first wireless device over the first connection;

receive, from the network entity, the configuration for a relaying radio link channel and a first quality of service for the second connection based on the first RAT DRB for the first wireless device, wherein the configuration includes a first RAT radio link control (RLC) channel for the SRB for the first wireless device and a second first RAT RLC channel for the DRB for the first wireless device; and manage, by the second wireless device, a second quality of service and a context for the first connection with the first wireless device based on a second RAT.

24. The apparatus of claim 20, wherein the one or more processors are further configured to cause the second wireless device to:

detect a radio link failure for the second connection with the network entity; and perform at least one of:

release or suspend the first connection with the second wireless device in response to detection of the radio link failure for the second connection, or stop discovery advertisement for a radio access technology (RAT) of the first connection with the second wireless device in response to the detection of the radio link failure for the second connection.

25. An apparatus for wireless communication at a network entity, comprising:

memory; and one or more processors coupled to the memory and configured to cause the network entity to:

establish a first connection to a first wireless device over a first RAT;

establish a second connection with a second wireless device for the first RAT via the first wireless device;

receive an indication during an establishment of the second connection that the second connection is a remote connection; and transmit traffic to or receive traffic from the second wireless device via the first wireless device without an adaptation function.

26. The apparatus of claim 25, wherein to receive the indication that the second connection is the remote connection, the one or more processors are further configured to cause the network entity to:

receive information that indicates the network entity is unreachable or unsuitable for wireless traffic over a first RAT interface; and receive capability information from the second wireless device via the first wireless device, the capability information indicates a type of RAT for the second connection between the first wireless device and the second wireless device and indicates that the remote connection is managed by one or more of the second wireless device or the first wireless device.

27. The apparatus of claim 25, wherein the first connection comprises an NR Uu connection, and the second connection comprises at least one of a sidelink interface, a Bluetooth low energy (BLE) interface, a WiFi-D interface, a WiFi interface, or a bluetooth (BL) regular interface.

28. The apparatus of claim 25, wherein the one or more processors are further configured to cause the network entity to:

configure the second wireless device to perform one or more radio resource management (RRM) measurement based on the first RAT; and receive a measurement report from the second wireless device.

29. The apparatus of claim 25, wherein the one or more processors are further configured to cause the network entity to:

receive a radio link failure indication from the first wireless device for the second connection between the first wireless device and the second wireless device; and release a context for the second wireless device based on the indication.

* * * * *